United States Patent
Babaei

(10) Patent No.: US 11,076,439 B2
(45) Date of Patent: Jul. 27, 2021

(54) WIRELESS DEVICE AND WIRELESS NETWORK PROCESSES FOR SECONDARY CELL TO PRIMARY CELL SCHEDULING

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/140,023

(22) Filed: Jan. 1, 2021

(65) Prior Publication Data

US 2021/0204344 A1 Jul. 1, 2021

Related U.S. Application Data

(60) Provisional application No. 62/956,314, filed on Jan. 1, 2020.

(51) Int. Cl.
| | |
|---|---|
| *H04W 76/18* | (2018.01) |
| *H04W 72/12* | (2009.01) |
| *H04W 80/02* | (2009.01) |
| *H04W 76/11* | (2018.01) |
| *H04W 24/08* | (2009.01) |

(52) U.S. Cl.
CPC .......... *H04W 76/18* (2018.02); *H04W 24/08* (2013.01); *H04W 72/1263* (2013.01); *H04W 76/11* (2018.02); *H04W 80/02* (2013.01)

(58) Field of Classification Search
CPC ..... H04W 76/18; H04W 76/11; H04W 24/08; H04W 72/1263; H04W 80/02
See application file for complete search history.

(56) References Cited

U.S. PATENT DOCUMENTS

| | | | |
|---|---|---|---|
| 9,451,652 B2 * | 9/2016 | Gohari | .......... H04W 76/19 |
| 9,924,419 B2 | 3/2018 | Moon et al. | |
| 10,313,935 B2 | 6/2019 | Moon et al. | |

(Continued)

FOREIGN PATENT DOCUMENTS

| | | |
|---|---|---|
| AU | 2014307257 B2 | 6/2018 |
| AU | 2015232126 B2 | 8/2018 |
| WO | 2015142128 A1 | 9/2015 |

OTHER PUBLICATIONS

3GPP TS 38.211 V15.7.0 (Sep. 2019); Technical Specification; 3rd Generation Partnership Project; Technical Specification Group Radio Access Network; NR; Physical channels and modulation; (Release 15).

(Continued)

*Primary Examiner* — Saad A. Waqas
(74) *Attorney, Agent, or Firm* — Alireza Babaei

(57) ABSTRACT

A wireless device receives, from a base station, first configuration parameters, of a primary cell and a first secondary cell, and second configuration parameters for radio link monitoring. The first secondary cell may be a scheduling cell for the primary cell. Based on the first secondary cell being a scheduling cell for the primary cell, the wireless device may perform radio link monitoring on the first secondary cell using the second configuration parameters. The wireless device may determine a link failure of the first secondary cell based on the radio link monitoring. The wireless device may transmit, to the base station, an indication of the link failure of the first secondary cell.

20 Claims, 33 Drawing Sheets

(56) References Cited

U.S. PATENT DOCUMENTS

| | | | |
|---|---|---|---|
| 2017/0034840 A1* | 2/2017 | Mandil | H04L 5/006 |
| 2017/0311370 A1* | 10/2017 | Dalsgaard | H04W 24/10 |
| 2018/0241525 A1* | 8/2018 | Ouchi | H04W 72/042 |
| 2019/0037604 A1* | 1/2019 | Akkarakaran | H04W 74/006 |
| 2019/0281512 A1 | 9/2019 | Moon et al. | |
| 2019/0357238 A1* | 11/2019 | Zhou | H04W 72/042 |
| 2020/0029383 A1* | 1/2020 | Venugopal | H04W 72/042 |
| 2020/0229081 A1* | 7/2020 | Ang | H04W 72/0453 |
| 2020/0266876 A1* | 8/2020 | Yu | H04B 7/0695 |
| 2020/0274679 A1* | 8/2020 | Futaki | H04L 5/0092 |

OTHER PUBLICATIONS

3GPP TS 38.212 V15.7.0 (Sep. 2019); Technical Specification; 3rd Generation Partnership Project; Technical Specification Group Radio Access Network; NR; Multiplexing and channel coding; (Release 15).
3GPP TS 38.213 V15.7.0 (Sep. 2019); Technical Specification; 3rd Generation Partnership Project; Technical Specification Group Radio Access Network; NR; Physical layer procedures for control; (Release 15).
3GPP TS 38.214 V15.7.0 (Sep. 2019); Technical Specification; 3rd Generation Partnership Project; Technical Specification Group Radio Access Network; NR; Physical layer procedures for data; (Release 15).
3GPP TS 38.300 V15.7.0 (Sep. 2019); Technical Specification; 3rd Generation Partnership Project; Technical Specification Group Radio Access Network; NR; NR and NG-RAN Overall Description; Stage 2; (Release 15).
3GPP TS 38.321 V15.7.0 (Sep. 2019); Technical Specification; 3rd Generation Partnership Project; Technical Specification Group Radio Access Network; NR; Medium Access Control (MAC) protocol specification; (Release 15).
3GPP TS 38.331 V15.7.0 (Sep. 2019); Technical Specification; 3rd Generation Partnership Project; Technical Specification Group Radio Access Network; NR; Radio Resource Control (RRC); Protocol specification; (Release 15 ).
3GPP TSG-RAN Meeting #86; RP-192677; Sitges, Spain, Dec. 9-12, 2019; Agenda item: 9.1.1; Source: Ericsson (moderator); Title: Summary of Rel-17 email discussion on NR dynamic spectrum sharing; Document for: Discussion and Decision.
3GPP TSG RAN Meeting #86; RP-192797; Sitges, Spain, Dec. 9-12, 2019; Agenda Item: 9.1.1; Source: Huawei, HiSilicon; Title: NR CA enhancements and DSS; Document for Discussion and Decision.
3GPP TSG RAN Meeting #86; RP-193260; Sitges, Spain, Dec. 9-12, 2019; Source: Ericsson; Title: New WID on NR Dynamic spectrum sharing (DSS); Document for: Approval; Agenda Item: 9.1.1.
3GPP TSG-RAN WG2 Meeting #77; R2-120089; Dresden, Germany, Feb. 6-10, 2012; Agenda item: 7.1.2.2; Source: Nokia Siemens Networks, Nokia Corporation; Title: RLM on SCells; Document for: Discussion and Decision.
3GPP TSG-RAN WG2 #77 Tdoc; R2- 120472; Dresden, Germany Feb. 6-10, 2012; Agenda Item: 7.1.2.1; Source: Ericsson, ST Ericsson; Title: RLF and RLM on SCells; Document for: Discussion, Decision.
TSG-RAN WG2#77; R2-120604 Feb. 6-10, 2012; Dresden, Germany; Title: Pathloss reference for SCell TA group and need of RLM; Source: Alcatel-Lucent, Alcatel-Lucent Shanghai Bell; Agenda Item: 7.1.2.2; Document for: Discussion.
3GPP TSG-RAN WG2 Meeting #77bis; R2-121181; Jeju, South Korea, Mar. 26-30, 2012; (Resubmission of R2-120089); Agenda item: 7.1.2.2; Source: Nokia Siemens Networks, Nokia Corporation; Title: RLM on SCells; Document for: Discussion and Decision.
3GPP TSG RAN WG2 Meeting #77bis; R2-121192; Jeju, Korea, Mar. 26-30, 2012; Agenda item: 7.1.2.2; Source: New Postcom; Title: Path loss reference and RLM on SCell; Document for: Discussion and Decision.
3GPP TSG-RAN WG2 Meeting #77Bis; R2- 121241; Jeju Island, Korea, Mar. 26-30, 2012; Agenda item: 7.1.2. 2; Source: ZTE Corporation; Title: Pathloss and RLM for MTA; Document for: Discussion and Decision.
3GPP TSG-RAN WG2 #77 Tdoc; R2- 121557; Jeju, South Korea Mar. 26-30, 2012; (Resubmission of R2-120472); Agenda Item: 7.1.2.2; Source: Ericsson, ST Ericsson; Title: RLF and RLM on SCells; Document for: Discussion, Decision.
TSG-RAN WG2#77bis; R2-121688 Mar. 26-30, 2012; Jeju, USA; Title: Pathloss reference for SCell TA group and need of RLM; Source: Alcatel-Lucent, Alcatel-Lucent Shanghai Bell; Agenda Item: 7.1.2.2; Document for: Discussion.

* cited by examiner

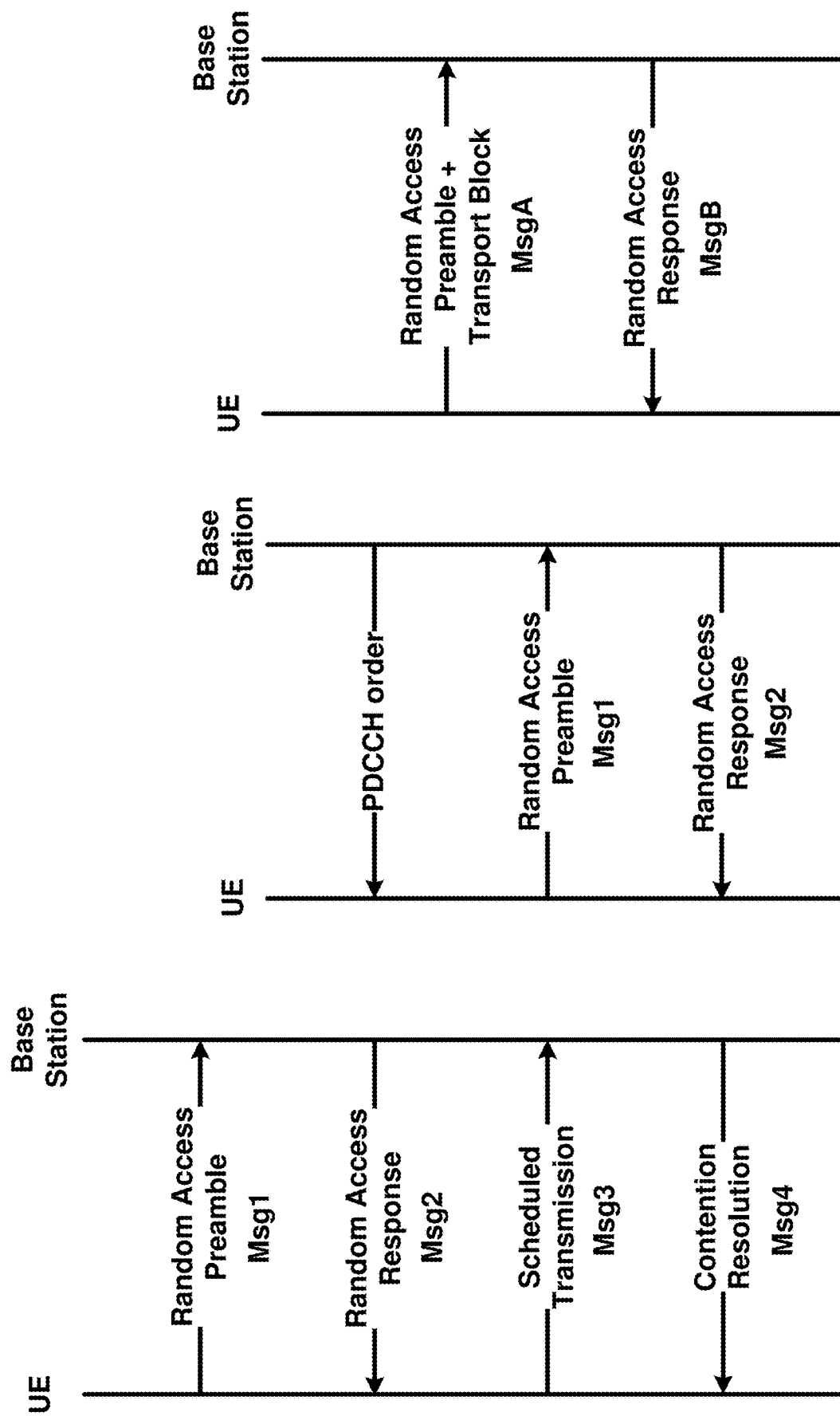

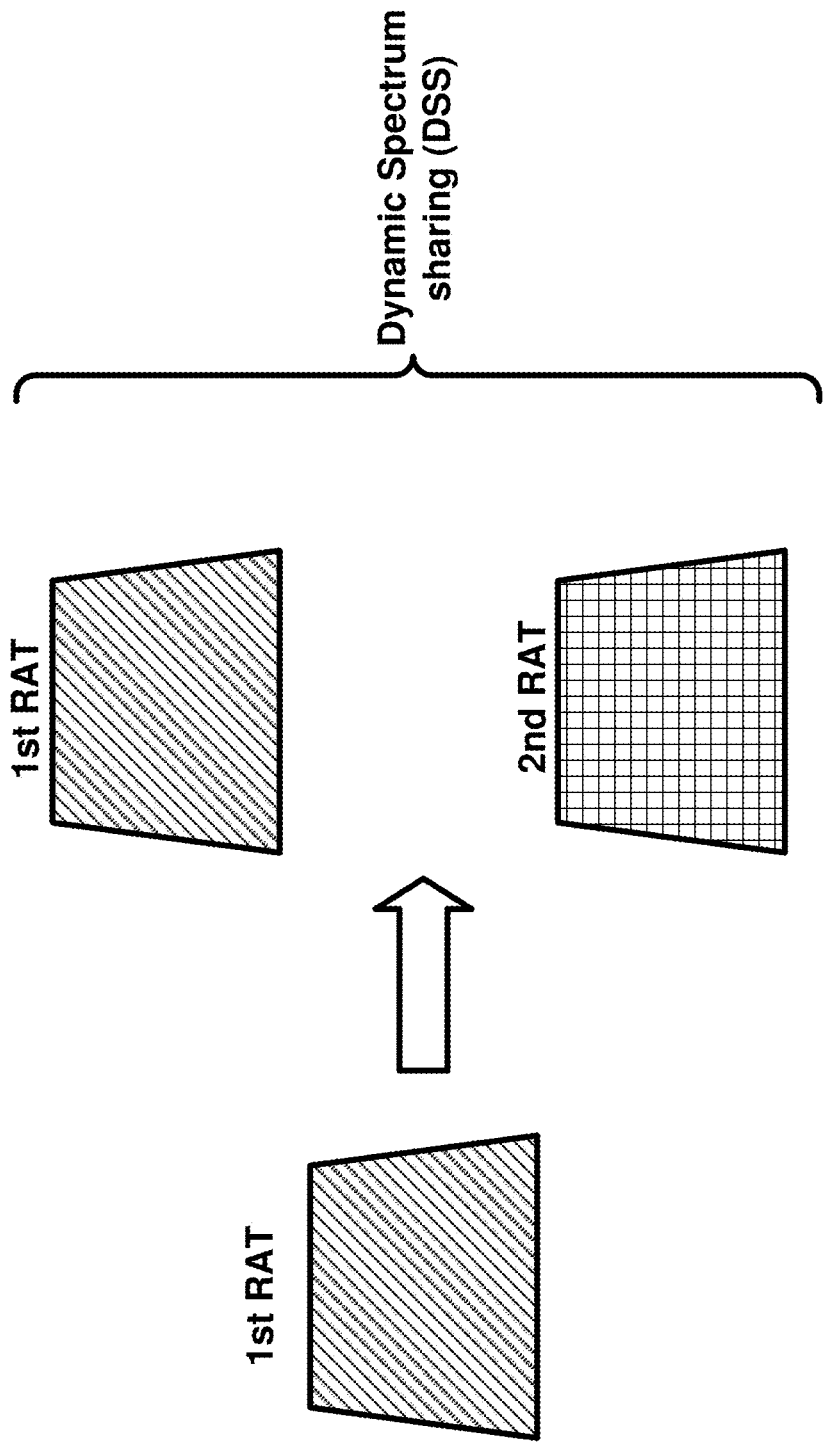

WIRELESS DEVICE AND WIRELESS NETWORK PROCESSES FOR SECONDARY CELL TO PRIMARY CELL SCHEDULING

CROSS-REFERENCE TO RELATED APPLICATIONS

This application claims the benefit of U.S. Provisional Application No. 62/956,314, filed Jan. 1, 2020, which is hereby incorporated by reference in its entirety.

BRIEF DESCRIPTION OF THE DRAWINGS

FIG. 12A, FIG. 12B and FIG. 12C show example random access processes in accordance with several of various embodiments of the present disclosure.

FIG. 16 shows an example dynamic spectrum sharing (DSS) in accordance with several of various embodiments of the present disclosure.

DETAILED DESCRIPTION

The exemplary embodiments of the disclosed technology enable operation of carrier aggregation in a wireless device and/or one or more base stations. The exemplary disclosed embodiments may be implemented in the technical field of wireless communication systems. More particularly, the embodiment of the disclosed technology may relate to scheduling of a primary cell from a secondary cell.

The devices and/or nodes of the mobile communications system disclosed herein may be implemented based on various technologies and/or various releases/versions/ amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
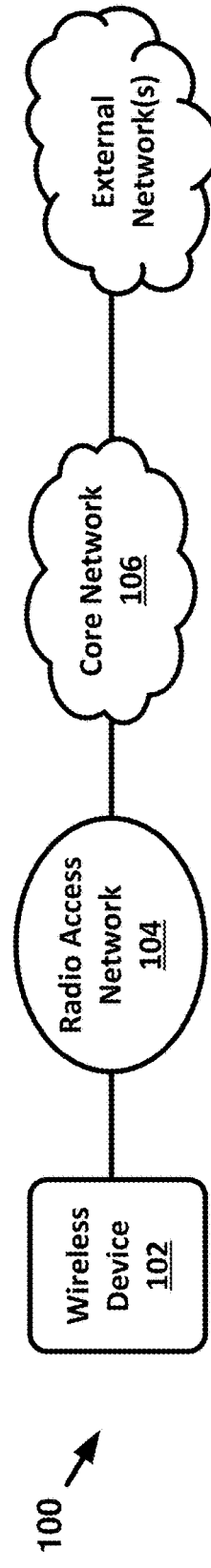
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
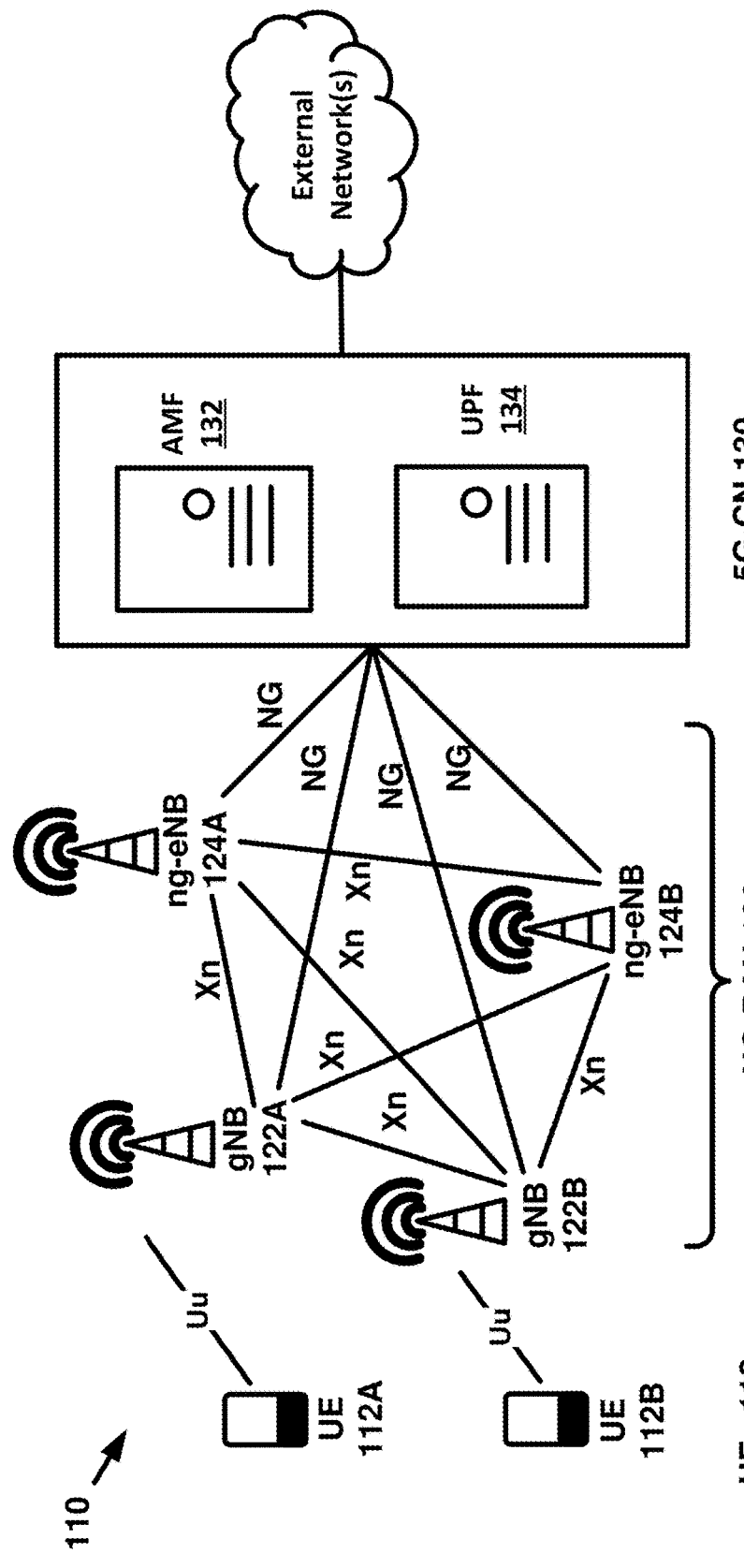

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
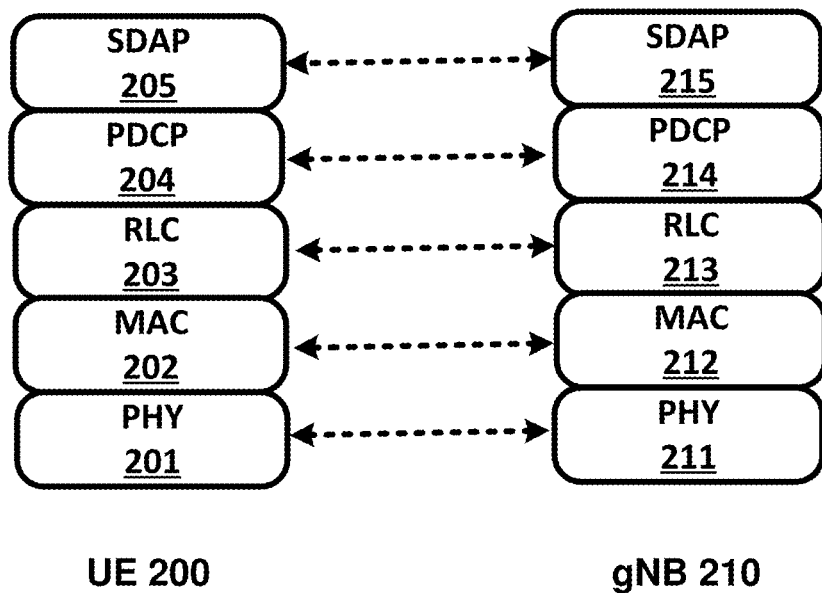
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
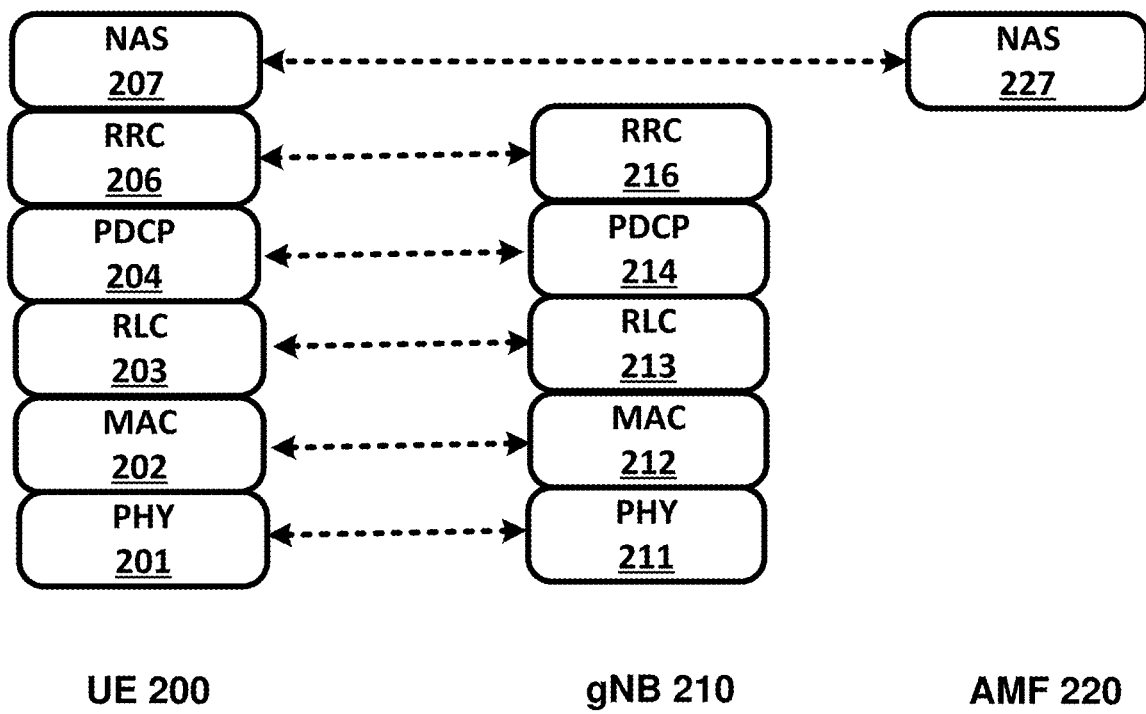

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
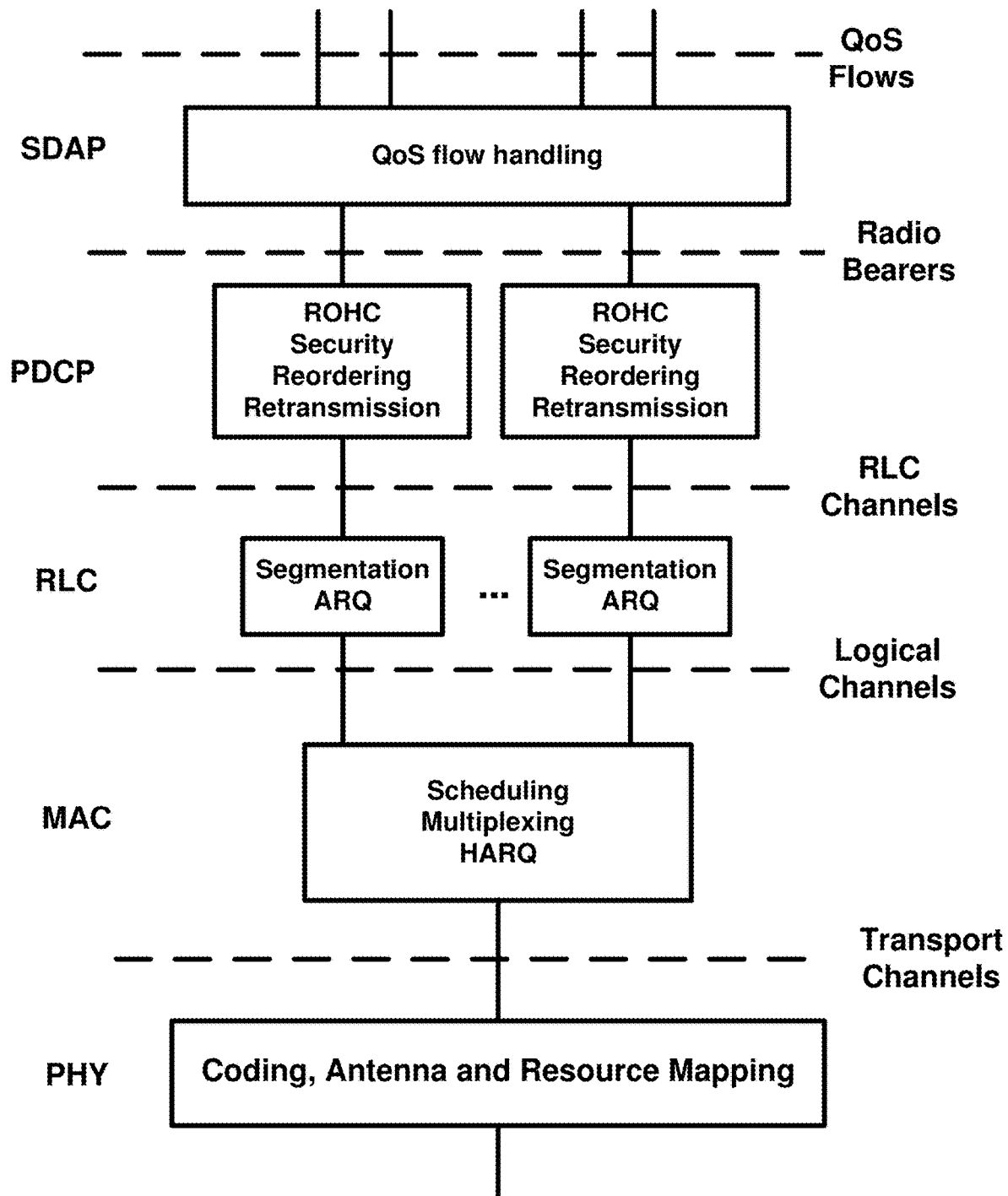
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
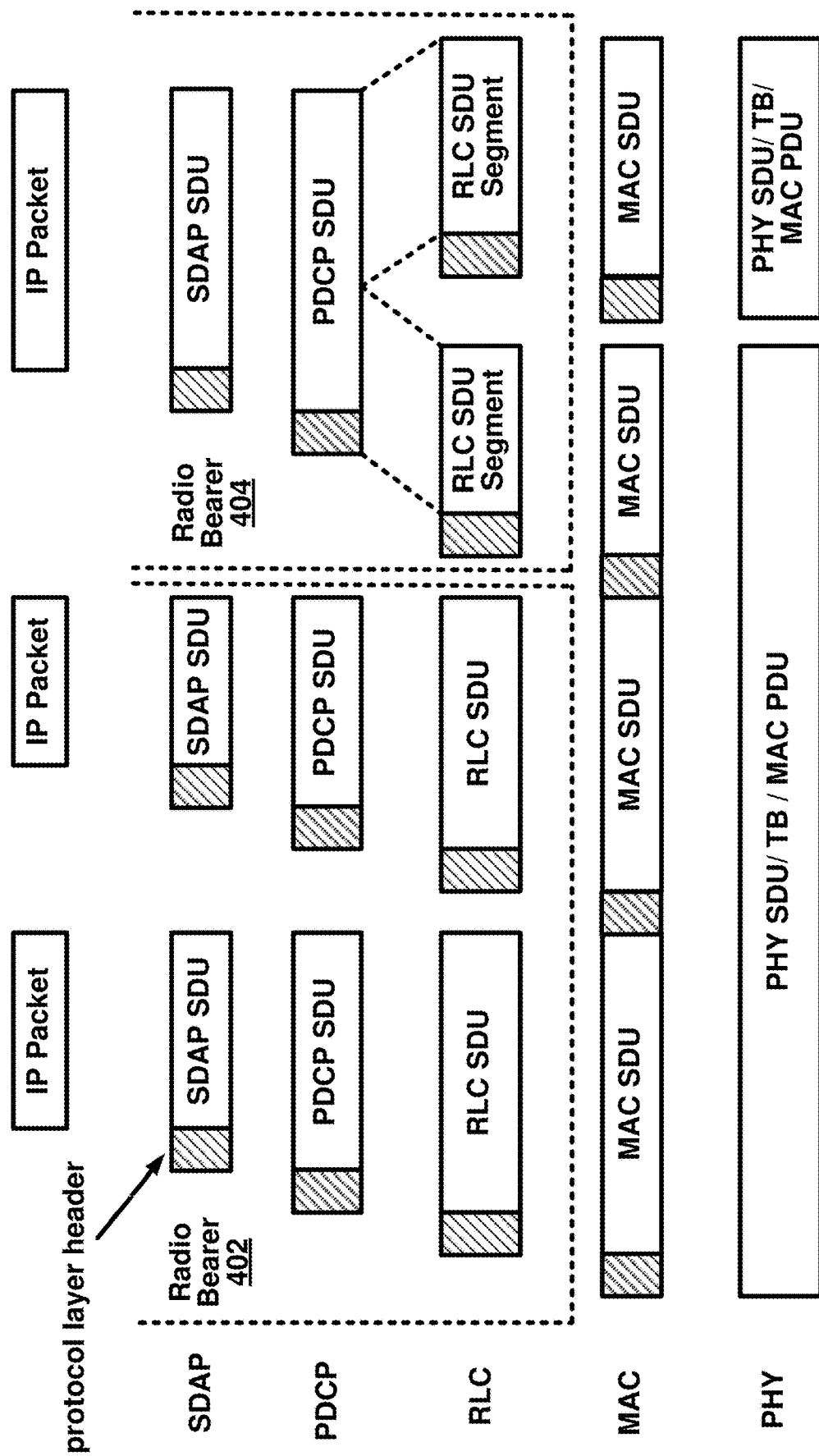
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
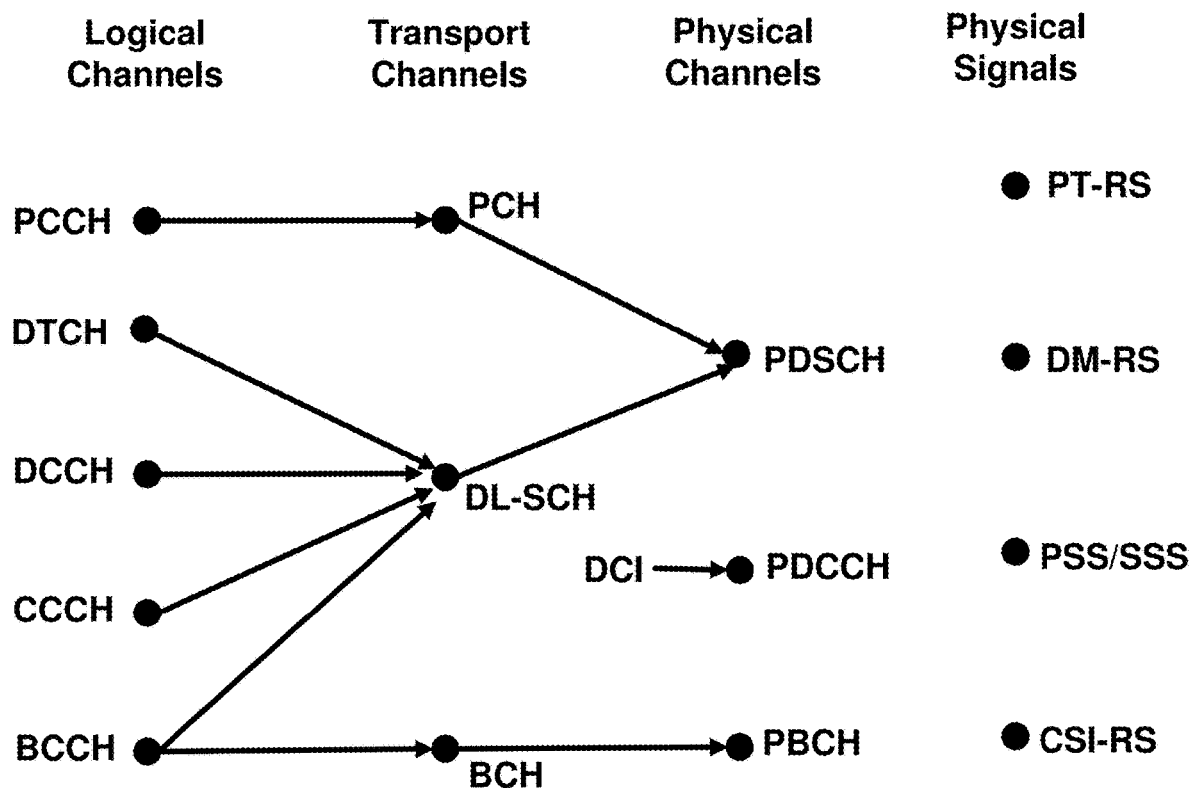
FIG. 5A shows example mapping of channels between layers of the protocol stack and different physical signals in downlink in accordance with several of various embodiments of the present disclosure.
Figure 5B:
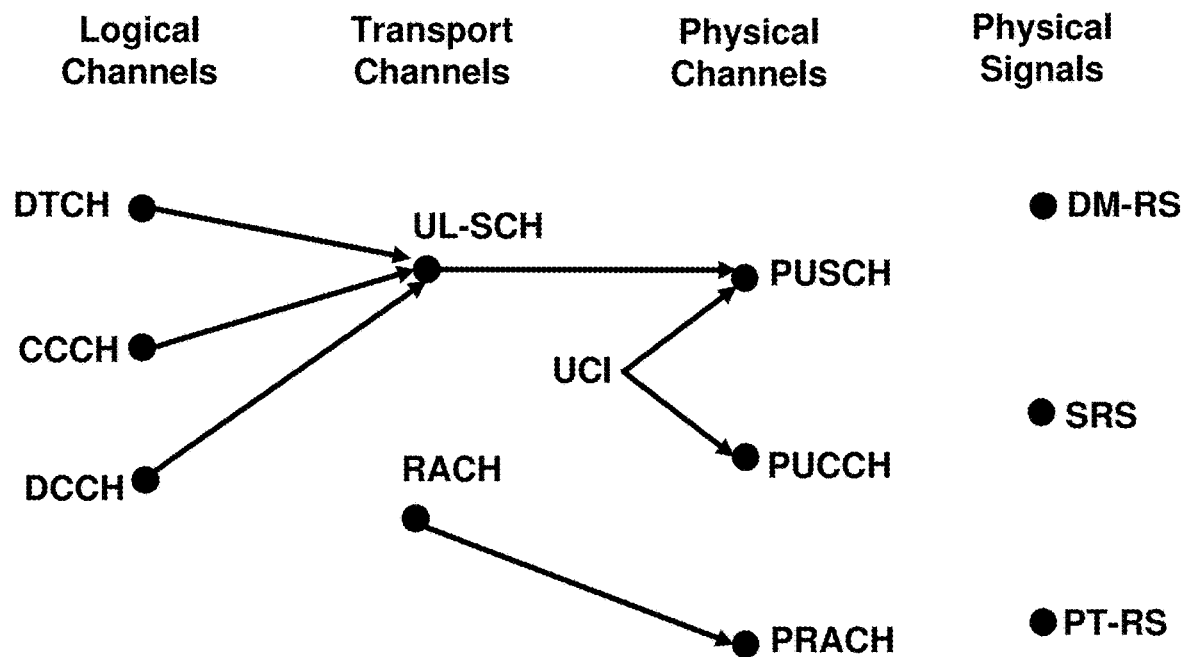
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
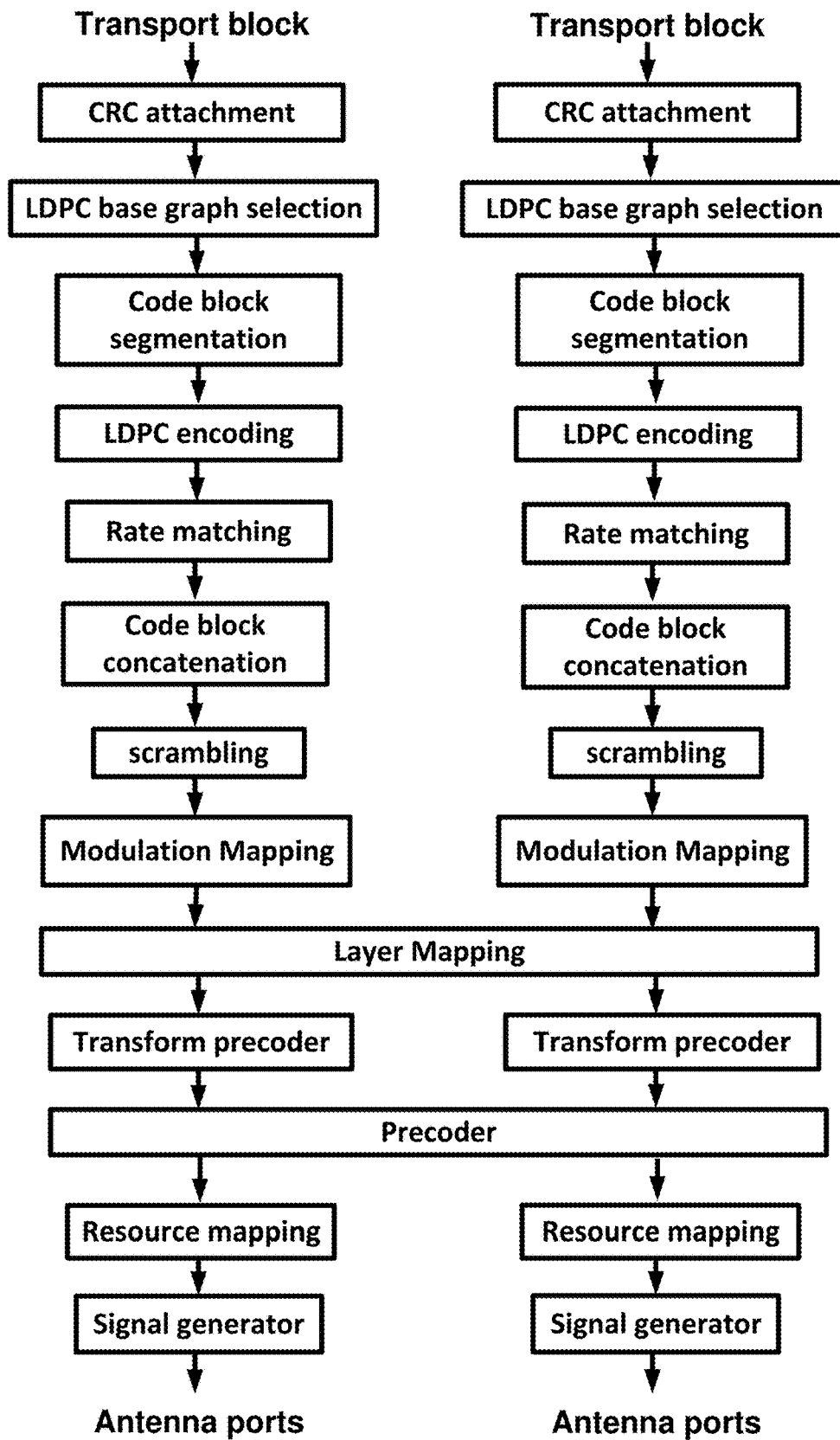
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
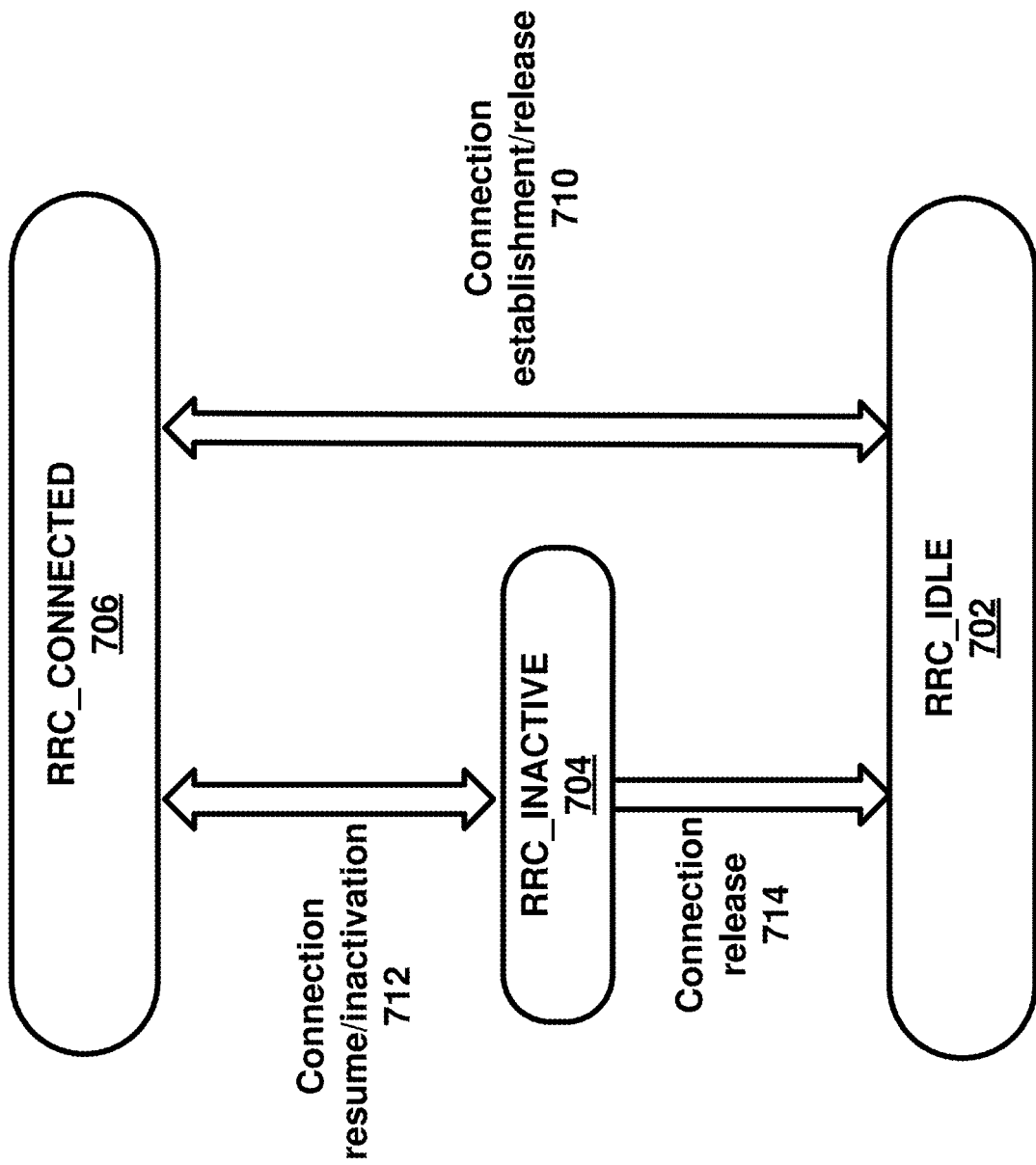
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f=2^\mu \cdot 15$ KHz ($\mu=0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g. the p value).

Figure 8:
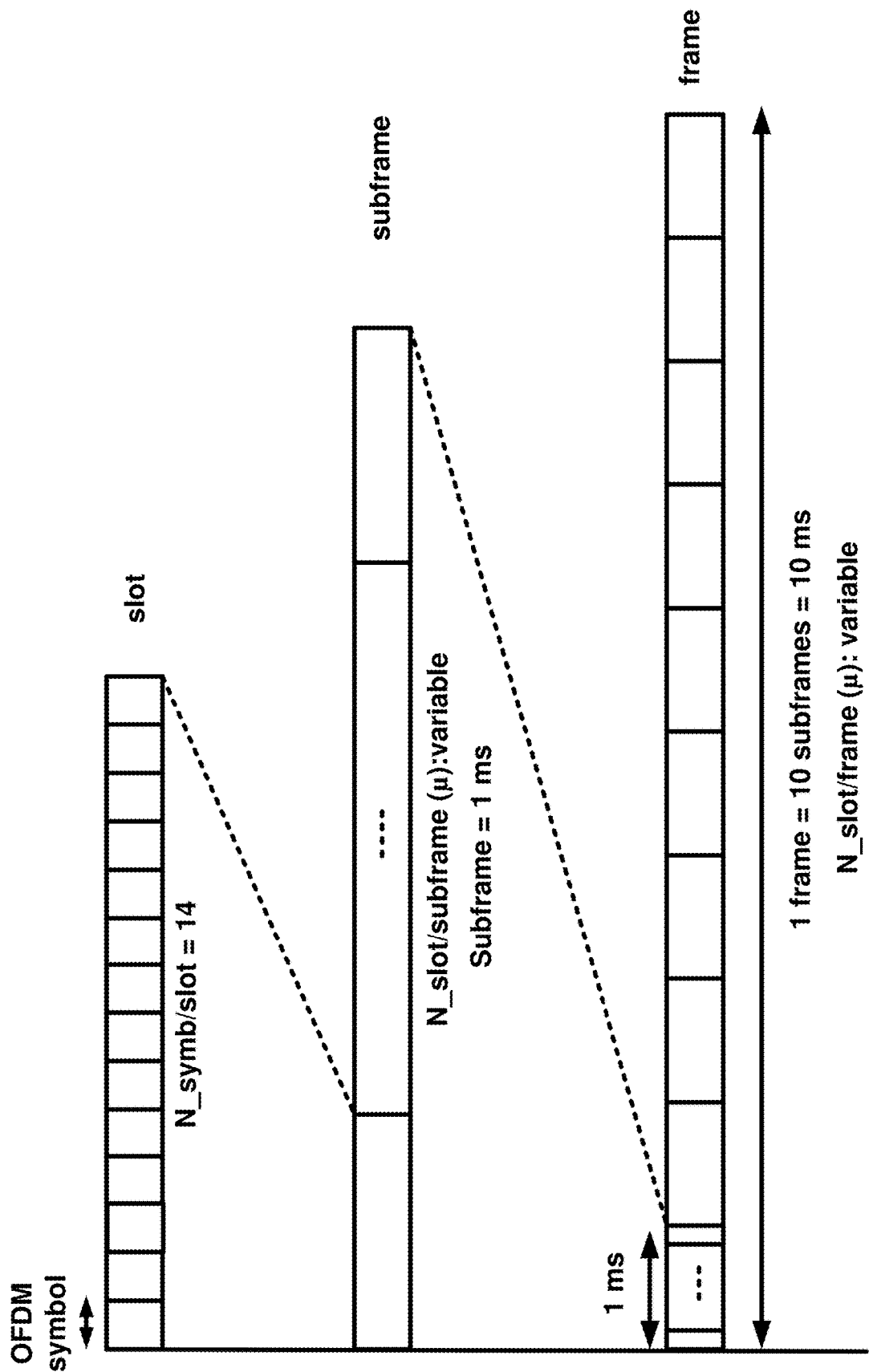
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{slot}^{subframe,\mu}$ and the number of symbols per subframe may be expressed as $N_{slot}^{subframe,\mu}=N_{symb}^{slot}N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{subframe,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
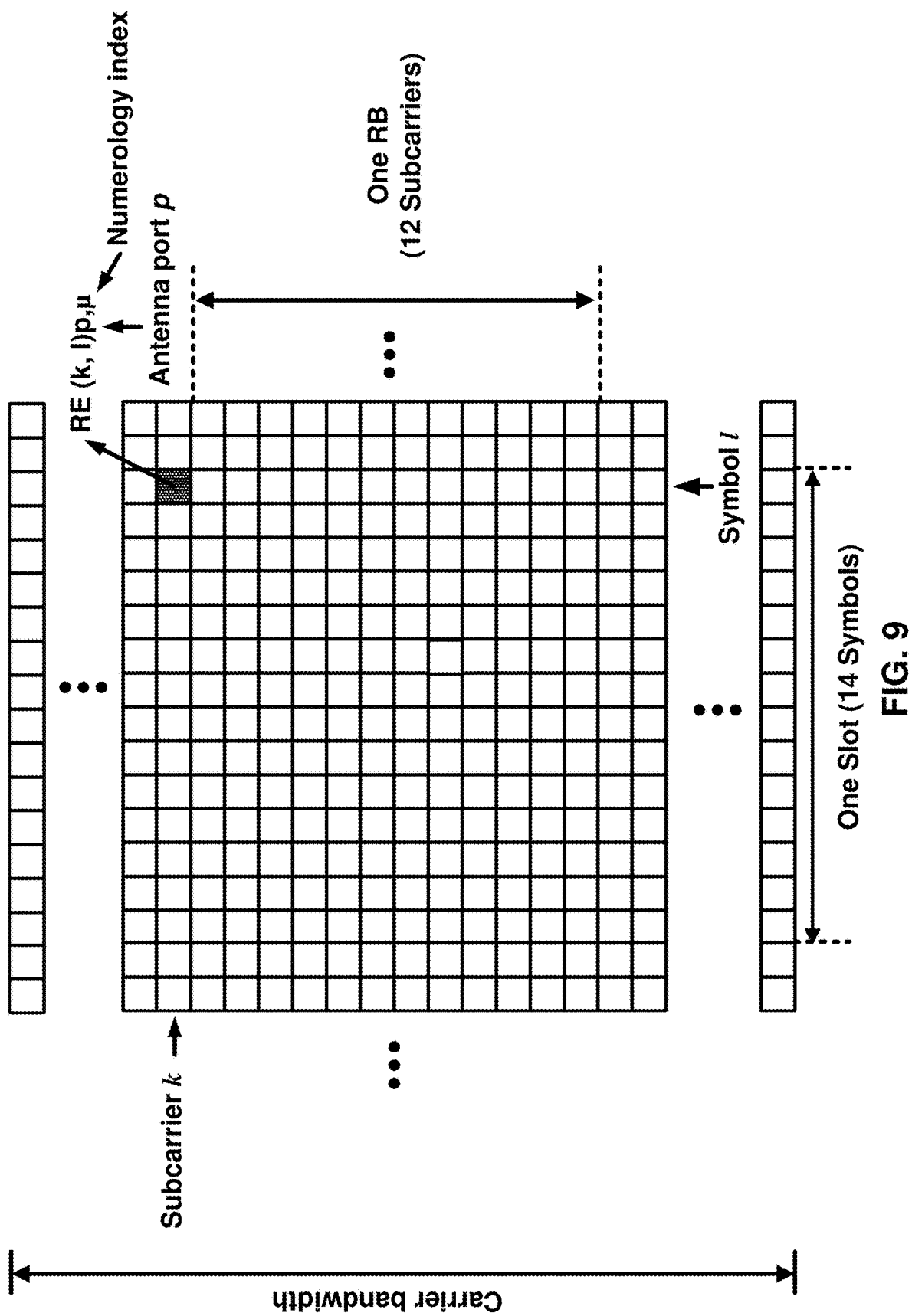
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration p may be uniquely identified by $(k,l)_{p,\mu}$, where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., $\mu=0$), a resource block may be 180 KHz and for a subcarrier spacing of 30 KHz (e.g., $\mu=1$), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
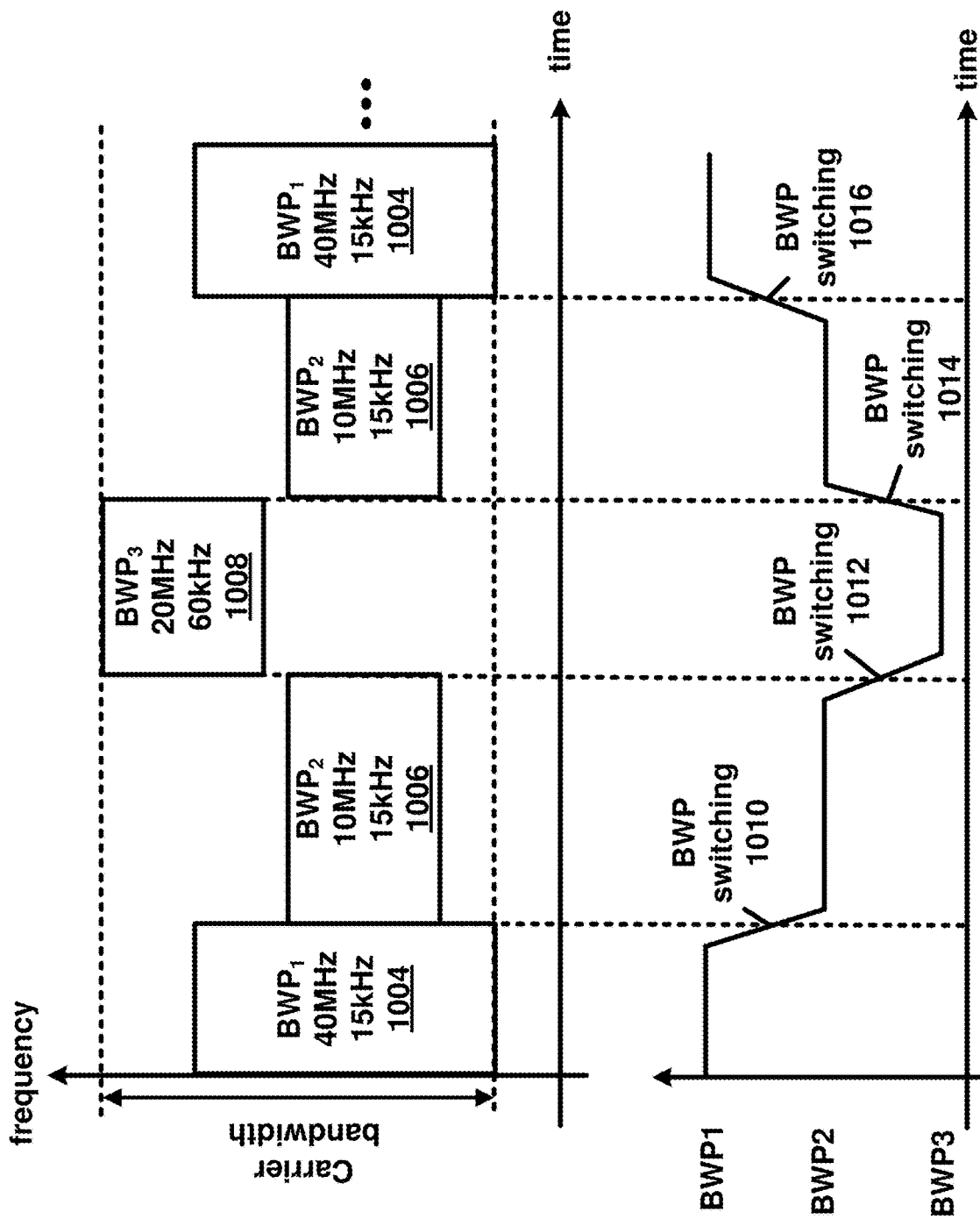
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
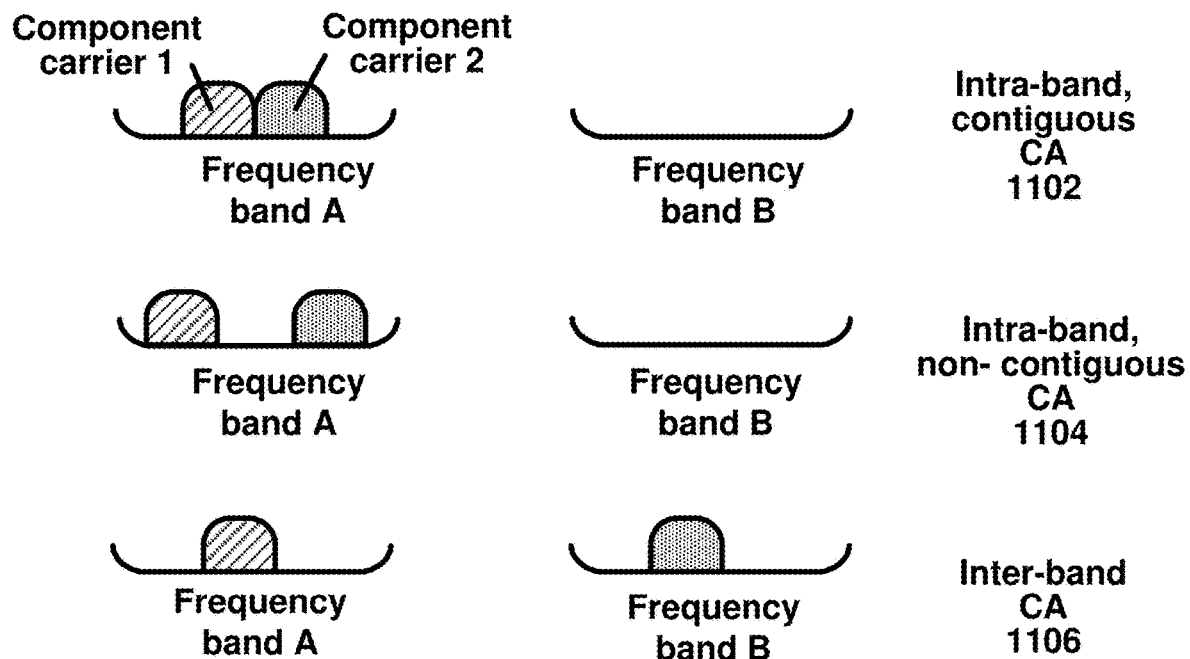
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
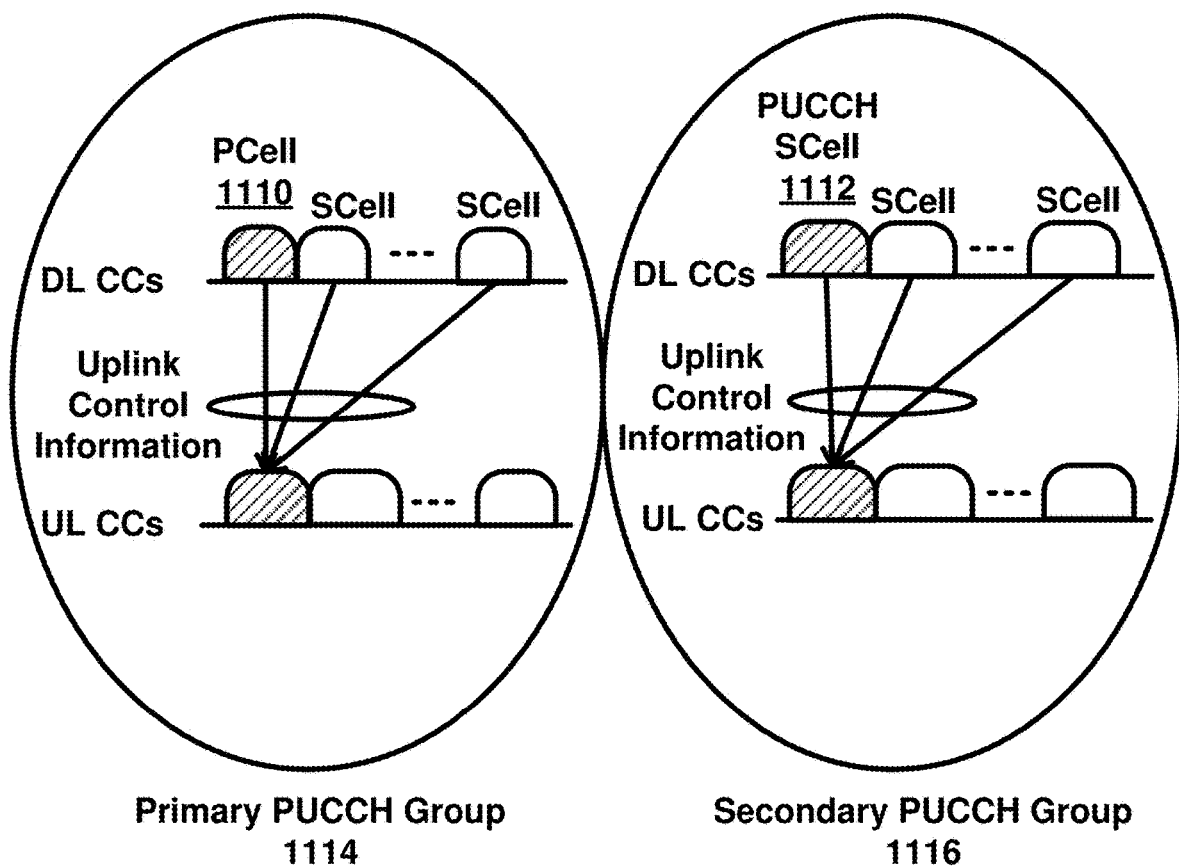
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. The are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
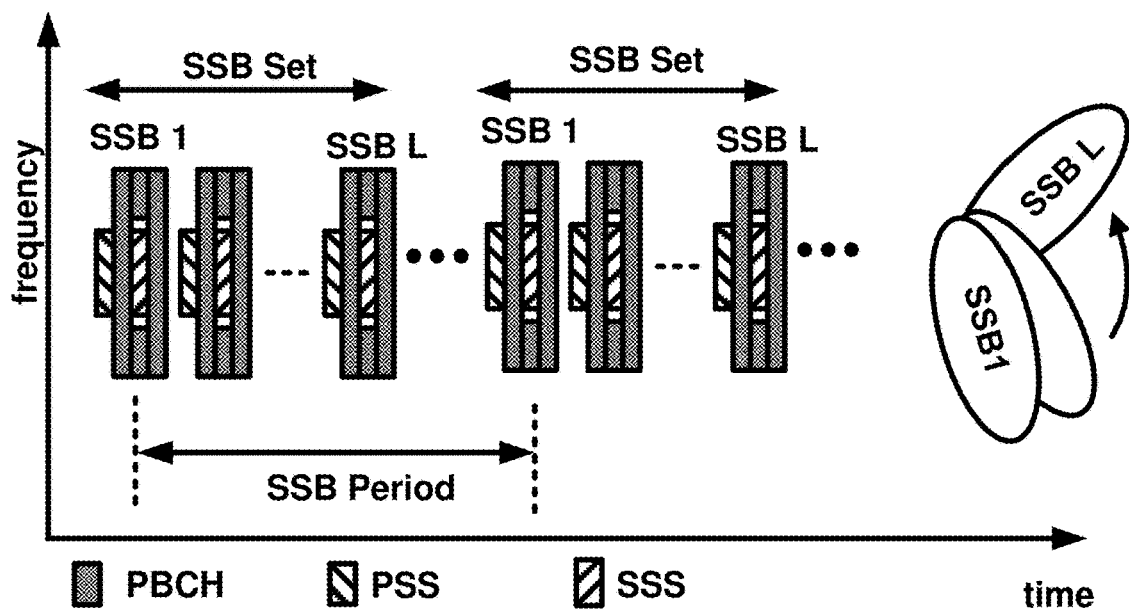
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
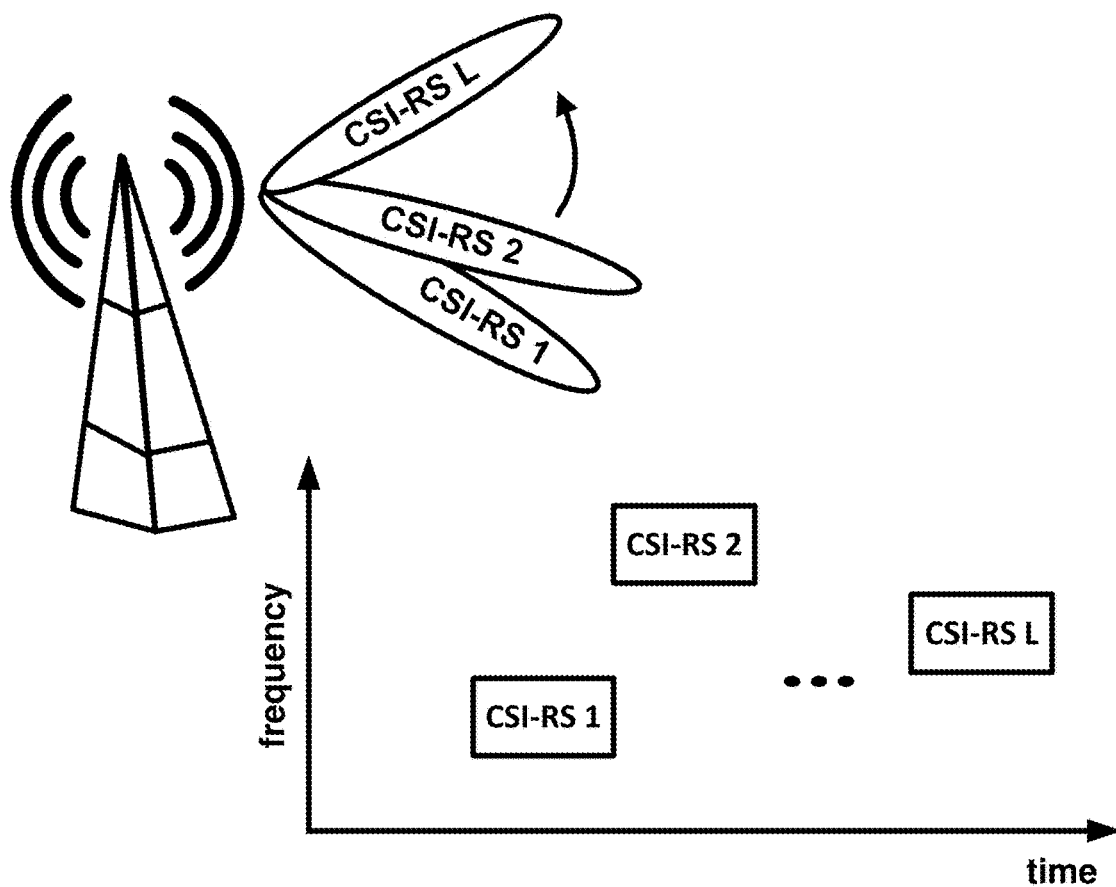
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality (for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
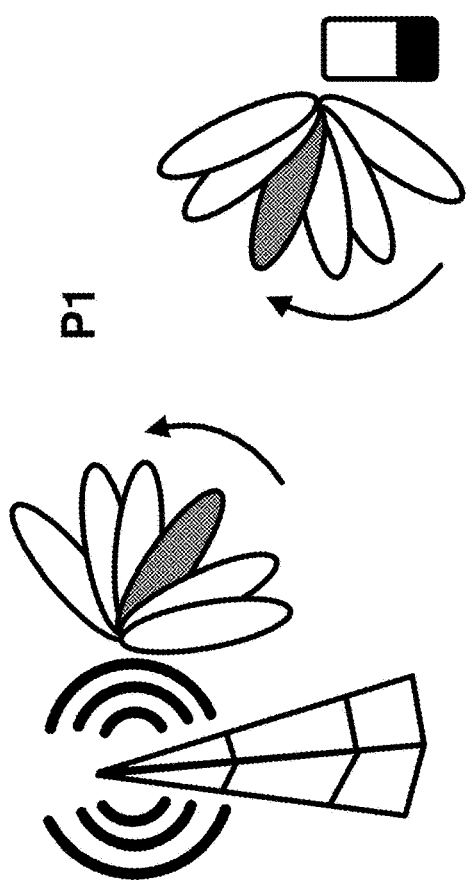
FIG. 14A, FIG. 14B and FIG. 14C show example beam management processes in accordance with several of various embodiments of the present disclosure.
Figure 14C:
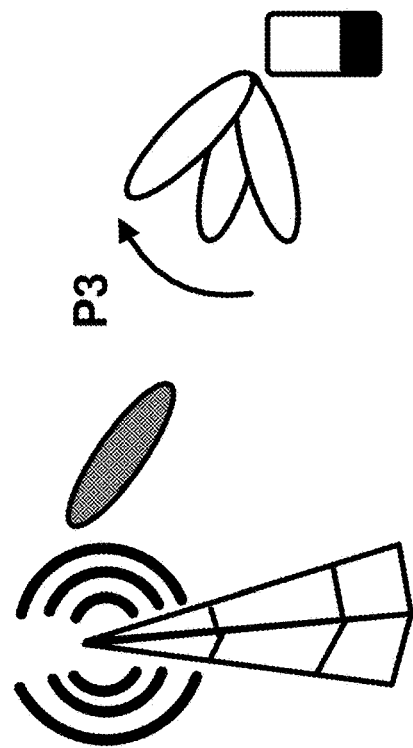
Figure 14B:
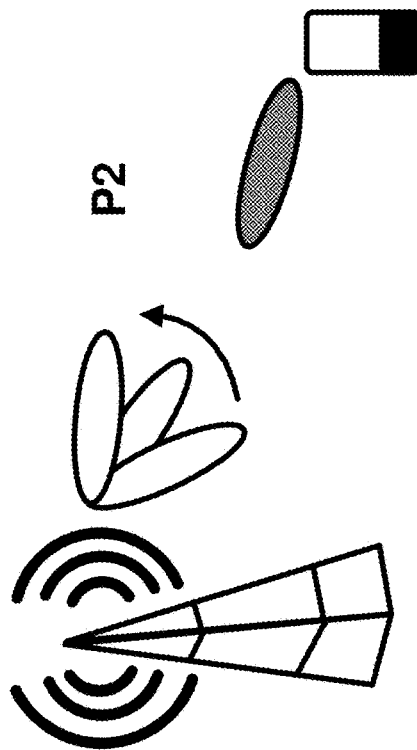

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
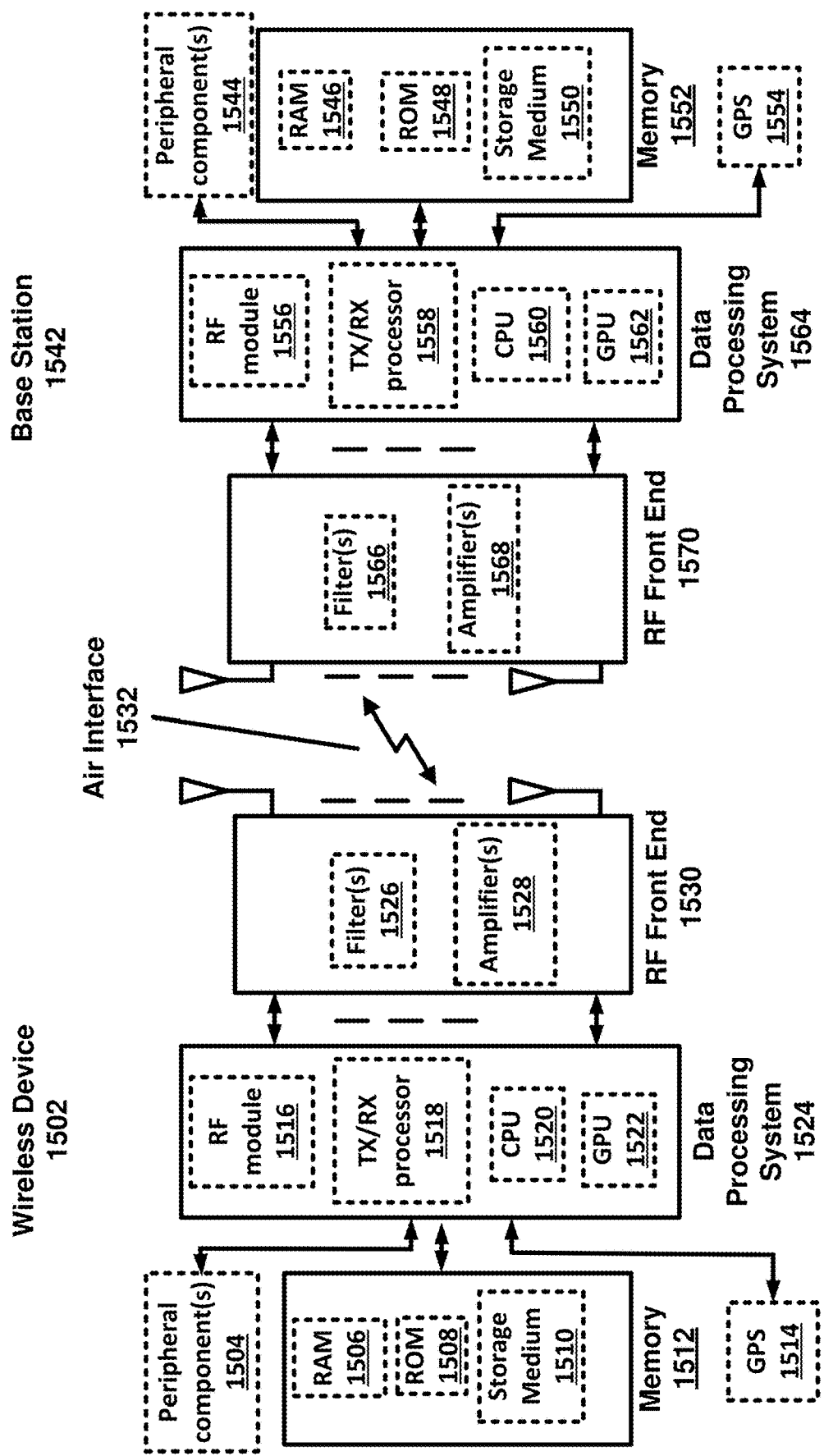
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively.

The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, a MAC entity may be configured by RRC with a beam failure recovery procedure which may be used for indicating to a serving base station of a new SSB or CSI-RS when beam failure is detected on the serving SSB(s)/CSI-RS(s). Beam failure may be detected by counting beam failure instance indication from the lower layers to the MAC entity. If beamFailureRecoveryConfig is reconfigured by upper layers during an ongoing Random Access procedure for beam failure recovery, the MAC entity may stop the ongoing Random Access procedure and initiate a Random Access procedure using the new configuration.

In an example, RRC may configure the following parameters in the BeamFailureRecoveryConfig and the RadioLinkMonitoringConfig for the Beam Failure Detection and Recovery procedure: beamFailureInstanceMaxCount for the beam failure detection; beamFailureDetectionTimer for the beam failure detection; beamFailureRecovery Timer for the beam failure recovery procedure; rsrp-ThresholdSSB: an RSRP threshold for the beam failure recovery; powerRampingStep: powerRampingStep for the beam failure recovery; powerRampingStepHighPriority: powerRampingStepHighPriority for the beam failure recovery; preambleReceivedTargetPower: preambleReceivedTargetPower for the beam failure recovery; preambleTransMax: preambleTransMax for the beam failure recovery; scalingFactorBI: scalingFactorBI for the beam failure recovery; ssb-perRACH-Occasion: ssb-perRACH-Occasion for the beam failure recovery; ra-ResponseWindow: the time window to monitor response(s) for the beam failure recovery using contention-free Random Access Preamble; prach-ConfigurationIndex: prach-ConfigurationIndex for the beam failure recovery; ra-ssb-OccasionMaskIndex: ra-ssb-OccasionMaskIndex for the beam failure recovery; ra-OccasionList: ra-OccasionList for the beam failure recovery.

In an example, the following UE variable may be used for the beam failure detection procedure: BFI_COUNTER: counter for beam failure instance indication which may be initially set to 0.

In an example, if k the beamFailureDetectionTimer; the MAC entity may increment BFI_COUNTER by 1; if BFI_COUNTER>=beamFailureInstanceMaxCount: the MAC entity may initiate a Random Access procedure on the SpCell.

In an example, if the beamFailureDetectionTimer expires; or if beamFailureDetectionTimer, beamFailureInstanceMaxCount, or any of the reference signals used for beam failure detection is reconfigured by upper layers: the MAC entity may set the BFI_COUNTER to 0.

In an example, if the Random Access procedure is successfully completed, the MAC entity may set BFI_ COUNTER to 0; the MAC entity may stop the beamFailureRecoveryTimer, if configured; and the MAC entity may consider the Beam Failure Recovery procedure successfully completed.

In an example, a wireless device may be configured with the IE BeamFailureRecoveryConfig which may be used to configure the wireless device with RACH resources and candidate beams for beam failure recovery in case of beam failure detection.

In an example, a parameter beamFailureRecovery Timer may indicate a value of a timer for beam failure recovery timer. Upon expiration of the timer the wireless device may not use CFRA for BFR. Value may be in ms. Value ms10 may correspond to 10 ms, value ms20 may correspond to 20 ms, and so on. A parameter candidateBeamRSList may indicate a list of reference signals (CSI-RS and/or SSB) identifying the candidate beams for recovery and the associated RA parameters. The network may configure these reference signals to be within the linked DL BWP (e.g., within the DL BWP with the same bwp-Id) of the UL BWP in which the BeamFailureRecoveryConfig is provided. In an example, a parameter msg1-SubcarrierSpacing may indicate subcarrier spacing for contention free beam failure recovery. In an example, a parameter rsrp-ThresholdSSB may indicate L1-RSRP threshold used for determining whether a candidate beam may be used by the wireless device to attempt contention free random access to recover from beam failure. In an example, ra-prioritization may indicate parameters which may apply for prioritized random access procedure for BFR. A parameter ra-ssb-OccasionMaskIndex may indicate an explicitly signalled PRACH Mask Index for RA Resource selection. The mask may be valid for SSB resources. A parameter rach-ConfigBFR may indicate configuration of contention free random access occasions for BFR. A parameter recoverySearchSpaceId may indicate search space to use for BFR RAR. The network may configure this search space to be within the linked DL BWP (e.g., within the DL BWP with the same bwp-Id) of the UL BWP in which the BeamFailureRecoveryConfig is provided. In an example, the CORESET associated with the recovery search space may not be associated with another search space. Network may configure the wireless device with a value for this field when contention free random access resources for BFR are configured. A parameter ssb-perRACH-Occasion may indicate number of SSBs per RACH occasion for CF-BFR. A parameter csi-RS may indicate an ID of a NZP-CSI-RS-Resource configured in the CSI-MeasConfig of this serving cell. This reference signal may determine a candidate beam for beam failure recovery (BFR). A parameter ra-OccasionList may indicate RA occasions that the wireless device may use when performing BFR upon selecting the candidate beam identified by this CSI-RS. The network may ensure that the RA occasion indexes provided herein are also configured by prach-ConfigurationIndex and msg1-FDM. A RACH occasion may be sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots. If the field is absent the UE may use the RA occasion associated with the SSB that is QCLed with this CSI-RS. A parameter ra-PreambleIndex may indicate the RA preamble index to use in the RA occasions associated with this CSI-RS. If the field is absent, the wireless device may use the preamble index associated with the SSB that is QCLed with this CSI-RS.

In an example, beamFailureDetectionTimer and beamFailureInstanceMaxCount may be configured cell specifically per each DL BWP configured.

In an example, upon reconfiguration of beamFailureDetectionTimer, beamFailureInstanceMaxCount, or one or more reference signals used for beam failure detection on a serving cell by upper layers, BFI_COUNTER may be set to 0 for the given Serving Cell.

In an example, when SCell BFR SR resource is not configured and SCell BFR MAC CE transmission triggers SCell BFR SR, Random Access procedure on SpCell may be triggered to request UL resources to transmit the SCell BFR MAC CE.

In an example, when SCell BFR SR is triggered and the UE has an overlapping SR PUCCH resource with the SCell BFR SR PUCCH resource, the UE may select the SCell BFR SR PUCCH resource for transmission.

In an example, pending SR for SCell beam failure recovery triggered prior to the MAC PDU assembly may be cancelled when the MAC PDU is transmitted and this PDU includes a SCell BFR MAC CE.

In an example, SCell BFR MAC CE may carry information of multiple failed SCells, e.g., multiple entry format for SCell BFR MAC CE may be defined.

In an example, for an SCell, the SCell BFR MAC CE may indicate the following information: information about the failed SCell index; indication if a new candidate beam RS is detected or not; new candidate beam RS index (if available).

In an example, SCell BFR MAC CE may have higher priority at least than "data from any Logical Channel, except data from UL-CCCH" and LBT MAC CE.

In an example, upon receiving N310 consecutive "out-of-sync" indications for a cell (e.g., the SpCell) from lower layers while neither T300, T301, T304, T311 nor T319 timers are running: The wireless device may start timer T310 for the corresponding cell (e.g., SpCell).

In an example, upon receiving N311 consecutive "in-sync" indications for a cell (e.g., the SpCell) from lower layers while T310 is running, the wireless device may stop timer T310 for the corresponding cell (e.g., SpCell).

In an example, upon T310 expiry in a cell (e.g., PCell); or upon random access problem indication from MCG MAC while neither T300, T301, T304, T311 nor T319 are running; or upon indication from MCG RLC that the maximum number of retransmissions has been reached: if the indication is from MCG RLC and CA duplication is configured and activated, and for the corresponding logical channel allowedServingCells only includes SCell(s), the wireless device may initiate a failure information procedure to report RLC failure. Otherwise, the wireless device may consider radio link failure to be detected for the MCG i.e., RLF.

In an example, upon T310 expiry in a cell (e.g., PSCell); or upon random access problem indication from SCG MAC; or upon indication from SCG RLC that the maximum number of retransmissions has been reached: if the indication is from SCG RLC and CA duplication is configured and activated; and for the corresponding logical channel allowedServingCells only includes SCell(s): the wireless device may initiate a failure information procedure to report RLC failure. Otherwise, the wireless device may consider radio link failure to be detected for the SCG, i.e. SCG RLF. The wireless device may initiate a SCG failure information procedure to report SCG radio link failure.

In an example, an IE RadioLinkMonitoringConfig may be used to configure radio link monitoring for detection of beam- and/or cell radio link failure. A parameter beamFailureDetectionTimer may indicate a timer for beam failure detection. Value may be in number of "Qout,LR reporting periods of Beam Failure Detection" Reference Signal. Value pbfd1 may correspond to 1 Qout,LR reporting period of Beam Failure Detection Reference Signal, value pbfd2 may correspond to 2 Qout,LR reporting periods of Beam Failure Detection Reference Signal and so on. A parameter beamFailureInstanceMaxCount may determine after how many beam failure events the wireless device may trigger beam failure recovery. Value n1 may correspond to 1 beam failure instance, value n2 may correspond to 2 beam failure instances and so on. A parameter failureDetectionResourcesToAddModList may indicate a list of reference signals for detecting beam failure and/or cell level radio link failure (RLF). The network may configure at most two detectionResources per BWP for the purpose beamFailure or both. If no RSs are provided for the purpose of beam failure detection, the wireless device may perform beam monitoring based on the activated TCI-State for PDCCH. If no RSs are provided in this list for the purpose of RLF detection, the wireless device may perform Cell-RLM based on the activated TCI-State of PDCCH. The network may ensure that the wireless device has a suitable set of reference signals for performing cell-RLM. A parameter detectionResource may indicate a reference signal that the wireless device may use for radio link monitoring or beam failure detection (depending on the indicated purpose). A parameter purpose may determine whether the wireless device may monitor the associated reference signal for the purpose of cell- and/or beam failure detection.

In an example, an IE RadioLinkMonitoringRS-Id may be used to identify a RadioLinkMonitoringRS.

In an example, in RRC_CONNECTED, a wireless device may perform Radio Link Monitoring (RLM) in the active BWP based on reference signals (SSB/CSI-RS) and signal quality thresholds configured by the network. SSB-based RLM may be based on the SSB associated to the initial DL BWP and may be configured for the initial DL BWP and for DL BWPs containing the SSB associated to the initial DL BWP. For other DL BWPs, RLM may be performed based on CSI-RS.

In an example, a wireless device may declare Radio Link Failure (RLF) when one of the following criteria are met: expiry of a timer started after indication of radio problems from the physical layer (if radio problems are recovered before the timer is expired, the wireless device may stop the timer); or Random access procedure failure; or RLC failure.

After RLF is declared, the wireless device: may stay in RRC_CONNECTED; may select a suitable cell and then initiate RRC re-establishment; and may enter RRC_IDLE if a suitable cell was not found within a certain time after RLF was declared.

In an example, Network controlled mobility may apply to UEs in RRC_CONNECTED and may be categorized into two types of mobility: cell level mobility and beam level mobility.

Figure 18:
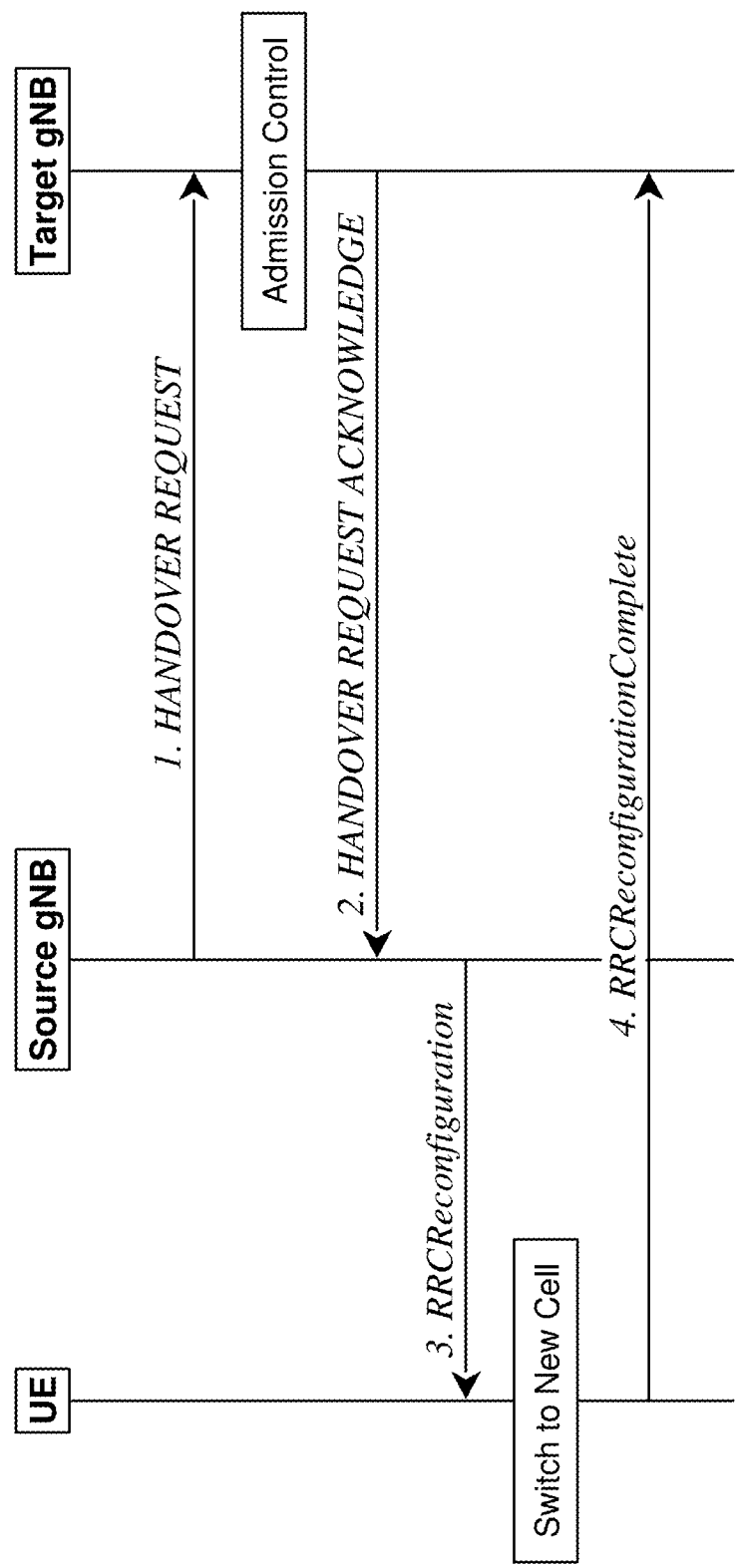
FIG. 18 shows an example signaling procedures for handover in accordance with several of various embodiments of the present disclosure.

In an example, cell level mobility may require explicit RRC signaling to be triggered, e.g., handover. For inter-gNB handover, the signaling procedures may comprise at least the following elemental components as shown in FIG. 18. The source gNB may initiate handover and may issue a HANDOVER REQUEST over the Xn interface. The target gNB may perform admission control and may provide the new RRC configuration as part of the HANDOVER REQUEST ACKNOWLEDGE. The source gNB may provide the RRC configuration to the wireless device by forwarding the RRCReconfiguration message received in the HANDOVER REQUEST ACKNOWLEDGE. The RRCReconfiguration message may include at least cell ID and information required to access the target cell so that the wireless device may access the target cell without reading system information. For some cases, the information required for contention-based and contention-free random access may be included in the RRCReconfiguration message. The access information to the target cell may include beam specific information, if any.

The wireless device may move the RRC connection to the target gNB and may reply with the RRCReconfigurationComplete.

In an example, a handover mechanism triggered by RRC may require the wireless device at least to reset the MAC entity and re-establish RLC. RRC managed handovers with and without PDCP entity re-establishment may be both supported. For DRBs using RLC AM mode, PDCP may either be re-established together with a security key change or may initiate a data recovery procedure without a key change. For DRBs using RLC UM mode and for SRBs, PDCP may either be re-established together with a security key change or may remain as it is without a key change.

In an example, data forwarding, in-sequence delivery and duplication avoidance at handover may be guaranteed when the target gNB uses the same DRB configuration as the source gNB.

In an example, timer-based handover failure procedure may be supported in NR. RRC connection re-establishment procedure may be used for recovering from handover failure.

In an example, beam level mobility may not require explicit RRC signaling to be triggered. The gNB may provide, via RRC signaling, the wireless device with measurement configuration containing configurations of SSB/CSI resources and resource sets, reports and trigger states for triggering channel and interference measurements and reports. Beam level mobility may then be dealt with at lower layers by means of physical layer and MAC layer control signaling, and RRC may not be required to know which beam is being used at a given point in time.

In an example, SSB-based beam level mobility may be based on the SSB associated to the initial DL BWP and may be configured for the initial DL BWPs and for DL BWPs containing the SSB associated to the initial DL BWP. For other DL BWPs, beam level mobility may be performed based on CSI-RS.

Figure 19:
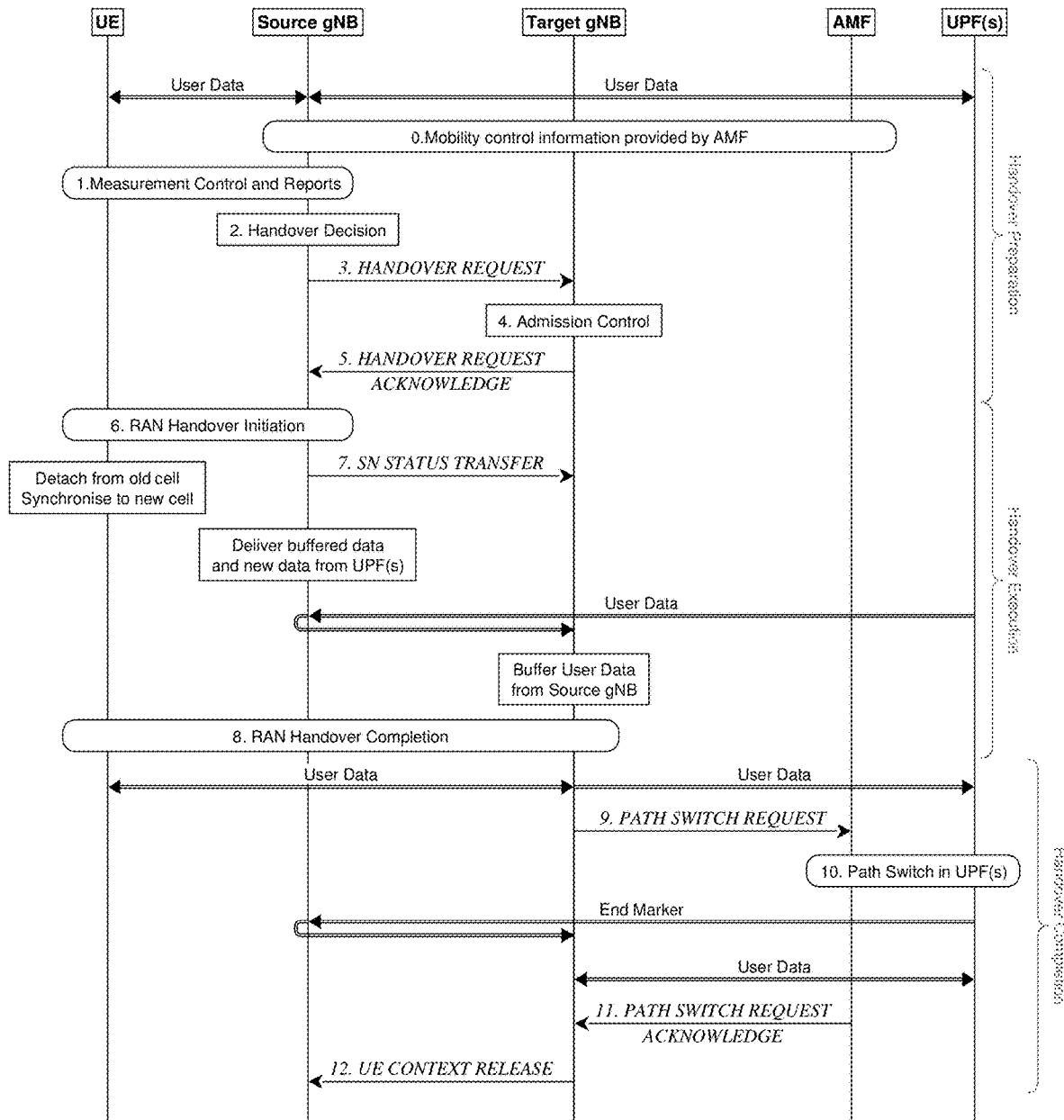
FIG. 19 shows an example handover scenario in accordance with several of various embodiments of the present disclosure.

In an example, the intra-NR RAN handover may perform the preparation and execution phase of the handover procedure performed without involvement of the 5GC, e.g., preparation messages may be directly exchanged between the gNBs. The release of the resources at the source gNB during the handover completion phase may be triggered by the target gNB. FIG. 19 shows an example basic handover scenario where neither the AMF nor the UPF changes:

0. The UE context within the source gNB may contain information regarding roaming and access restrictions which may be provided either at connection establishment or at the last TA update.
1. The source gNB may configure the UE measurement procedures and the UE may report according to the measurement configuration.
2. The source gNB may decide to handover the UE, based on MeasurementReport and RRM information.
3. The source gNB may issue a Handover Request message to the target gNB passing a transparent RRC container with necessary information to prepare the handover at the target side. The information may include at least the target cell ID, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and may include the UE reported measurement information including beam-related information if available. The PDU session related information may include the slice information and QoS flow level QoS profile(s).
4. Admission Control may be performed by the target gNB. Slice-aware admission control may be performed if the slice information is sent to the target gNB. If the PDU sessions are associated with non-supported slices the target gNB may reject such PDU sessions.
5. The target gNB may prepare the handover with L1/L2 and sends the HANDOVER REQUEST ACKNOWLEDGE to the source gNB, which may include a transparent container to be sent to the UE as an RRC message to perform the handover.
6. The source gNB may trigger the Uu handover by sending an RRCReconfiguration message to the UE, containing the information required to access the target cell: at least the target cell ID, the new C-RNTI, the target gNB security algorithm identifiers for the selected security algorithms. It may also include a set of dedicated RACH resources, the association between RACH resources and SSB(s), the association between RACH resources and UE-specific CSI-RS configuration(s), common RACH resources, and system information of the target cell, etc.
7. The source gNB may send the SN STATUS TRANSFER message to the target gNB.
8. The UE may synchronize to the target cell and may complete the RRC handover procedure by sending RRCReconfigurationComplete message to target gNB.
9. The target gNB may send a PATH SWITCH REQUEST message to AMF to trigger 5GC to switch the DL data path towards the target gNB and to establish an NG-C interface instance towards the target gNB.
10. 5GC may switch the DL data path towards the target gNB. The UPF may send one or more "end marker" packets on the old path to the source gNB per PDU session/tunnel and then may release any U-plane/TNL resources towards the source gNB.
11. The AMF may confirm the PATH SWITCH REQUEST message with the PATH SWITCH REQUEST ACKNOWLEDGE message.
12. Upon reception of the PATH SWITCH REQUEST ACKNOWLEDGE message from the AMF, the target gNB may send the UE CONTEXT RELEASE to inform the source gNB about the success of the handover. The source gNB may then release radio and C-plane related resources associated to the UE context. Any ongoing data forwarding may continue.

In an example, the RRM configuration may include both beam measurement information (for layer 3 mobility) associated to SSB(s) and CSI-RS(s) for the reported cell(s) if both types of measurements are available. Also, if carrier aggregation (CA) is configured, the RRM configuration may include the list of best cells on each frequency for which measurement information is available. The RRM measurement information may also include the beam measurement for the listed cells that belong to the target gNB.

In an example, the common RACH configuration for beams in the target cell may be associated to the SSB(s). The network may have dedicated RACH configurations associated to the SSB(s) and/or may have dedicated RACH configurations associated to CSI-RS(s) within a cell. The target gNB may include one of the following RACH configurations in the Handover Command to enable the UE to access the target cell: Common RACH configuration; Common RACH configuration+Dedicated RACH configuration associated with SSB; Common RACH configuration+Dedicated RACH configuration associated with CSI-RS.

In an example, the dedicated RACH configuration may allocate RACH resource(s) together with a quality threshold to use them. When dedicated RACH resources are provided, they may be prioritized by the UE and the UE may not switch to contention-based RACH resources as long as the quality threshold of those dedicated resources is met. The order to access the dedicated RACH resources may be up to UE implementation.

In an example, the U-plane handling during the Intra-NR-Access mobility activity for UEs in RRC_CONNECTED may take the following principles into account to avoid data loss during HO: During HO preparation, U-plane tunnels may be established between the source gNB and the target gNB; During HO execution, user data may be forwarded from the source gNB to the target gNB; Forwarding may take place in order as long as packets are received at the source gNB from the UPF or the source gNB buffer has not been emptied. During HO completion: the target gNB may send a path switch request message to the AMF to inform that the UE has gained access and the AMF then may trigger path switch related 5GC internal signaling and actual path switch of the source gNB to the target gNB in UPF; the source gNB may continue forwarding data as long as packets are received at the source gNB from the UPF or the source gNB buffer has not been emptied.

Figure 20:
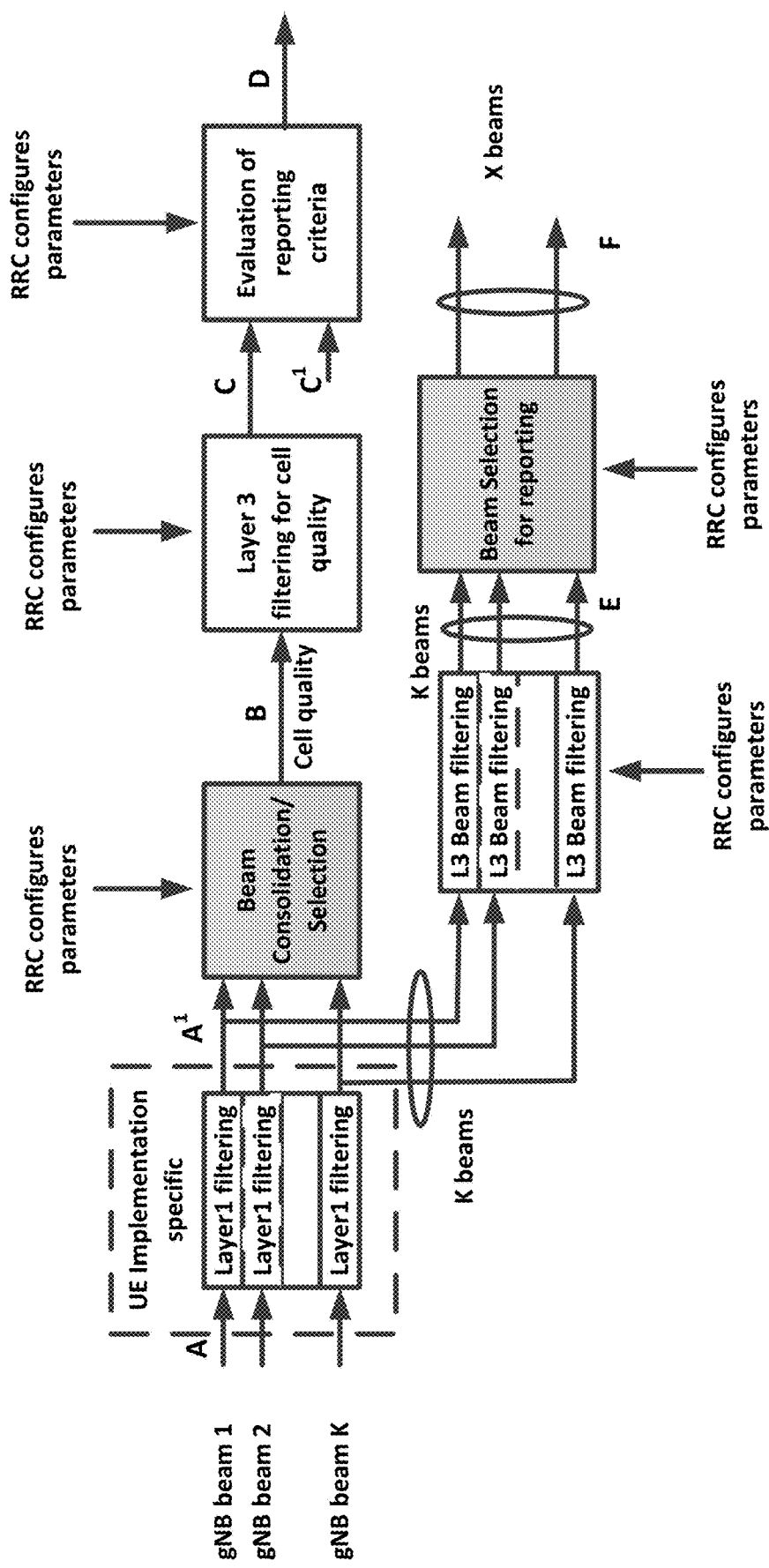
FIG. 20 shows an example measurement process in accordance with several of various embodiments of the present disclosure.

In an example, in RRC_CONNECTED, the wireless device may measure multiple beams (at least one) of a cell and the measurement results (power values) may be averaged to derive the cell quality. In doing so, the UE may be configured to consider a subset of the detected beams. Filtering may take place at two different levels: at the physical layer to derive beam quality and then at RRC level to derive cell quality from multiple beams. Cell quality from beam measurements may be derived in the same way for the serving cell(s) and for the non-serving cell(s). Measurement reports may contain the measurement results of the X best beams if the UE is configured to do so by the gNB. An example measurement process is shown in FIG. 20.

A: measurements (beam specific samples) internal to the physical layer.

Layer 1 filtering: internal layer 1 filtering of the inputs measured at point A. Exact filtering may be implementation dependent.

A1: measurements (e.g., beam specific measurements) may be reported by layer 1 to layer 3 after layer 1 filtering.

Beam Consolidation/Selection: beam specific measurements may be consolidated to derive cell quality.

B: a measurement (e.g., cell quality) derived from beam-specific measurements may be reported to layer 3 after beam consolidation/selection.

Layer 3 filtering for cell quality: filtering performed on the measurements provided at point B.

C: a measurement after processing in the layer 3 filter. The reporting rate may be identical to the reporting rate at point B. This measurement may be used as input for one or more evaluation of reporting criteria.

Evaluation of reporting criteria: may check whether actual measurement reporting is necessary at point D. The evaluation may be based on more than one flow of measurements at reference point C e.g. to compare between different measurements. This is illustrated by input C and C1. The UE may evaluate the reporting criteria at least every time a new measurement result is reported at point C, C1.

D: measurement report information (message) sent on the radio interface.

L3 Beam filtering: filtering performed on the measurements (e.g., beam specific measurements) provided at point A1.

E: a measurement (e.g., beam-specific measurement) after processing in the beam filter. The reporting rate may be identical to the reporting rate at point A1. This measurement may be used as input for selecting the X measurements to be reported.

Beam Selection for beam reporting: may select the X measurements from the measurements provided at point E.

F: beam measurement information included in measurement report (sent) on the radio interface.

In an example, measurement reports may be characterized by the following: measurement reports may include the measurement identity of the associated measurement configuration that triggered the reporting; cell and beam measurement quantities to be included in measurement reports may be configured by the network; the number of non-serving cells to be reported may be limited through configuration by the network; cells belonging to a blacklist configured by the network may not be used in event evaluation and reporting, and conversely when a whitelist is configured by the network, only the cells belonging to the whitelist may be used in event evaluation and reporting; Beam measurements to be included in measurement reports may be configured by the network.

In an example, intra-frequency neighbor (cell) measurements and inter-frequency neighbor (cell) measurements may be defined as follows: SSB based intra-frequency measurement: a measurement is defined as an SSB based intra-frequency measurement provided the center frequency of the SSB of the serving cell and the center frequency of the SSB of the neighbor cell are the same, and the subcarrier spacing of the two SSBs may also be the same. SSB based inter-frequency measurement: a measurement may be defined as an SSB based inter-frequency measurement provided the center frequency of the SSB of the serving cell and the center frequency of the SSB of the neighbor cell are different, or the subcarrier spacing of the two SSBs is different. For SSB based measurements, one measurement object may correspond to one SSB and the UE may consider different SSBs as different cells. CSI-RS based intra-frequency measurement: a measurement may be defined as a CSI-RS based intra-frequency measurement provided the bandwidth of the CSI-RS resource on the neighbor cell configured for measurement is within the bandwidth of the CSI-RS resource on the serving cell configured for measurement, and the subcarrier spacing of the two CSI-RS resources is the same. CSI-RS based inter-frequency measurement: a measurement may be defined as a CSI-RS based inter-frequency measurement provided the bandwidth of the CSI-RS resource on the neighbor cell configured for measurement is not within the bandwidth of the CSI-RS resource on the serving cell configured for measurement, or the subcarrier spacing of the two CSI-RS resources may be different.

In an example, whether a measurement is non-gap-assisted or gap-assisted may depend on the capability of the UE, the active BWP of the UE and the current operating frequency: For SSB based inter-frequency, a measurement gap configuration may be provided in the following cases: If the UE only supports per-UE measurement gaps; If the UE supports per-FR measurement gaps and any of the configured BWP frequencies of any of the serving cells are in the same frequency range of the measurement object. For SSB based intra-frequency measurement, a measurement gap configuration may be provided in the following case: Other than the initial BWP, if any of the UE configured BWPs do not contain the frequency domain resources of the SSB associated to the initial DL BWP.

In an example, in non-gap-assisted scenarios, the UE may be able to carry out such measurements without measurement gaps. In gap-assisted scenarios, the UE may not be assumed to be able to carry out such measurements without measurement gaps.

In an example, an IE MeasConfig may specify measurements to be performed by the UE, and may cover intra-frequency, inter-frequency and inter-RAT mobility as well as configuration of measurement gaps. A parameter measGapConfig may be used to setup and release measurement gaps in NR. A parameter measIdToAddModList may indicate a list of measurement identities to add and/or modify. A parameter measIdToRemoveList may indicate a list of measurement identities to remove. A parameter measObjectToAddModListmay indicate a list of measurement objects to add and/or modify. A parameter reportConfigToAddModList may indicate a list of measurement reporting configurations to add and/or modify. A parameter reportConfigToRemoveList may indicate a list of measurement reporting configurations to remove. A parameter s-MeasureConfig may indicate a threshold for NR SpCell RSRP measurement controlling when the UE is required to perform measurements on non-serving cells. Choice of ssb-RSRP corresponds to cell RSRP based on SS/PBCH block and choice of csi-RSRP corresponds to cell RSRP of CSI-RS. A parameter measGapSharingConfig may specifiy the measurement gap sharing scheme and controls setup/release of measurement gap sharing.

In an example, an IE MeasId may be used to identify a measurement configuration, e.g., linking of a measurement object and a reporting configuration.

In an example, an IE MeasIdToAddModList may concern a list of measurement identities to add or modify, with for each entry the measId, the associated measObjectId and the associated reportConfigId. In an example, an IE MeasObjectId may be used to identify a measurement object configuration.

In an example, an IE MeasObjectNR may specify information applicable for SS/PBCH block(s) intra/inter-frequency measurements and/or CSI-RS intra/inter-frequency measurements. A parameter cellIndividualOffset may indicate cell individual offsets applicable to a specific cell. A parameter physCellId may indicate physical cell identity of a cell in the cell list. A parameter absThreshCSI-RS-Consolidation may indicate absolute threshold for the consolidation of measurement results per CSI-RS resource(s) from L1 filter(s). The field may be used for the derivation of cell measurement results and the reporting of beam measurement information per CSI-RS resource. A parameter absThreshSS-BlocksConsolidation may indicate absolute threshold for the consolidation of measurement results per SS/PBCH block(s) from L1 filter(s). The field may be used for the derivation of cell measurement results and the reporting of beam measurement information per SS/PBCH block index. A parameter blackCellsToAddModList may indicate a list of cells to add/modify in the black list of cells. It may apply to SSB resources. A parameter blackCellsToRemoveList may indicate a list of cells to remove from the black list of cells. A parameter cellsToAddModList may indicate a list of cells to add/modify in the cell list. A parameter cellsToRemoveList may indicate a list of cells to remove from the cell list. A parameter freqBandIndicatorNR may indicate a frequency band in which the SSB and/or CSI-RS indicated in this MeasObjectNR may be located and according to which the UE may perform the RRM measurements. This field may be provided when the network configures measurements with this MeasObjectNR. A parameter measCycleSCell may be used when an SCell is configured on the frequency indicated by the measObjectNR and is in deactivated state. gNB may configure the parameter whenever an SCell is configured on the frequency indicated by the measObjectNR. The field may also be signalled when an SCell is not configured. A parameter nrofCSInrofCSI-RS-ResourcesToAverage may indicate the maximum number of measurement results per beam based on CSI-RS resources to be averaged. The same value applies for each detected cell associated with this MeasObjectNR. A parameter offsetMO may indicate values applicable to all measured cells with reference signal(s) indicated in this MeasObjectNR. A parameter quantityConfigIndex may indicate the n-th element of quantityConfigNR-List provided in MeasConfig. A parameter referenceSignalConfig may indicate RS configuration for SS/PBCH block and CSI-RS. A parameter refFreqCSI-RS may indicate point A which may be used for mapping of CSI-RS to physical resources. A parameter ssbFrequency may indicate the frequency of the SS associated to this MeasObjectNR. A parameter ssbSubcarrierSpacing may indicate subcarrier spacing SSB. A parameter whiteCellsToAddModList may indicate list of cells to add/modify in the white list of cells. It may apply to SSB resources. A parameter whiteCellsToRemoveList may indicate a list of cells to remove from the white list of cells.

In an example, an IE MeasObjectToAddModList may concern a list of measurement objects to add or modify. In an example, an IE MeasResults may cover measured results for intra-frequency, inter-frequency, and inter-RAT mobility.

In an example, an IE SearchSpace may define how/where to search for PDCCH candidates. A search space may be associated with a ControlResourceSet. In an example, a parameter common may indicate that a search space is common search space (CSS) and may indicate DCI formats to monitor. A parameter controlResourceSetId may indicate the CORESET applicable for the SearchSpace. A parameter duration may indicate a number of consecutive slots that a SearchSpace may last in an occasion, e.g., upon a period as given in the periodicityAndOffset. If the field is absent, the wireless device may apply the value 1 slot, except for DCI format 2_0. The wireless device may ignore this field for DCI format 2_0. The maximum valid duration may be periodicity-1 (periodicity as given in the monitoringSlotPeriodicityAndOffset). The parameter monitoringSlotPeriodicityAndOffset may indicate slots for PDCCH Monitoring configured as periodicity and offset. The parameter monitoringSymbolsWithinSlot may indicate the first symbol(s) for PDCCH monitoring in the slots configured for PDCCH monitoring. The most significant (left) bit may represent the first OFDM in a slot, and the second most significant (left) bit represents the second OFDM symbol in a slot and so on. The bit(s) set to one may identify the first OFDM symbol(s) of the control resource set within a slot. If the cyclic prefix of the BWP is set to extended CP, the last two bits within the bit string may be ignored by the wireless device. The parameter nrofCandidates-SFI may indicate the number of PDCCH candidates specifically for format 2-0 for the configured aggregation level. The parameter searchSpaceId may identity the search space. SearchSpaceId=0 may identify a searchSpaceZero configured via PBCH (MIB) or ServingCellConfigCommon and may not be used in the SearchSpace IE. The searchSpaceId may be unique among the BWPs of a Serving Cell. In case of cross carrier scheduling, search spaces with the same searchSpaceId in scheduled cell and scheduling cell may be linked to each other. The wireless device may apply the search space for the scheduled cell if the DL BWPs in which the linked search spaces are configured in scheduling cell and scheduled cell are both active. The parameter searchSpaceType may indicate whether this is a common search space (present) or a UE specific search space as well as DCI formats to monitor for. The parameter ue-Specific may configure this search space as UE specific search space (USS). The UE may monitor the DCI format with CRC scrambled by C-RNTI, CS-RNTI (if configured), and SP-CSI-RNTI (if configured).

In an example, an IE SearchSpaceId may be used to identify Search Spaces. The ID space may be used across the BWPs of a Serving Cell. The search space with the SearchSpaceId=0 may identify the search space configured via PBCH (MIB) and in ServingCellConfigCommon (searchSpaceZero).

In an example, an IE SearchSpaceZero may be used to configure SearchSpace #0 of the initial BWP. The IE PDCCH-Config may be used to configure UE specific PDCCH parameters such as control resource sets (CORESET), search spaces and additional parameters for acquiring the PDCCH. In an example, a parameter controlResourceSetToAddModList may indicate a list of UE specifically configured Control Resource Sets (CORESETs) to be used by the wireless device. In an example, an IE PDCCH-ConfigCommon may be used to configure cell specific PDCCH parameters provided in SIB as well as in dedicated signaling. In an example, an IE ControlResourceSet may be used to configure a time/frequency control resource set (CORESET) in which to search for downlink control information. In an example, a ControlResourceSetId IE may indicate a short identity, used to identify a control resource set within a serving cell. The IE ControlResourceSetZero may be used to configure CORESET #0 of the initial BWP.

In an example, a set of PDCCH candidates for a wireless device to monitor may be defined in terms of PDCCH search space sets. A search space set may be a common search space (CSS) set or a UE-specific search space (USS) set. A wireless device may monitor PDCCH candidates in one or more of the following example types of search spaces sets a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by paging-SearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

In an example, an IE PDCCH-ConfigCommon may be used to configure cell specific PDCCH parameters provided in SIB as well as in dedicated signaling. The parameter ra-SearchSpace may indicate ID of the Search space for random access procedure. If the field is absent, the UE may not receive RAR in this BWP.

In an example, an IE BeamFailureRecoveryConfig may be used to configure the UE with RACH resources and candidate beams for beam failure recovery in case of beam failure detection. The parameter recoverySearchSpaceId may indicate search space to use for BFR RAR. The network configures this search space to be within the linked DL BWP (i.e., within the DL BWP with the same bwp-Id) of the UL BWP in which the BeamFailureRecoveryConfig is provided. The CORESET associated with the recovery search space cannot be associated with another search space. Network always configures the UE with a value for this field when contention free random access resources for BFR are configured. The parameter ra-OccasionList may indicate RA occasions that the UE may use when performing BFR upon selecting the candidate beam identified by a CSI-RS. The network may ensure that the RA occasion indexes provided herein are also configured by prach-ConfigurationIndex and msg1-FDM. A RACH occasion may be sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots. If the field is absent the UE may use the RA occasion associated with the SSB that is QCLed with CSI-RS.

In an example, an IE CrossCarrierSchedulingConfig may be used to specify the configuration when the cross-carrier scheduling is used in a cell. A parameter cif-Presence may indicate whether carrier indicator field is present (value true) or not (value false) in PDCCH DCI formats. If cif-Presence is set to true, the CIF value indicating a grant or assignment for this cell may be 0. The parameter cif-InSchedulingCell may indicate the CIF value used in the scheduling cell to indicate a grant or assignment applicable for the cell being scheduled. In an example an IE other may indicate parameters for cross-carrier scheduling, e.g., a serving cell being scheduled by a PDCCH on another (scheduling) cell. The IE own may indicate parameters for self-scheduling, e.g., a serving cell being scheduled by its own PDCCH. The parameter schedulingCellId may indicate which cell signals the downlink allocations and uplink grants, if applicable, for the SCell. In case the wireless device is configured with dual connectivity, the scheduling cell may be part of the same cell group (e.g., MCG or SCG) as the scheduled cell.

With the introduction of new generations of mobile communications, coexistence of multiple communication systems with different radio access technologies in the same frequency band is important. To improve efficiency, different radio access technologies (for example LTE and NR) may dynamically share the spectrum using dynamic spectrum sharing (DSS). Different frequency bands, particularly in lower frequency ranges, may use DSS. As shown in FIG. 16, with dynamic spectrum sharing, each radio access technology may retain the full bandwidth and corresponding peak data rates for each technology. Furthermore, the overall spectrum capacity may be dynamically assigned to match the traffic conditions on each technology. For example, LTE/NR spectrum coexistence may be achieved based on dynamic scheduling of both LTE and NR. Example NR features that enable LTE/NR spectrum coexistence may include: availability of the LTE-compatible 15 kHz NR numerology that allows for LTE and NR to operate on a common time/frequency grid; the possibility to define reserved resources based on bitmaps; and the possibility for NR PDSCH mapping to avoid resource elements corresponding to LTE cell-specific reference signals.

In an example, coexistence between LTE and NR may be in both downlink and uplink. In an example, coexistence between LT and NR may be uplink-only coexistence. An example use case for uplink-only coexistence may be the deployment of a supplementary uplink carrier. An example coexistence in the uplink direction may be based on scheduling coordination/constraints. NR and LTE uplink scheduling may be coordinated to avoid collision between LTE and NR PUSCH transmissions. The NR scheduler may be constrained to avoid resources used for LTE uplink layer 1 control signaling (PUCCH) and vice versa. Depending on the level of interaction between the eNB and gNB, such coordination and constraints may be more or less dynamic.

Scheduling coordination may also be used to avoid collision between scheduled LTE and NR transmissions. The LTE downlink may include several non-scheduled alwayson signals that may not be readily scheduled around. Example such signals include: the LTE PSS and SSS, which may be transmitted over two OFDM symbols and six resource blocks in the frequency domain once every fifth subframe; the LTE PBCH, which may be transmitted over four OFDM symbols and six resource blocks in the frequency domain once every frame; and the LTE CRS, which may be transmitted regularly in the frequency domain and in four or six symbols in every subframe depending on the number of CRS antenna ports. In an example, NR PDSCH may be rate matched around these signals. Rate matching around the LTE PSS/SSS may be done by defining reserved resources according to bitmaps. For example, a single reserved resource given by a {bitmap-1, bitmap-2, bitmap-3} triplet may be defined as follows: a bitmap-1 of a length equal to the number of NR resource blocks in the frequency domain, indicating the six resource blocks within which LTE PSS and SSS are transmitted; a bitmap-2 of length 14 (one slot), indicating the two OFDM symbols within which the PSS and SSS are transmitted within an LTE subframe; a bitmap-3 of length 10 indicating the two subframes within which the PSS and SSS are transmitted within a 10 ms frame. In an example, similar approach may be used to rate match around the LTE PBCH. In an example, PDSCH may be rate matched around resource elements corresponding to CRS of an overlaid LTE carrier.

Figure 17B:
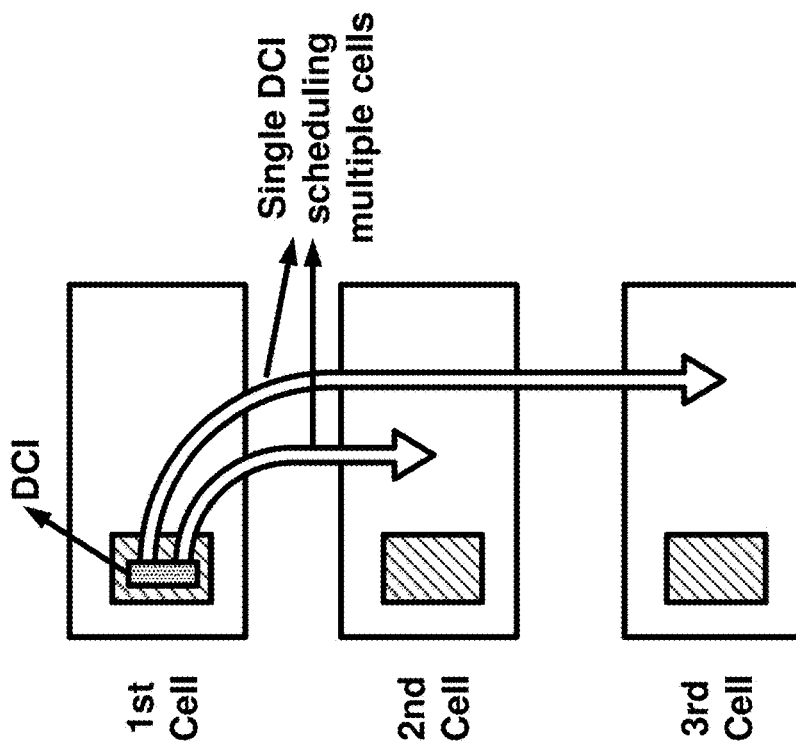
FIG. 17A and FIG. 17B show example cross-carrier scheduling in accordance with several of various embodiments of the present disclosure.
Figure 17A:
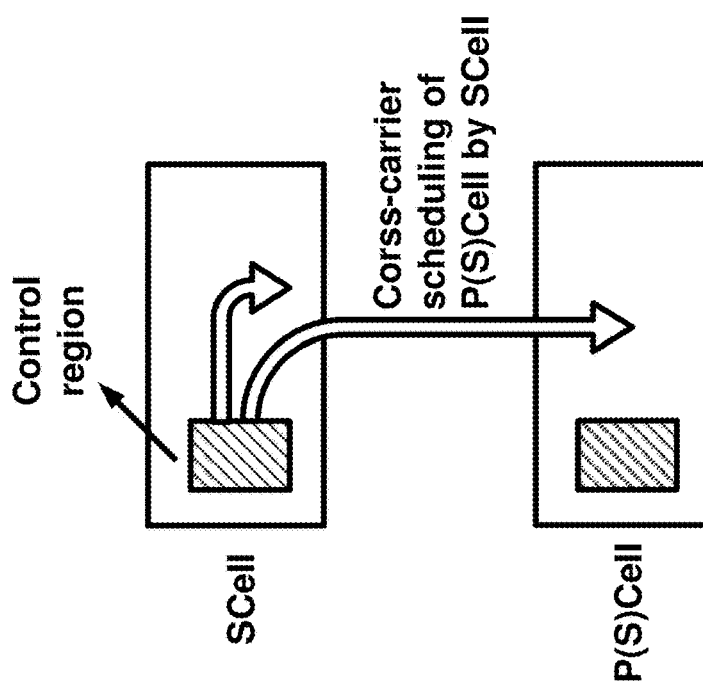

In an example, with carrier aggregation, a DSS cell (e.g., a cell that is dynamically shared between multiple RATs such as LTE and NR) may be a PCell or a SCell. With dynamic spectrum sharing on a DSS cell (e.g., a DSS PCell), the scheduling capacity for NR UEs on the DSS cell may be limited. In an example as shown in FIG. 17A, a SCell (e.g., a non-DSS SCell) may schedule uplink or downlink transmissions (e.g., PDSCH or PUSCH) on PCell (e.g., a DSS PCell). The wireless device may receive downlink control information, for example, indicating downlink assignments or uplink grants on the PCell. In an example as shown in FIG. 17B, to enable PDCCH overhead reduction, a single PDCCH may schedule multiple cells.

In an example, a PDCCH of SCell may schedule PDSCH or PUSCH on P(S)Cell. In an example, PDCCH of P(S)Cell/SCell may schedule PDSCH on multiple cells using a single DCI. The scheduling of P(S)Cell by SCell or scheduling of PDSCH on multiple cells using a single DCI may not be specific to DSS and may be generally applicable to cross-carrier scheduling in carrier aggregation.

With carrier aggregation, a wireless device may be configured with a primary cell and one or more secondary cells. A primary cell may be an anchor cell that carries uplink control information and the secondary cells may be semi-statically configured and dynamically activated or deactivated based on capacity demands. In some scenarios, such as dynamic spectrum sharing, a primary cell for one radio access technology (such as NR) may be dynamically shared with a different radio access technology (such as LTE) leading to control channel capacity issues. To enhance the control channel capacity, cross-carrier scheduling of a primary cell by a secondary cell may be implemented. The cross-carrier scheduling of a primary cell by a secondary cell may lead to inefficiencies in radio link monitoring, beam failure detection and recovery and handover processes leading to inefficient wireless device and network performance. There is a need to enhance the existing radio link monitoring, beam failure detection and recovery and handover processes. Example embodiments enhance the existing radio link monitoring, beam failure detection and recovery and handover processes.

In an example, a wireless device may receive one or more messages comprising configuration parameters. The one or more messages may comprise one or more RRC messages. The one or more messages may comprise configuration parameters of a plurality of cells. The plurality of cells may comprise a primary cell and one or more secondary cells. The plurality of cells may be provided using a carrier aggregation mechanism. The cells in the plurality of cells may be aggregated using intra-band carrier aggregation or inter-band carrier aggregations. In an example, the plurality of cells may correspond to one or more frequency bands. A cell in the plurality of cells may be a dynamic spectrum sharing (DSS) cell, wherein a plurality of radio access technologies (RATs, such as LTE and NR) may share and use the DSS cell using dynamic scheduling and/or other coexistence mechanisms. The DSS may be a primary cell or a secondary cell.

In an example, the plurality of cells may comprise a plurality of cell groups. The plurality of cell groups may be provided by a plurality of base stations. The plurality of base stations may comprise a master base station and one or more secondary base stations. In an example, the master base station may configure the wireless device with the plurality of cell groups. A cell group, in the plurality of cell groups, may be provided by a base station. A cell group provided by a secondary base station (e.g., a secondary cell group (SCG)) may comprise a primary secondary cell (PSCell) and one or more secondary cells. A cell in the SCG (e.g., a PSCell or a SCell) may be a DSS cell.

In an example, the configuration parameters may indicate whether a cell is a self-scheduling cell or whether the cell is cross-carrier scheduled by another cell. The configuration parameters of a cell may comprise a first parameter indicating a choice between self-scheduling or cross-carrier scheduling wherein, for the case of cross-carrier scheduling, a serving cell index of the scheduling cell may be indicated by the configuration parameters. In an example, the configuration parameters may indicate whether a cell cross-carrier schedules another cell.

In an example, the configuration parameters of a cell may comprise PDCCH configuration parameters. The PDCCH configuration parameters may comprise CORESET configuration and search space configuration parameters of CORESETs and search spaces for the cell. The CORESET configuration parameters may indicate frequency domain resources of a CORESET, a time duration of CORESET in number of symbols, an identifier of the CORESET, etc. The search space configuration parameters may indicate configuration parameters for monitoring the search space for downlink control information, for example, a monitoring slot periodicity and offset parameter, a duration parameter, a parameter indicating a monitoring symbol within a slot, a search space type (e.g., common vs. UE specific), an identifier of the search space, etc.

In an example, a wireless device may receive first configuration parameters and radio link monitoring configuration parameters. The first configuration parameters may be for a primary cell and a secondary cell. The primary cell and the secondary cell may be in a cell group (e.g., a MCG or a SCG). The first configuration parameters may indicate that the secondary cell is a scheduling cell for the primary cell. For example, the configuration parameters of the primary cell may comprise a first parameter indicating that the secondary cell is a scheduling cell for the primary cell. For example, the first parameter may indicate a serving cell index of the secondary cell. For example, the configuration parameters of the secondary cell may comprise a second parameter indicating that the secondary cell is a scheduling cell for the primary cell. In an example, the first configuration parameters may indicate that the secondary cell is configured with one or more search spaces/CORESETs for receiving scheduling information for the primary cell. The configuration parameters of the one or more search spaces may indicate that the one or more search spaces are for receiving the scheduling information for the primary cell. In an example, the first configuration parameters may indicate one or more search spaces of a first type for the secondary cell. For example, the one or more search spaces of the first type may comprise a common search space. For example, the one or more search spaces of the first type may comprise at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

The radio link monitoring configuration parameters for the secondary cell may comprise configuration of failure detection resource such as identifiers of reference signals (e.g., SSB and/or or CSI-RS) for radio link monitoring (e.g., for determining cell and/or beam radio link failure occasions), etc. In an example, configuration parameters of a downlink bandwidth part of the secondary cell may comprise a radio link monitoring configuration IE indicating parameters for determining link failure when the downlink bandwidth part is an active bandwidth part of the secondary cell.

Figure 21:
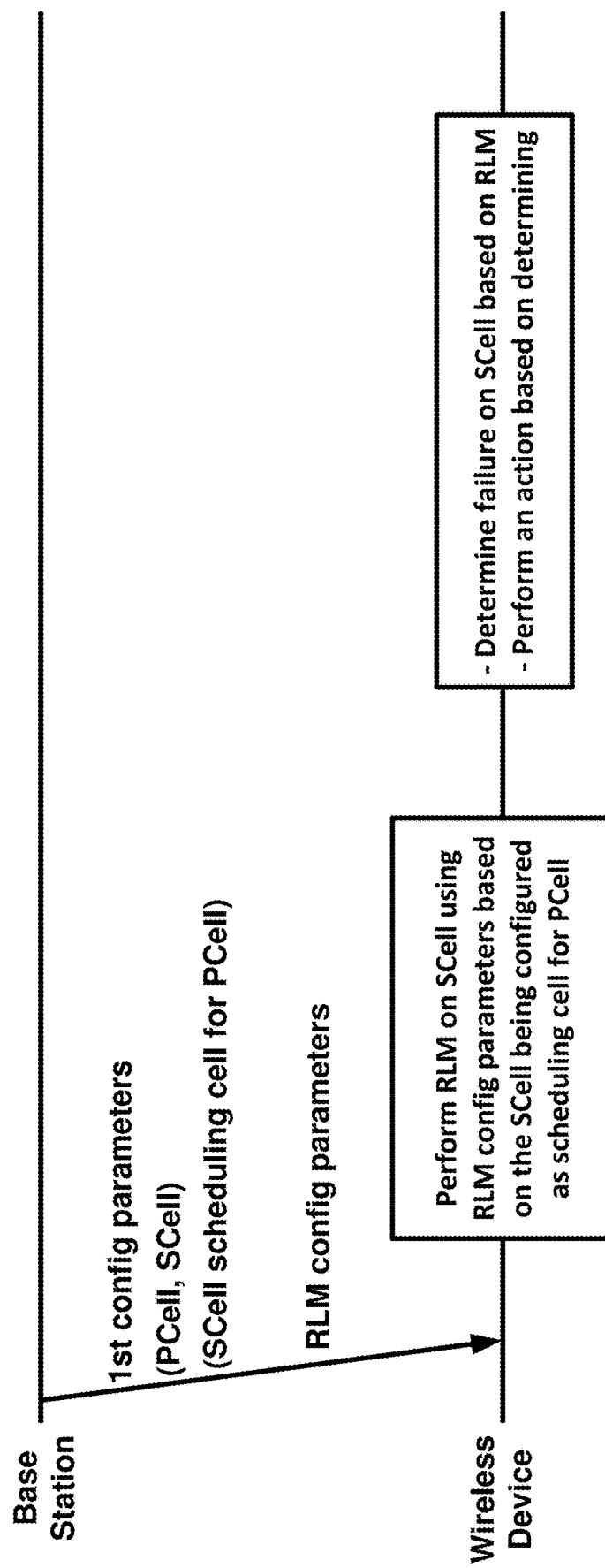
FIG. 21 shows an example process in accordance with several of various embodiments of the present disclosure.

In an example embodiment as shown in FIG. 21, the wireless device may perform a radio link monitoring procedure for the secondary cell. The wireless device may perform the radio link monitoring procedure for the secondary cell based on the first configuration parameters indicating that the secondary cell is a scheduling cell for the primary cell and/or based on the first configuration parameters indicating that the secondary cell is configured with one or more search spaces for receiving scheduling information for the primary cell and/or based on the first configuration parameters indicating that the secondary cell is configured with the one or more search spaces of the first type. The wireless device may perform the radio link monitoring procedure for the secondary cell based on and employing the radio link monitoring configuration parameters for the secondary cell.

The wireless device may determine/detect a failure (e.g., link failure) for the secondary cell based on the radio link monitoring procedure for the secondary cell. The radio link monitoring procedure for the secondary cell may comprise determining a link quality based on the radio link monitoring configuration parameters. The determining the link quality may be based on determining the signal strength/RSSI of one or more reference signals received via the secondary cell. In an example, the determining the link quality may be based on comparing the signal strength/RSSI of the one or more reference signals with one or more thresholds. The configuration parameters may indicate the one or more thresholds. The wireless device may perform an action based on the determining the failure (e.g., link failure) on the secondary cell.

In an example, the one or more first messages may further comprise configuration parameters of a second secondary cell indicating that the secondary cell is not a scheduling cell for the primary cell and/or is not configured with one or more search spaces for receiving scheduling information for the primary cell and/or is not configured with the one or more search spaces of the first type. The configuration parameters may not comprise radio link monitoring configuration parameters for the second secondary cell.

In an example, based on the determining/detecting the failure (e.g., link failure) for the secondary cell, the wireless device may transmit one or more second messages. The one or more second messages may comprise one or more RRC messages. The one or more second messages may indicate the failure (e.g., link failure). The one or more second messages may comprise one or more IEs indicating the failure (e.g., link failure) for the secondary cell. In an example, the one or more second messages may comprise/indicate an identifier of the secondary cell.

In an example, the one or more second messages may comprise a cause parameter indicating the cause of failure as failure (e.g., link failure) on a secondary cell that is a scheduling cell for the primary cell and/or failure (e.g., link failure) on a secondary cell that is configured with one or more search spaces/CORESETs for receiving scheduling information for the primary cell and/or failure (e.g., link failure) on a secondary cell that is configured with the one or more search spaces of a first type. The cause parameter may indicate one or more cause values comprising the cause for failure on a secondary cell that is a scheduling cell for the primary cell.

In an example, the one or more first messages may comprise the radio link monitoring configuration parameters for the secondary cell based on the secondary cell being configured as a scheduling cell for the primary cell and/or based on the secondary cell being configured with one or more search spaces for receiving scheduling information for the primary cell and/or based on the secondary cell being configured with one or more search spaces of first type. The base station may include the configuration parameters for radio link monitoring of the secondary cell if the secondary cell is configured as a scheduling cell for the primary cell and/or if the secondary cell is configured with one or more search spaces for receiving scheduling information for the primary cell and/or if the secondary cell is configured with one or more search spaces of first type.

In an example, the wireless device may receive a reconfiguration message (e.g., an RRC reconfiguration message) based on the performing the action in response to the determining the failure on the secondary cell (e.g., based on the transmitting the one or more second messages and/or PHY/MAC signaling indicating the failure on the secondary cell). The reconfiguration message may indicate a second secondary cell as a scheduling cell for the primary cell based on the failure (e.g., link failure) on the secondary cell.

In an example, the radio link monitoring configuration parameters may comprise one or more thresholds. The determining/detecting the failure (e.g., link failure) on the secondary cell may be based on the one or more thresholds. For example, the one or more thresholds may comprise a first threshold for an out-of-sync indication. The wireless device may determine the failure (e.g., link failure) on the secondary cell by comparing one or more link qualities with the one or more thresholds. For example, the wireless device may determine an out-of-sync event based on a signal strength/RSSI of a reference signal being lower than an out-of-sync threshold. For example, the one or more thresholds may comprise a second threshold for an in-sync indication. For example, the wireless device may determine an in-sync event based on a signal strength/RSSI of a reference signal being higher than an in-sync threshold.

In an example, the determining the failure (e.g., link failure) may be based on an expiry of a timer. The wireless device may start the timer based on a first number of out-of-sync indications from the lower layers (e.g., physical layer indications). An out-of-sync indication may be based on signal strength/RSSI of one or more reference signals being lower than an out-of-sync threshold. The wireless device may stop the timer based on a second number of in-sync indications from the lower layers (e.g., physical layer indications). An in-sync indication may be based on signal strength/RSSI of one or more reference signals being larger than an in-sync threshold.

In an example, the wireless device may transmit MAC layer signaling (e.g., a MAC CE) based on the determining/detecting the failure (e.g., link failure) on the secondary cell. The MAC layer signaling (e.g., MAC CE) may indicate the failure (e.g., link failure) on the secondary cell. In an example, the MAC layer signaling (e.g., MAC CE) may indicate the failure (e.g., link failure) on the secondary cell indicating that the secondary cell is not suitable for scheduling the primary cell. In an example, the MAC CE may comprise/indicate an identifier of the secondary cell. In an example, a logical channel identifier may be associated with the MAC CE. The base station may determine the MAC CCE based on the logical channel identifier. In an example, the MAC CE may comprise zero payload and/or may have zero size. A logical channel identifier associated with the MAC CE may indicate that the MAC CE is for indication of failure (e.g., link failure) on a secondary cell that is a scheduling cell for the primary cell. In an example, the base station may configure one SCell of the wireless device as a scheduling cell of the primary cell and the base station may determine that the current SCell that is a scheduling cell for the primary cell has failure based on receiving the MAC CE. In an example, the MAC CE may comprise one or more fields indicating failure (e.g., link failure) on one or more secondary cells that are scheduling cell for the primary cell. For example, the MAC CE may comprise a plurality of bits, wherein each bit in the plurality of bits may correspond to a secondary cell that is scheduling cell for the primary cell. A value of the bit may indicate whether the secondary cell has failure (link failure).

In an example, the wireless device may transmit physical layer signaling (e.g., uplink control information using an uplink control channel) based on the determining/detecting the failure (e.g., link failure). The wireless device may transmit physical layer signaling (e.g., uplink control information using an uplink control channel) based on the determining/detecting the failure (e.g., link failure) on the secondary cell. In an example, the uplink control information may indicate an identifier of the secondary cell. In an example, the base station may configure one SCell of the wireless device as a scheduling cell of the primary cell and the base station may determine that the current SCell that is a scheduling cell for the primary cell has failure based on receiving the uplink control information.

In an example, the wireless device may receive configuration parameters of an uplink control channel resource for transmission of the uplink control channel indicating the failure (e.g., link failure) on a secondary cell that is a scheduling cell for the primary cell. For example, the uplink control channel resource may be a scheduling request resource. The one or more messages may comprise second configuration parameters of a scheduling request configuration. The scheduling request configuration may be for indicating failure (e.g., link failure) on a secondary cell that is a scheduling cell for the primary cell.

In an example, the radio link monitoring on the secondary cell may comprise determining a decoding error rate for a control channel. The radio link monitoring of the secondary cell may comprise determining a decoding error rate for receiving control information on one or more search spaces of the secondary cell. In an example, the radio link monitoring of the secondary cell may comprise determining a decoding error rate for receiving control information, related to scheduling of the primary cell, on one or more search spaces of the secondary cell. In an example, the one or more search spaces may comprise at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TP C-PUCCH-RNTI (e.g., to receive transmit power control commands for PUSCH or PUCCH) or TPC-SRS-RNTI (e.g., to receive transmit power control commands for SRS).

In an example, the one or more messages may comprise configuration parameters of one or more secondary cell, comprising the secondary cell. The configuration parameters may indicate that the one or more secondary cells are configured as scheduling cell for the primary cell. In an example, the configuration may indicate that the one or more secondary cells are configured with one or more search spaces for receiving scheduling information of the primary cell. In an example, the configuration may indicate that the one or more secondary cells are configured with one or more search spaces of a first type. In an example, the wireless device may receive control signaling (e.g., a DCI or a MAC CE) indicating a secondary cell, in the one or more secondary cell, as a scheduling cell for the primary cell. In an example, the one or more messages may comprise a list (e.g., an ordered list based on a priority) of secondary cells that are scheduling cells for the primary cell. The wireless device may determine a first scheduling cell, in the list of secondary cells, that has highest priority and does not have link failure as an active scheduling cell for the primary cell.

Figure 22:
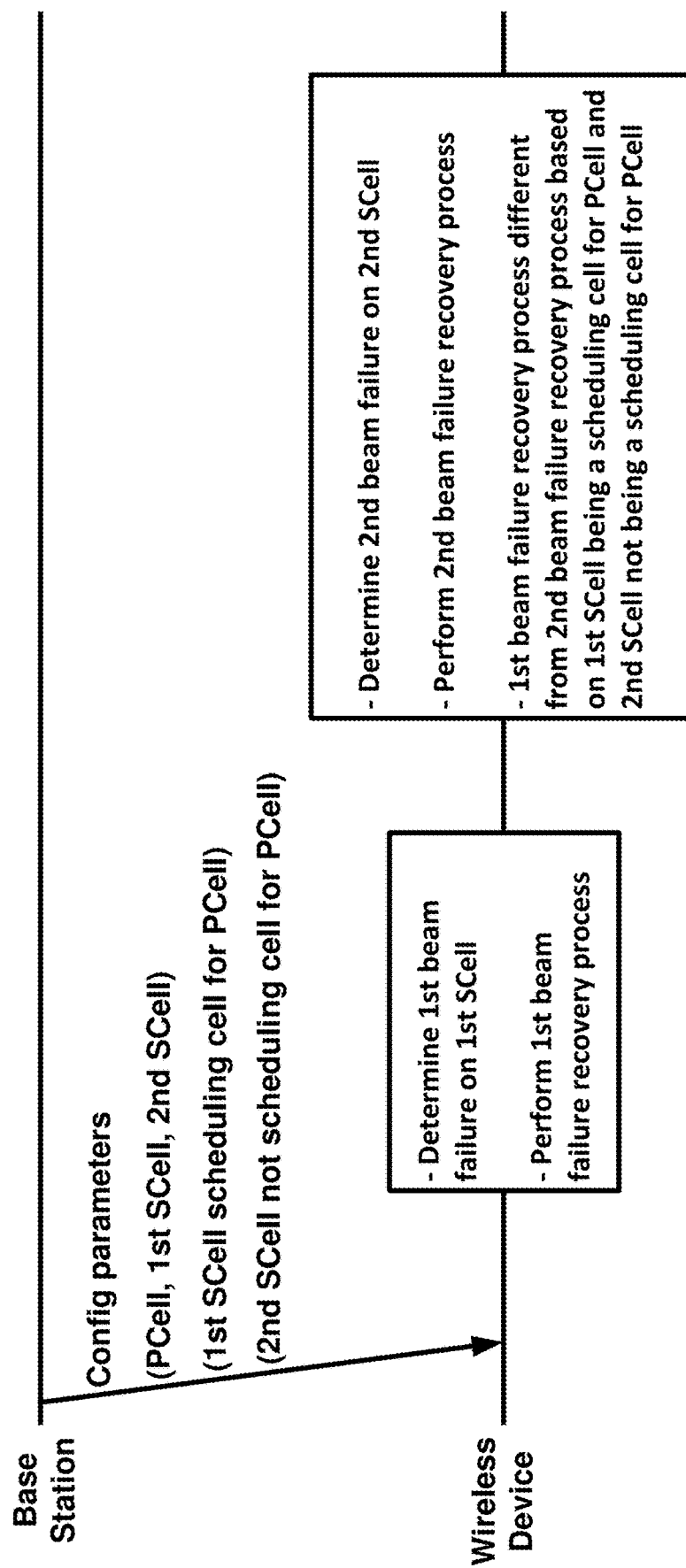
FIG. 22 shows an example process in accordance with several of various embodiments of the present disclosure.

In an example embodiment as shown in FIG. 22, a wireless device may receive configuration parameters of a primary cell, a first secondary cell and a second secondary cell. The primary cell, the first secondary cell and the second secondary cell may be in a cell group (e.g., a MCG or a SCG). The configuration parameters may indicate that the first secondary cell is a scheduling cell for the primary cell. For example, the configuration parameters of the primary cell may comprise a first parameter indicating that the first secondary cell is a scheduling cell for the primary cell. For example, the first parameter may indicate a serving cell index of the first secondary cell. For example, the configuration parameters of the first secondary cell may comprise a second parameter indicating that the first secondary cell is a scheduling cell for the primary cell. In an example, the configuration parameters may indicate that the first secondary cell is configured with one or more search spaces/CORESETs for receiving scheduling information for the primary cell. The configuration parameters of the one or more search spaces may indicate that the one or more search spaces are for receiving the scheduling information for the primary cell. The configuration parameters may indicate that the second secondary cell is not a scheduling cell for the primary cell or may not indicate that the second secondary cell is a scheduling cell for the primary cell. In an example, the configuration parameters may not indicate a search space on the second secondary cell for receiving scheduling information for the primary cell. In an example, the configuration parameters may not indicate a search space of a first type for the second secondary cell. In an example, the configuration parameters may indicate one or more search spaces of a first type for the first secondary cell. For example, the one or more search spaces of the first type may comprise a common search space. For example, the one or more search spaces of the first type may comprise at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

The wireless device may determine/detect a first beam failure for the first secondary cell. The wireless device may determine/detect the first beam failure for the first secondary cell based on a first beam failure instance counter/variable reaching a first value (e.g., a first beam failure instance max count value). In an example, the determining/detecting the first beam failure for the first secondary cell may comprise starting a first beam failure detection timer based on receiving an indication of a beam failure instance for the first secondary cell from the physical layer. In an example, the determining/detecting the first beam failure for the first secondary cell may comprise setting/resetting a first beam failure instance counter to zero based on the first beam failure detection timer expiring.

The wireless device may start a first beam failure recovery process for the first beam failure. The wireless device may start the first beam failure recovery process based on the determining/detecting the first beam failure for the first secondary cell. The first beam failure recovery process may be for indicating, to a base station, the first beam failure for the first secondary cell and/or indicating a first candidate beam for the first secondary cell based on the determining/detecting the first beam failure for the first secondary cell.

The wireless device may determine/detect a second beam failure for the second secondary cell. The wireless device may determine/detect the second beam failure for the second secondary cell based on a second beam failure instance counter/variable reaching a second value (e.g., a second beam failure instance max count value). In an example, the determining/detecting the second beam failure for the second secondary cell may comprise starting a second beam failure detection timer based on receiving an indication of a beam failure instance for the second secondary cell from the physical layer. In an example, the determining/detecting the second beam failure for the second secondary cell may comprise setting/resetting a second beam failure instance counter to zero based on the second beam failure detection timer expiring.

The wireless device may start a second beam failure recovery process for the second beam failure. The wireless device may start the second beam failure recovery process based on the determining/detecting the second beam failure for the second secondary cell. The second beam failure recovery process may be for indicating, to a base station, the second beam failure for the second secondary cell and/or indicating a second candidate beam for the second secondary cell based on the determining/detecting the second beam failure for the second secondary cell.

The first beam failure recovery process may be different from the second beam failure recovery process based on the first secondary cell being a scheduling cell for the primary cell. In an example, the first beam failure recovery process may be different from the second beam failure recovery process based on the first secondary cell being configured with one or more search spaces for receiving scheduling information for the primary cell. In an example, the first beam failure recovery process may be different from the second beam failure recovery process based on the first secondary cell being configured with one or more search spaces of a first type.

In an example, the first beam failure recovery process, for beam failure recovery on the first secondary cell, may comprise starting a random access process. The wireless device may receive configuration parameters for a beam failure recovery random access process. In an example, the wireless device may receive configuration parameters for beam failure recovery random access process on a secondary cell configured as a scheduling cell for the primary cell.

In an example, the second beam failure recovery process for the second secondary cell may comprise transmission of a beam failure recovery MAC CE. The beam failure recovery MAC CE may indicate an identifier of the second secondary cell. In an example, the beam failure recovery MAC CE may indicate whether a new beam RS is detected or not. In an example, the beam failure recovery MAC CE may indicate new candidate beam RS.

In an example, the one or more search spaces of a first type may comprise at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

Figure 23:
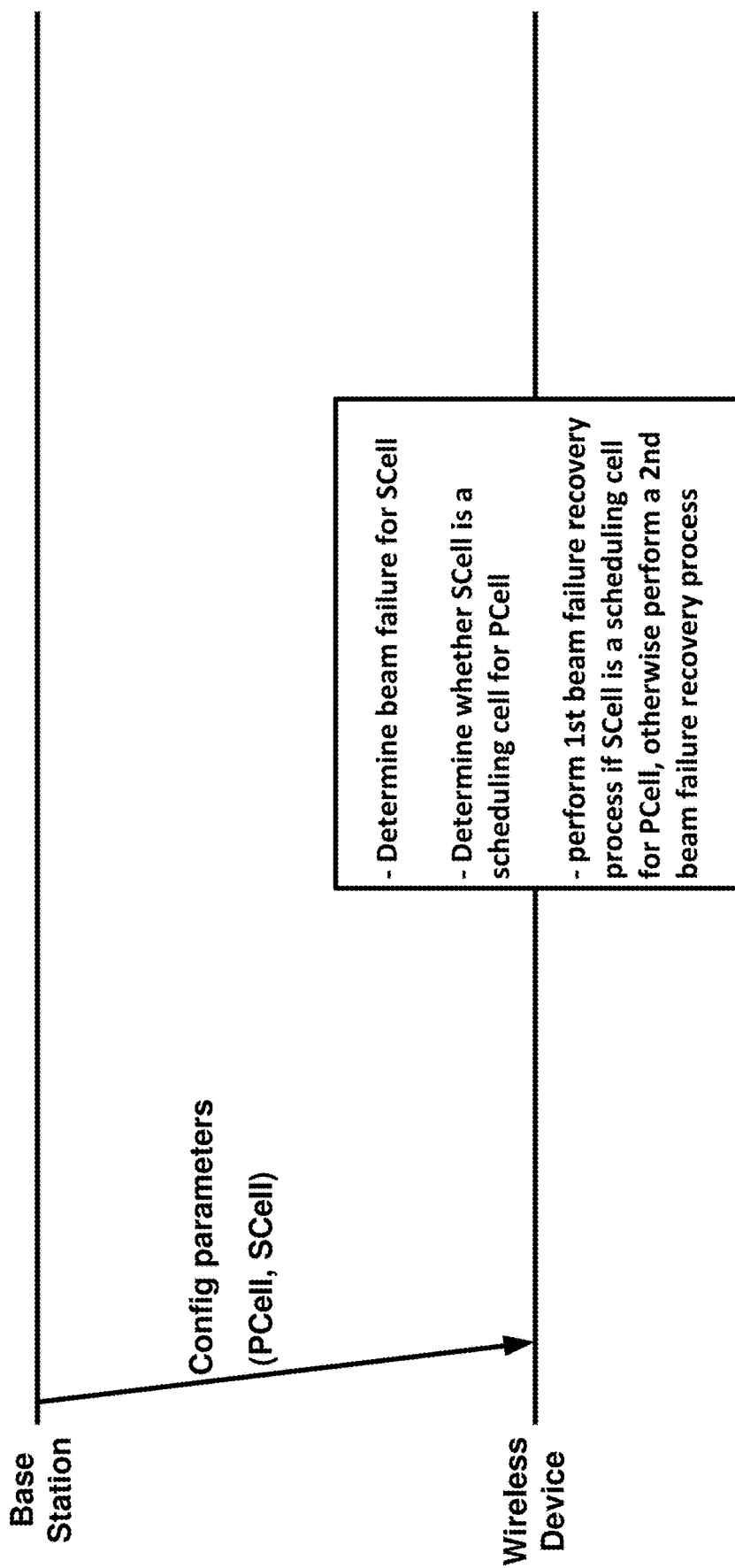
FIG. 23 shows an example process in accordance with several of various embodiments of the present disclosure.

In an example embodiment as shown in FIG. 23, the wireless device may be configured with a primary cell and a secondary cell and the wireless device may determine a beam failure for the secondary cell. The wireless device may determine/detect the beam failure for the secondary cell based on a beam failure instance counter/variable reaching a first value (e.g., a beam failure instance max count value). In an example, the determining/detecting the beam failure for the secondary cell may comprise starting a beam failure detection timer based on receiving an indication of a beam failure instance for the secondary cell from the physical layer. In an example, the determining/detecting the beam failure for the secondary cell may comprise setting/resetting a beam failure instance counter to zero based on the beam failure detection timer expiring.

The wireless device may determine, based on the configuration parameters, whether the secondary cell is configured as a scheduling cell for the primary cell or not. In an example, the wireless device may determine whether the secondary cell is configured with one or more search spaces/CORESETs for receiving scheduling information for the primary cell or not. In an example, the wireless device may determine whether the secondary cell is configured with one or more search spaces of a first type or not.

The wireless device may perform a first type of beam failure recovery process for the secondary cell based on determining that the secondary cell is configured as a scheduling cell for the primary cell or based on determining that the secondary cell is configured with one or more search spaces/CORESETs for receiving scheduling information for the primary cell or based on determining that the secondary cell is configured with one or more search spaces of a first type. Otherwise, the wireless device may perform a second type of beam failure recovery process.

In an example, the first beam failure recovery process may comprise starting a random access process. The wireless device may receive configuration parameters for a beam failure recovery random access process. In an example, the wireless device may receive configuration parameters for beam failure recovery random access process on a secondary cell configured as a scheduling cell for the primary cell.

In an example, the second beam failure recovery process may comprise transmission of a beam failure recovery MAC CE. The beam failure recovery MAC CE may indicate an identifier of the second secondary cell. In an example, the beam failure recovery MAC CE may indicate whether a new beam RS is detected or not. In an example, the beam failure recovery MAC CE may indicate new candidate beam RS.

Figure 24:
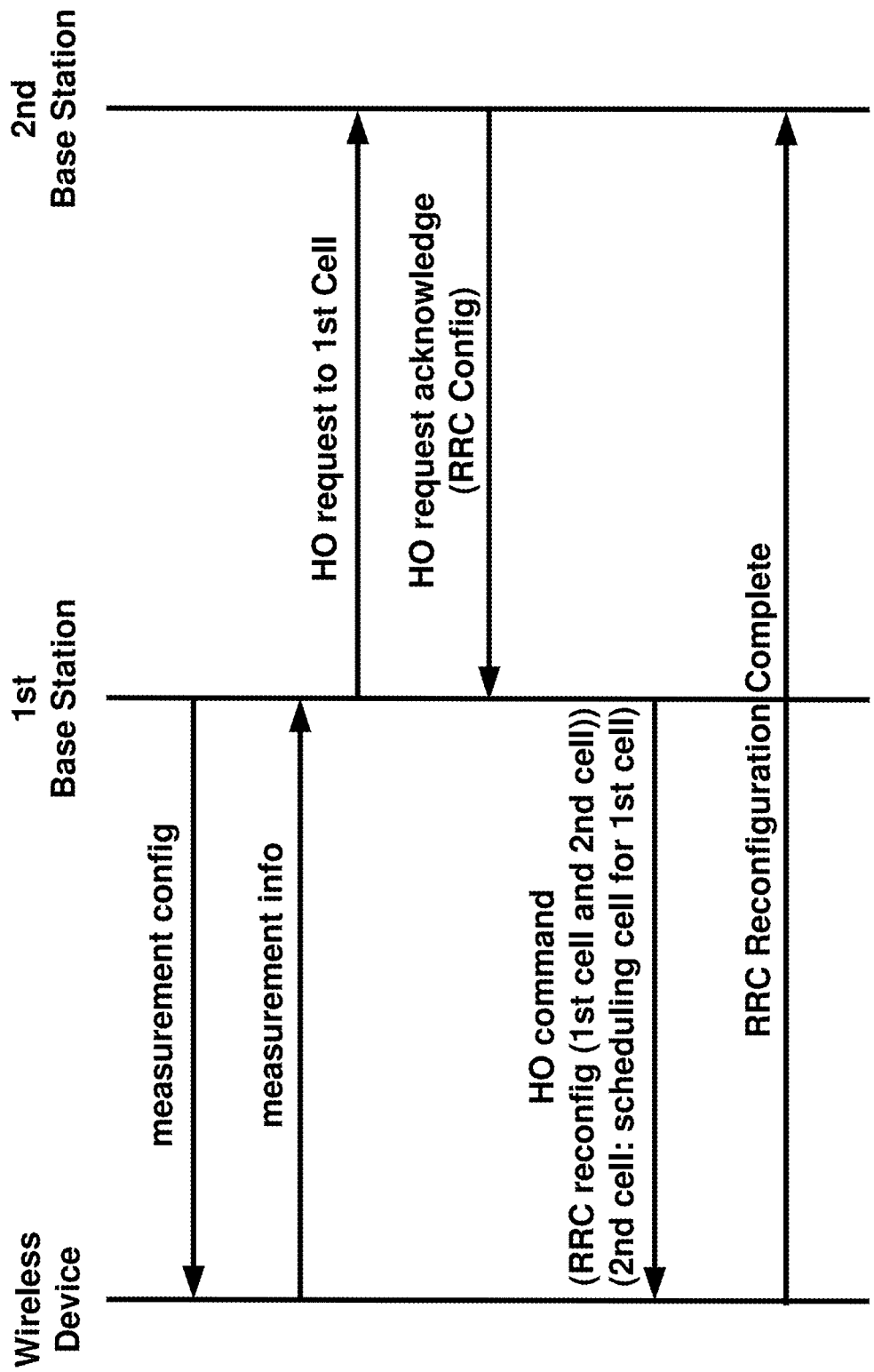
FIG. 24 shows an example process in accordance with several of various embodiments of the present disclosure.

In an example embodiment as shown in FIG. 24, a first base station may serve a wireless device by providing one or more service cells. The wireless device may receive, from the first base station, one or more messages comprising configuration parameters of the one or more cells and measurement configuration parameters. The measurement configuration parameters may be used for measuring (e.g., signal strength/RSSI of) one or more reference signals transmitted by serving cells (e.g., comprising first serving cells provided by neighboring base stations). In an example, the one or more reference signals may comprise SSB. In an example, the one or more reference signals may comprise CSI-RS.

The wireless device may perform measurements for the serving cells using the measurement configuration parameters. The wireless device may transmit, to the first base station, one or more messages comprising measurement information associated with one or more cells comprising a first cell of the second base station. The one or more messages may comprise RRC messages. Based on the measurement information transmitted by the wireless device, the first base station may transmit, to the second base station, a handover request message indicating a request for handover of the wireless device from the first base station to the first cell of the second base station.

The second base station may perform an admission control process based on the receiving the handover request message from the first base station. The second base station may transmit a handover request acknowledge message to the first base station. In an example, the second base station may transmit a handover request acknowledge message based on the admission control process indicating that the wireless device may handover to the first cell of the second base station. The handover request acknowledge message may comprise RRC configuration parameters. In an example, the handover request message may comprise configuration parameters of the first cell and a second cell. The second cell may be a scheduling cell for the first cell. In an example, the second cell may be configured with one or more search space for receiving scheduling information for the first cell. In an example the second cell may be configured with one or more search spaces of a first type. In an example, the first type may be a common search space type. In an example, the handover request acknowledge message may comprise configuration parameters of the second cell based on the second cell being a scheduling cell for the first cell and/or based on the second cell being configured with the one or more search spaces for receiving scheduling information for the first cell and/or based on the second cell being configured with the one or more search spaces of the first type. In an example, handover request acknowledge message may comprise configuration parameters of the second cell based on the first cell being a DSS cell.

The first base station may transmit a handover command to the wireless device. The handover command may comprise an RRC reconfiguration message comprising configuration parameters of the first cell and a second cell. In an example, the configuration parameters of the first cell and the second cell may comprise identifier of the first cell and the second cell. The second cell may be a scheduling cell for the first cell. The second cell may be configured with one or more search spaces for receiving scheduling information for the first cell. The second cell may be configured with one or more search spaces of a first type. In an example, RRC reconfiguration message may comprise configuration parameters of the second cell based on the second cell being a scheduling cell for the first cell and/or based on the second cell being configured with the one or more search spaces for receiving scheduling information for the first cell and/or based on the second cell being configured with the one or more search spaces of the first type. In an example, RRC reconfiguration message may comprise configuration parameters of the second cell based on the first cell being a DSS cell.

The one or more search spaces of a first type may comprise at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

In an example, the wireless device may perform a first random access process on the first cell and a second random access process on the second cell. In an example, the configuration parameters of the first cell and the second cell may comprise information for the first random access process on the first cell and the second random access process on the second cell. The wireless device may obtain a first timing advance information to a first uplink timing on the first cell and a second timing advance information for a second uplink timing in the second cell.

In an example, the first cell may be a dynamic spectrum sharing (DSS) cell and maybe shared by multiple radio access technologies (RATs).

Figure 25:
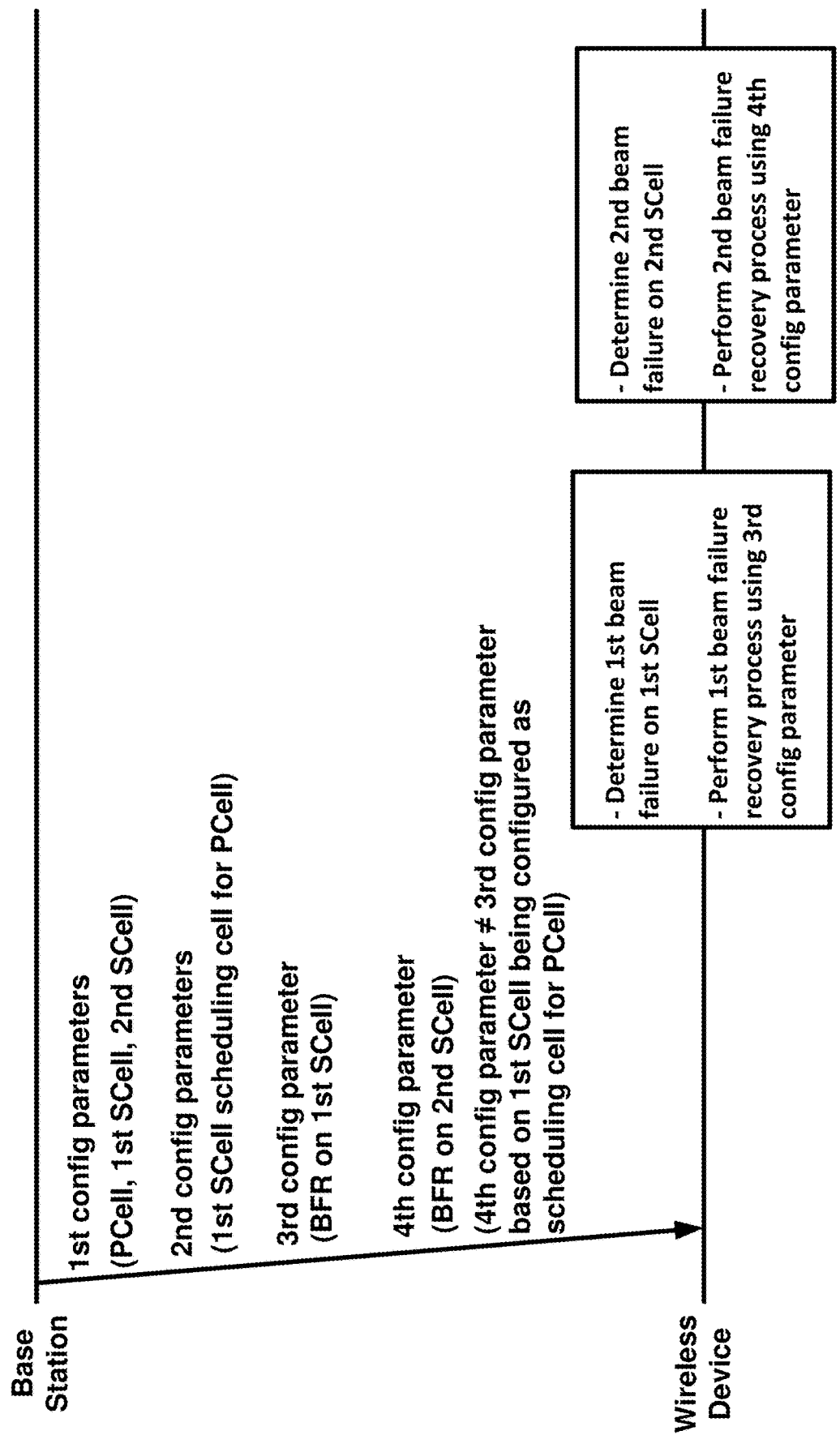
FIG. 25 shows an example process in accordance with several of various embodiments of the present disclosure.

In an example embodiment as shown in FIG. 25, a wireless device may receive first configuration parameters, second configuration parameters, a third configuration parameter and a fourth configuration parameter. The first configuration parameters may be for a primary cell, a first secondary cell and a second secondary cell. In an example, the primary cell, the first secondary cell and the second secondary cell may be in a cell group. For example, the cell group may be MCG or the cell group may be a SCG. The second configuration parameters may indicate that the first secondary cell is a scheduling cell for the primary cell. For example, the second configuration parameters may comprise a first parameter indicating a choice between the primary cell and a secondary cell as a scheduling cell for the primary cell. In an example, the second configuration parameters may indicate a serving cell identifier and/or a carrier indicator field value of the first secondary cell as a scheduling cell for the primary cell. In an example, the second configuration parameters may comprise configuration parameters of one or more search spaces on the first secondary cell for receiving scheduling information for the primary cell. In an example, the second configuration parameters may comprise configuration parameters of one or more search spaces of a first type for the first secondary cell. The third configuration parameter may be for beam failure recovery on the first secondary cell. The fourth configuration parameter may be for beam failure recovery on the second secondary cell.

The third configuration parameter may be different from the fourth configuration parameter based on the first secondary cell being a scheduling cell for the primary cell and/or based on the first secondary cell being configured with one or more search spaces for receiving scheduling information for the primary cell and/or based on the first secondary cell being configured with one or more search spaces of a first type.

The wireless device may start a first beam failure recovery process for the first secondary cell based on the determining/detecting beam failure on the first secondary cell. The wireless device may perform the first beam failure recovery process using the third configuration parameter. The first beam failure recovery process may comprise one of a beam failure recovery random access process and a beam failure recovery MAC CE transmission. The wireless device may start a second beam failure recovery process for the second secondary cell based on the determining/detecting beam failure on the second secondary cell. The wireless device may perform the second beam failure recovery process using the fourth configuration parameter. The second beam failure recovery process may comprise one of a beam failure recovery random access process and a beam failure recovery MAC CE transmission.

In an example, the third configuration parameter may indicate a first value of a first beam failure detection timer; and the fourth configuration parameter may indicate a second value of a second beam failure detection timer. In an example, the third configuration parameter may indicate a first beam failure instance max count and the fourth configuration parameter may indicate a second beam failure instance max count. In an example, the third configuration parameter may indicate a first beam failure recovery timer and the fourth configuration parameter may indicate a second beam failure recovery timer.

In an example, the third configuration parameter may indicate a first value of a first parameter for a first beam failure recovery random access process and the fourth configuration parameter may indicate a second value of a second parameter for a second beam failure recovery random access process. In an example, the first parameter may be a first power ramping step and the second parameter may be a second first power ramping step. In an example, the first parameter may be a first preamble received target power and the second parameter may be a second preamble received target power. In an example, the first parameter may be a first preamble transmission max indicating a first maximum number of preamble transmissions in the first beam failure recovery random access process and the second parameter may be a second preamble transmission max indicating a second maximum number of preamble transmissions in the second beam failure recovery random access process. In an example, the first parameter may be a first random access response window and the second parameter may be a second random access response window.

In an example, the third configuration parameters may indicate a first LCID and/or a first MAC CE format for a first beam failure recovery MAC indicating beam failure on the first secondary cell and the third configuration parameter may indicate a second LCID and/or a second MAC CE format for a second beam failure recovery MAC CE indicating beam failure on the second secondary cell.

In an example, the first type of search space may be a common search space. The first type of search space may be a common search space for at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

In an example embodiment, a wireless device may receive one or more first messages comprising first configuration parameters of a primary cell and a secondary cell; and radio link monitoring configuration parameters for the secondary cell. The first configuration parameters indicate that the secondary cell is a scheduling cell for the primary cell. In an example, the first configuration parameters may indicate that the secondary cell is configured with one or more search spaces for receiving scheduling information for the primary cell. In an example, the first configuration parameters may indicate one or more search spaces of a first type for the secondary cell. The wireless device may perform a radio link monitoring procedure for the secondary cell based on: the radio link monitoring configuration parameters; and the first configuration parameters indicating that the secondary cell is a scheduling cell for the primary cell and/or the secondary cell is configured with one or more search spaces for receiving scheduling information for the primary cell and/or that the one or more search spaces of a first type is configured for the secondary cell. The wireless device may determine/detect a failure (e.g., link failure) for the secondary cell based on the radio link monitoring procedure.

In an example, the wireless device may transmit one or more second messages based on the determining/detecting. In an example, the one or more second messages may comprise one or more RRC messages. In an example, the one or more second messages may indicate the failure (e.g., link failure). In an example, the one or more second messages may indicate the failure (e.g., link failure) on the secondary cell. In an example, the one or more second messages may comprise/indicate an identifier of the secondary cell. In an example, the one or more second messages may comprise a cause parameter indicating the cause as failure (e.g., link failure) on a secondary cell that is a scheduling cell for the primary cell and/or a secondary cell that is configured with one or more search spaces for receiving scheduling information for the primary cell and/or a secondary cell that is configured with one or more search spaces of the first type.

In an example, the one or more first messages may comprise the radio link monitoring configuration parameters for the secondary cell based on the secondary cell being configured as a scheduling cell for the primary cell and/or based on the secondary cell being configured with one or search spaces for receiving scheduling information for the primary cell and/or based on the secondary cell being configured with the one or more search spaces of the first type.

In an example, the radio link monitoring configuration parameters may indicate one or more reference signals for radio link monitoring on the secondary cell.

In an example, the one or more reference signals comprise one or more SSBs.

In an example, the one or more reference signals comprise one or more CSI-RSs.

In an example, the radio link monitoring procedure for the secondary cell may comprise determining a radio link quality based on the radio link monitoring configuration parameters.

In an example, the determining the link quality may be based on signal strength/RSSI of one or more reference signals received via the secondary cell.

In an example, the wireless device may receive a reconfiguration message indicating a second secondary cell as a scheduling cell of the primary cell based on the failure (e.g., link failure) on the secondary cell.

In an example, the radio link monitoring configuration parameters may comprise one or more thresholds; and the determining/detecting the failure (e.g., link failure) may be further based on the one or more thresholds. In an example, the one or more thresholds may comprise a first threshold of an out-of-sync indication. In an example, the one or more thresholds may comprise a second threshold of an in-sync indication. In an example, the determining the failure (e.g., link failure) may be based on comparing one or more link qualities with the one or more thresholds.

In an example, the determining the failure (e.g., link failure) may be further based on expiry of a timer. In an example, the wireless device may start the timer based on a first number of out-of-sync indications from physical layer. In an example, an out-of-sync indication may be based on signal strength/RSSI of one or more reference signals being lower than an out-of-sync threshold. In an example, an in-sync indication may be based on signal strength/RSSI of one or more reference signals being larger than an in-sync threshold.

In an example, the wireless device may transmit transmitting a MAC CE based on the determining/detecting the failure (e.g., link failure). In an example, the MAC CE may indicate the failure (e.g., link failure) on the secondary cell. In an example, the MAC CE may indicate the failure (e.g., link failure) on the secondary cell indicating that the secondary cell is not suitable for scheduling of the primary cell. In an example, the MAC CE may comprise an identifier of the secondary cell. In an example, a logical channel identifier associated with the MAC CE may indicate that the MAC CE is for failure (e.g., link failure) indication; and the MAC CE may comprise zero payload and/or have zero size.

In an example, the wireless device may transmit uplink control information based on the determining/detecting the failure (e.g., link failure). In an example, the uplink control information may indicate the failure (e.g., link failure) on the secondary cell. In an example, the uplink control information may indicate an identifier of the secondary cell. In an example, the wireless device may receive configuration parameters of an uplink control channel resource for transmission of the uplink control information. In an example, the uplink control channel resource may be a scheduling request resource. In an example, the one or more messages may comprise second configuration parameters of a scheduling request configuration; and the scheduling request configuration may be for indicating link failure on a secondary cell that is a scheduling cell for the primary cell.

In an example, the radio link monitoring on the secondary cell may comprise determining a decoding error rate for a control channel. In an example, the radio link monitoring of the secondary cell may comprise determining a decoding error rate for receiving control information on one or more search spaces of the secondary cell. In an example, the one or more search spaces may be for at least one of a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

In an example, the one or more messages may comprise configuration parameters of one or more secondary cells, comprising the secondary cell, wherein the one or more secondary cells are configured as scheduling cell for the primary cell and/or are configured with one or more search spaces for receiving scheduling information of the primary cell and/or are configured with one or more search spaces of a first type. In an example, the wireless device may receive control signaling (e.g., a DCI or a MAC CE) indicating a secondary cell, in the one or more secondary cells, as a scheduling cell for the primary cell. In an example, the one or more messages may indicate a list (e.g., an ordered list based on a priority) of secondary cells that are scheduling cell for the primary cell. In an example, a first secondary cell, in the list of secondary cells, that has highest priority and does not have link failure may be a scheduling cell for the primary cell.

In an example embodiment, a wireless device may receive configuration parameters of a primary cell, a first secondary cell and a second secondary cell. The first secondary cell may be a scheduling cell for the primary cell and/or the first secondary cell may be configured with one or more search spaces for receiving scheduling information for the primary cell and/or the first secondary cell may be configured with one or more search spaces of a first type. The second secondary cell may not be a scheduling cell for the primary cell and/or the second secondary cell may not be configured with one or more search spaces for receiving scheduling information for the primary cell and/or the second secondary cell may not be configured with a search space of a first type. The wireless device may determine a first beam failure for the first secondary cell. The wireless device may perform a first recovery process for the first beam failure. The wireless device may determine a second beam failure for the second secondary cell. The first recovery process may be different from the second recovery process based on the first secondary cell being a scheduling cell for the primary cell and/or based on the first secondary cell being configured with one or more search spaces for receiving scheduling information for the primary cell and/or based on the first secondary cell being configured with one or more search spaces of the first type.

In an example, the first recovery process may comprise starting a random access process; and the second recovery process may comprise transmission of a beam failure recovery MAC CE.

In an example, the determining the first beam failure may be based on a first beam failure instance counter reaching a first value. In an example, the determining the first beam failure may comprise starting a first beam failure detection timer based on receiving an indication of a beam failure instance for the first secondary cell from the physical layer. In an example, the determining the first beam failure may comprise setting/resetting a first beam failure instance counter to zero based on a first beam failure detection timer expiring.

In an example, the determining the second beam failure may be based on a second beam failure instance counter reaching a second value. In an example, the determining the second beam failure may comprise starting a second beam failure detection timer based on receiving an indication of a beam failure instance for the second secondary cell from the physical layer. In an example, the determining the second beam failure may comprise setting/resetting a second beam failure instance counter to zero based on a second beam failure detection timer expiring.

In an example, the one or more search spaces of a first type may comprise at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

In an example embodiment, a wireless device may receive configuration parameters of a primary cell and a secondary cell. The wireless device may determine a beam failure for the secondary cell. The wireless device may determine determining whether the secondary cell is configured as a scheduling cell for the primary cell or not or may determine whether the secondary cell is configured with one or more search spaces for receiving scheduling information for the primary cell or may determine whether the secondary cell is configured with one or more search spaces of a first type or not. Based on the secondary cell being configured as a scheduling cell for the primary cell and/or based on the secondary cell being configured with one or more search spaces for receiving scheduling information for the primary cell and/or based on the secondary cell being configured with one or more search spaces of a first type, the wireless device may perform a first type of beam failure recovery process, otherwise the wireless device may perform a second type of beam failure recovery process.

In an example, the first type of beam failure recovery process may be based on a random access process; and the second type of beam failure process may be based on transmitting a beam failure recovery MAC CE. In an example, the wireless device may receive first configuration parameters for random access process for beam failure recovery. In an example, the MAC CE, if transmitted, may comprise a field indicating an identifier of the secondary cell. In an example, the MAC CE, if transmitted, may comprise a field indicating if a new beam RS is detected or not. In an example, the MAC CE, if transmitted, may indicate a new candidate beam RS index.

In an example, the determining the beam failure may comprise starting a beam failure detection timer based on receiving an indication of beam failure instance for the secondary cell from the physical layer.

In an example, the determining the beam failure may comprise resetting a beam failure instance counter to zero based on a beam failure detection timer expiring.

In an example, the one or more search spaces of a first type may comprise at least one of: a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

In an example embodiment, a first base station may transmit to a wireless device, measurement configuration parameters for measuring signal strength/RSSI of one or more reference signals transmitted via one or more cells. The first base station may receive from the wireless device, one or more messages comprising measurement information associated with one or more cells comprising a first cell of a second base station. The first base station may transmit, to the second base station, a handover request message indicating a request for handover of a wireless device from the first base station to the first cell of the second base station. The first base station may receive from the second base station, a handover request acknowledge message, comprising radio resource control (RRC) configuration parameters. The first base station may transmit to the wireless device, a handover command comprising an RRC reconfiguration message comprising configuration parameters of the first cell and a second cell, wherein the second cell is a scheduling cell for the first cell.

In an example, the one or more reference signals comprise at least one of CSI-RS and SSB.

In an example embodiment, a wireless device may receive, from a first base station, measurement configuration parameters for measuring (signal strength/RSSI of) one or more reference signals transmitted via one or more cells. The wireless device may transmit, to the first base station, one or more messages comprising measurement information of one or more cells comprising a first cell of a second base station. The wireless device may receive, from the first base station, a handover command comprising a radio resource control (RRC) reconfiguration message comprising configuration parameters of the first cell and a second cell of the second base station, wherein the second cell is a scheduling cell for the first cell. The wireless device may transmit an RRC reconfiguration complete message to the second base station.

In an example, the configuration parameters of the first cell and the second cell comprise identifiers of the first cell and the second cell.

In an example, the wireless device may perform a first random access process on the first cell and a second random access process on the second cell.

In an example, the configuration parameters the configuration parameters of the first cell and the second cell may comprise information for the first random access process and the second random access process.

In an example, the first cell is a dynamic spectrum sharing (DSS) cell.

In an example, the handover request acknowledge message may comprise configuration parameters of the first cell and the second cell.

In an example, the handover request acknowledge message may comprise configuration parameters of the first cell and the second cell based on the first cell being scheduled by the second cell and/or based on the second cell being a scheduling cell of the first cell. In an example, the RRC reconfiguration message may comprise configuration parameters of the first cell and the second cell based on the first cell being scheduled by the second cell and/or based on the second cell being a scheduling cell of the first cell. In an example, the handover request acknowledge message and/o the RRC reconfiguration message may comprise configuration parameters of the first cell and the second cell based on the first cell being a DSS cell.

In an example, the one or more reference signals may comprise at least one of CSI-RS and SSB.

In an example embodiment, a wireless device may receive one or more messages comprising: first configuration parameters of a primary cell, a first secondary cell and a second secondary cell; second configuration parameters indicating that the first secondary cell is a scheduling cell for the primary cell and/or indicating that first secondary cell is configured with one or more search spaces for receiving scheduling information for the primary cell and/or indicating that the first secondary cell is configured with one or more search spaces of a first type; a third configuration parameter for beam failure recovery on the first secondary cell; and a fourth configuration parameter for beam failure recovery on the second secondary cell. The third configuration parameter value may be different from the fourth configuration parameter value based on the first secondary cell being a scheduling cell for the primary cell and/or based on the first secondary cell being configured with one or more search spaces for receiving scheduling information for the primary cell and/or based on the first secondary cell being configured with one or more search spaces of a first type. The wireless device may start a first recovery process on the first secondary cell based on the determining/detecting beam failure on the first secondary cell. The wireless device may start a second recovery process on the secondary cell based on determining/detecting beam failure on the second secondary cell.

In an example, the third configuration parameter may indicate a first value of a first beam failure detection timer; and the fourth configuration parameter may indicate a second value of a second beam failure detection timer.

In an example, the third configuration parameter may indicate a first value of a first beam failure instance max count; and the fourth configuration parameter may indicate a second value of a second beam failure instance max count.

In an example, the third configuration parameter may indicate a first value of a first beam failure recovery timer; and the fourth configuration parameter may indicate a second value of a second beam failure recovery timer.

In an example, the third configuration parameter may indicate a first value of a first parameter for a first beam failure recovery random access process; and the fourth configuration parameter may indicate a second value of a second parameter for a second beam failure recovery random access process. In an example, the first parameter may be a first power ramping step; and the second parameter may be a second power ramping step. In an example, the first parameter may be a first preamble received target power; and the second parameter may be a second preamble received target power. In an example, the first parameter may be a first preamble transmission max indicating a first maximum number of preamble transmissions in the first beam failure recovery random access process; and the second parameter may be a second preamble transmission max indicating a second maximum number of preamble transmissions in the second beam failure recovery random access process. In an example, the first parameter may be a first random access response window; and the second parameter may be a second random access response window.

In an example, the first type of search space may be common search space. In an example, the first type of search space is common search space for at least one of a common search space for receiving a DCI format with CRC scrambled by a SI-RNTI, for example, to receive system information; a common search space for receiving a DCI format with CRC scrambled by a RA-RNTI or a TC-RNTI, for example to receive random access response or a contention resolution message; a common search space for receiving a DCI format with CRC scrambled by a P-RNTI, for example to receive paging information; a common search space for receiving DCI formats with CRC scrambled by INT-RNTI (e.g., to receive preemption/interruption information), SFI-RNTI (e.g., to receive slot format indication), TPC-PUSCH-RNTI and TPC-PUCCH-RNTI (e.g., to receive transmit power control commands for PUSCH or PUCCH) or TPC-SRS-RNTI (e.g., to receive transmit power control commands for SRS).

In an example, the first recovery process may be one of a random access process and transmission of a beam failure recovery MAC CE.

In an example, the second recovery process may be one of a random access process and transmission of a beam failure recovery MAC CE.

Figure 26:
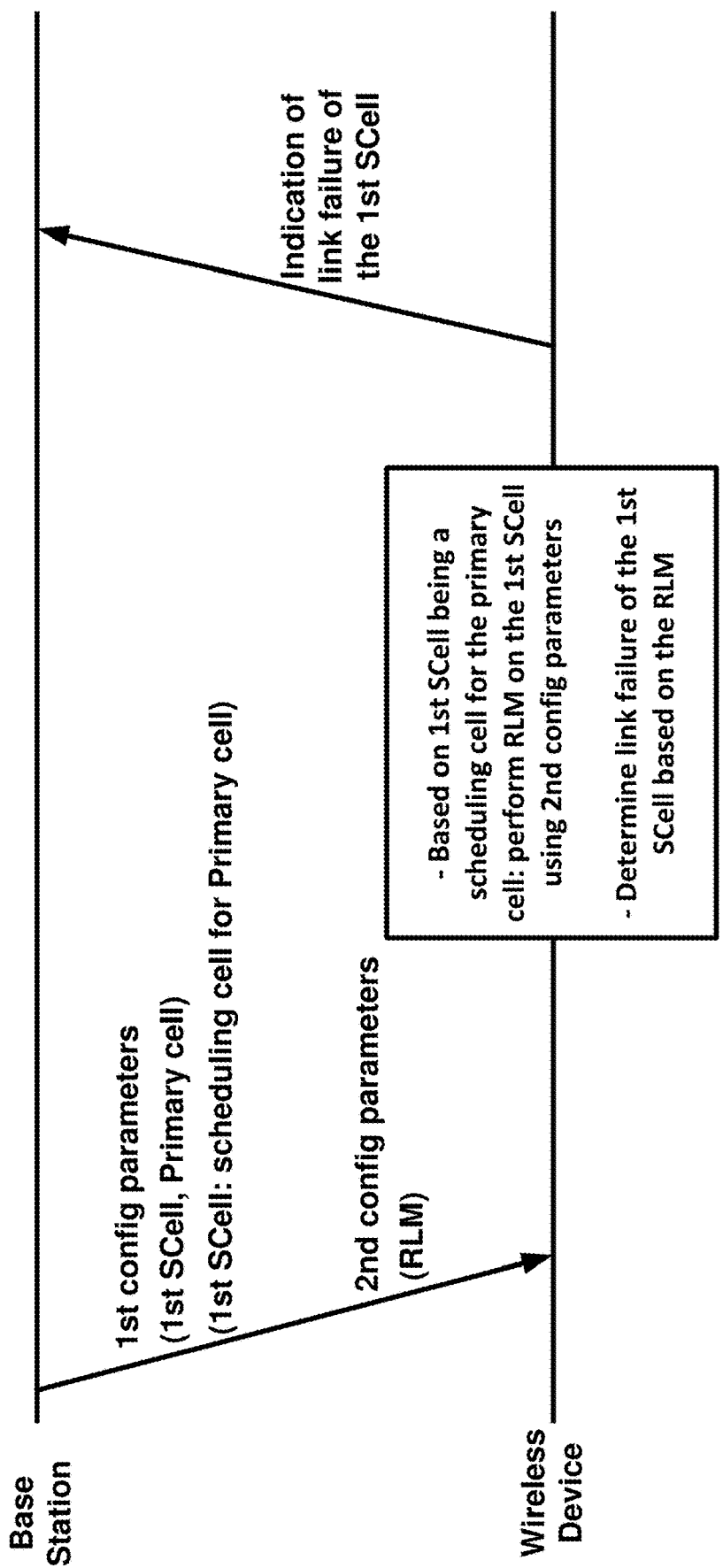
FIG. 26 shows an example process in accordance with several of various embodiments of the present disclosure.

In an example embodiment as shown in FIG. 26, a wireless device may receive one or more messages (e.g., one or more RRC messages) comprising configuration parameters. The one or more messages may comprise first configuration parameters of a plurality of cells. The plurality of cells may be provided by one base station (e.g., in case of a single-connectivity scenario) or multiple base stations (e.g., in case of a multi-connectivity scenario). The plurality of cells may comprise a primary cell and a first secondary cell. The primary cell may be a PCell or a primary secondary cell (PSCell) (e.g., in a dual connectivity scenario). In an example, the primary cell and the first secondary cell may be in the same cell group (e.g., cell group associated with and provided by a master base station or the cell group associated with or provided by a secondary base station). The first secondary cell may be a scheduling cell for the primary cell. For example, the first configuration parameters may indicate that the first secondary cell is a scheduling cell for the primary cell. For example, the first configuration parameters may comprise one or more first parameters indicating that the first secondary cell is a scheduling cell for the primary cell. For example, the first secondary cell may be configured with parameters (e.g., search spaces for receiving scheduling information associated with scheduling of the primary cell) indicating that the first secondary cell is a scheduling cell for the primary cell. The one or more messages may further comprise second configuration parameters for radio link monitoring. In an example, the second configuration parameters may comprise first radio link monitoring parameters for radio link monitoring of a secondary cell that is a scheduling cell for the primary cell (e.g., the first secondary cell that is a scheduling cell for the primary cell) and second radio link monitoring parameters for radio link monitoring of the primary cell.

In an example, the first configuration parameters may further comprise parameters associated with a second secondary cell, wherein the second secondary cell may not be a scheduling cell for the primary cell. The wireless device may not perform radio link monitoring for the second secondary cell. The wireless device may not perform radio link monitoring for the second secondary cell based on the second secondary cell not being a scheduling cell for the primary cell. The secondary configuration parameters may not be associated and/or may not comprise parameters for radio link monitoring of the second secondary cell. The secondary configuration parameters may not be associated and/or may not comprise parameters for radio link monitoring of the second secondary cell based on the second secondary cell not being a scheduling cell for the primary cell.

The wireless device may perform radio link monitoring for the first secondary cell. The wireless device may perform radio link monitoring for the first secondary cell based on the first secondary cell being a scheduling cell for the primary cell. The wireless device may perform the radio link monitoring for the first secondary cell based on the second configuration parameters for radio link monitoring (e.g., based on the first radio link monitoring parameters, of the second configuration parameters, that are associated with radio link monitoring of the first secondary cell that is a scheduling cell for the primary cell). The wireless device may determine a link failure (e.g., radio link failure (RLF)) of the first secondary cell based on performing radio link monitoring for the first secondary cell. The wireless device may determine the link failure based on an expiry of the timer (e.g., an RRC timer, e.g., T310 timer). For example, the wireless device may start the timer, with a value, based on a first number (e.g., N310) of out-of-sync indications (e.g., consecutive out-of-sync indications received from physical layer/lower layers) and may determine the link failure based on the timer expiring. The wireless device may stop the timer based on a second number (e.g., N311) of in-sync indications (e.g., received from the physical layer/lower layers). The configuration parameters (e.g., based on an RLF-TimersAndConstants) may indicate the value of the timer (e.g., the T310 timer) and the first number (e.g., N310) and the second number (e.g., N311). In response to determination of the link failure for the first secondary cell, the wireless device may transmit an indication (e.g., a message or a control element or a signal or a channel) of the link failure to the base station.

The wireless device may perform radio link monitoring for the first secondary cell based on the second configuration parameters (e.g., based on the first radio link monitoring parameters, of the second configuration parameters, associated with radio link monitoring of the first secondary cell). In an example, the second configuration parameters may comprise parameters associated with one or more reference signals (e.g., indicating/selecting the reference signal(s) used for radio link monitoring or indicating parameters associated with the one or more reference signals). For example, the one or more reference signals may comprise SSB and/or CSI-RS. The wireless device may determine radio link quality of the first secondary cell by measuring/monitoring the one or more reference signals. The wireless device may determine the link failure of the first secondary cell based on the determining the radio link quality (e.g., based on strength of the one or more reference signals) of the first secondary cell and based on the radio link quality being lower than a threshold.

In an example, the indication transmitted by the wireless device to the base station, in response to determination of the link failure for the first secondary cell, may be based on an RRC message. For example, the RRC message may include an RLF report information element indicating the radio link failure for the first secondary cell (e.g., indicating that the link failure has occurred for the first secondary cell). In an example, the RRC message (e.g., the RLF report IE) may indicate (e.g., may comprise a field indicating) an identifier of the first secondary cell. In an example, the RRC message (e.g., the RLF report IE) may comprise a cause field, a value of the cause field indicating that the link failure has occurred for a cell that is a scheduling cell for the primary cell. The cause field may take a value in a plurality of values wherein each value in the plurality of values may be associated with a cause of the link failure (e.g., on the primary cell or a secondary cell that is a scheduling cell for the primary cell).

In an example, the indication transmitted by the wireless device to the base station, in response to determination of the link failure for the first secondary cell, may be based on a MAC CE. For example, the MAC CE may comprise a field indicating that the link failure of the first secondary cell. For example, the MAC CE may comprise a field, a value of the field indicating an identifier of the first secondary cell. For example, the MAC CE may have zero payload and an LCID associated with the MAC CE may indicate that the link failure is for the first secondary cell (e.g., the cell that is a scheduling cell for the primary cell). In an example, the wireless device may receive an uplink grant comprising transmission parameters of a transport block. The wireless device may create a transport block and may multiplex the MAC CE in the transport block using a multiplexing/logical channel prioritization procedure. The wireless device may transmit the transport block to the base station and may indicate the link failure for the first secondary cell by including the MAC CE in the transport block.

In an example, the indication transmitted by the wireless device to the base station, in response to determination of the link failure for the first secondary cell, may be based on an uplink control information (UCI). The UCI, indicating the link failure for the first secondary cell, may be transmitted to the base station using an uplink channel (e.g., an uplink control channel (PUCCH) or an uplink shared channel (PUSCH)). In an example, the UCI may be based on a scheduling request. The scheduling request may be transmitted via a scheduling request resource determined based on a scheduling request configuration. In an example, the scheduling request configuration may be associated with link failure recovery (for example link failure on a secondary cell that is a scheduling cell for the primary cell).

In an example embodiment, a wireless device may receive one or more messages (e.g., one or more RRC messages) comprising configuration parameters. The one or more messages may comprise first configuration parameters of a plurality of cells. The plurality of cells may be provided by one base station (e.g., in case of a single-connectivity scenario) or multiple base stations (e.g., in case of a multi-connectivity scenario). The plurality of cells may comprise a primary cell and a secondary cell. In an example, the primary cell and the secondary cell may be in the same cell group (e.g., cell group associated with and provided by a master base station or the cell group associated with or provided by a secondary base station). The secondary cell may be either a scheduling cell for the primary cell (e.g., PCell or PSCell) or may not be a scheduling cell for the primary cell. The wireless device may determine a beam failure for the secondary cell. The wireless device may determine the beam failure for the secondary cell based on beam failure detection process. For example, the wireless device may determine the beam failure for the secondary cell based on a beam failure instance indication counter, associated with the first secondary cell, reaching a configurable threshold.

Figure 27:
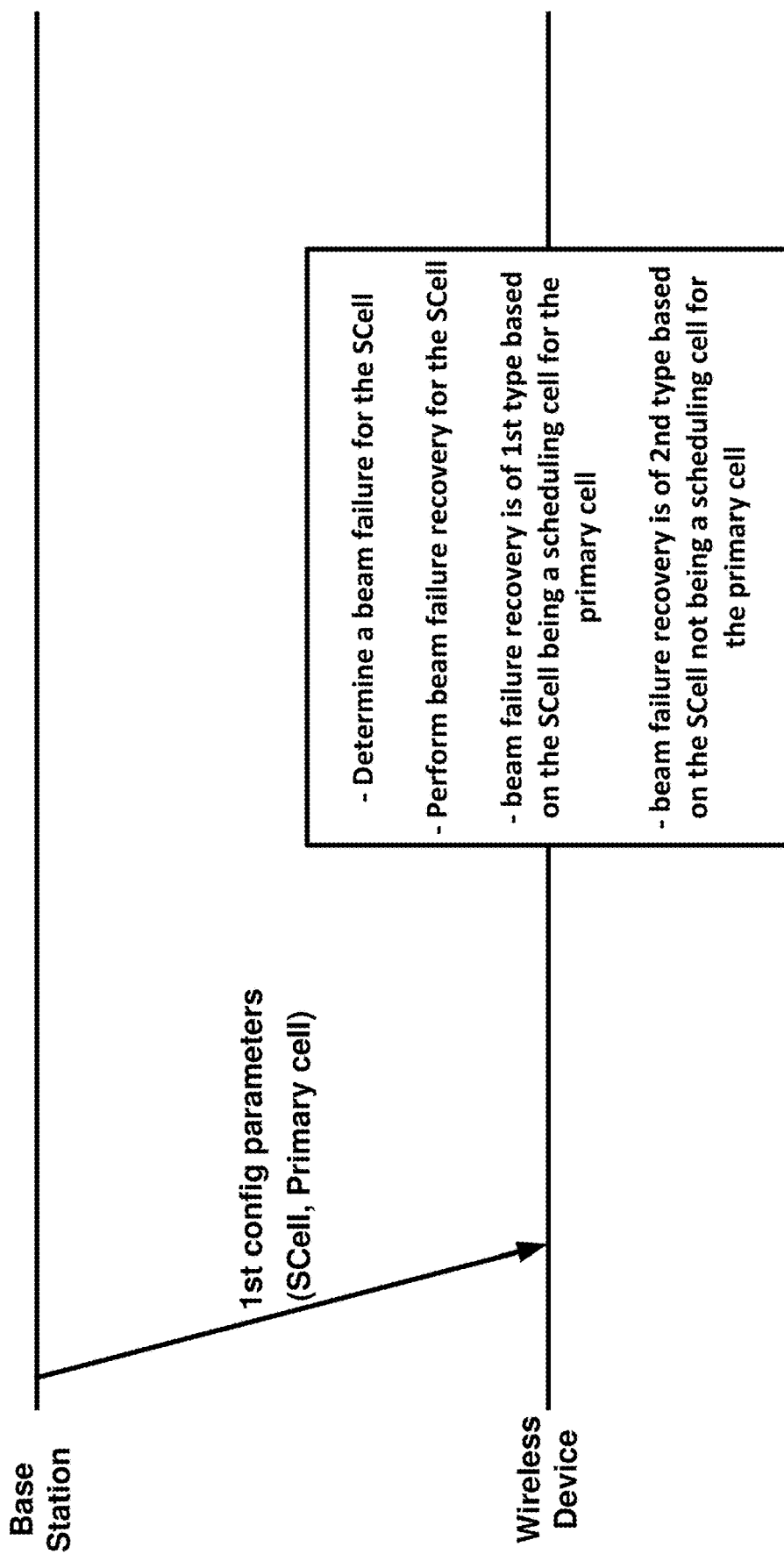
FIG. 27 shows an example process in accordance with several of various embodiments of the present disclosure.

In an example embodiment as shown in FIG. 27, the wireless device may perform a beam failure recovery process, for the secondary cell, in response to detection of the beam failure for the secondary cell. The beam failure recovery may be either of a first type or a second type depending on whether the secondary cell is a scheduling cell for the primary cell or is not a scheduling cell for the primary cell. The beam failure recovery may be of a first type (e.g., based on a random access process) based on the secondary cell being a scheduling cell for the primary cell or the beam failure recovery may be of a second type (e.g., based on transmission of a scheduling request or a MAC CE) based on the secondary cell not being a scheduling cell for the primary cell.

Figure 28:
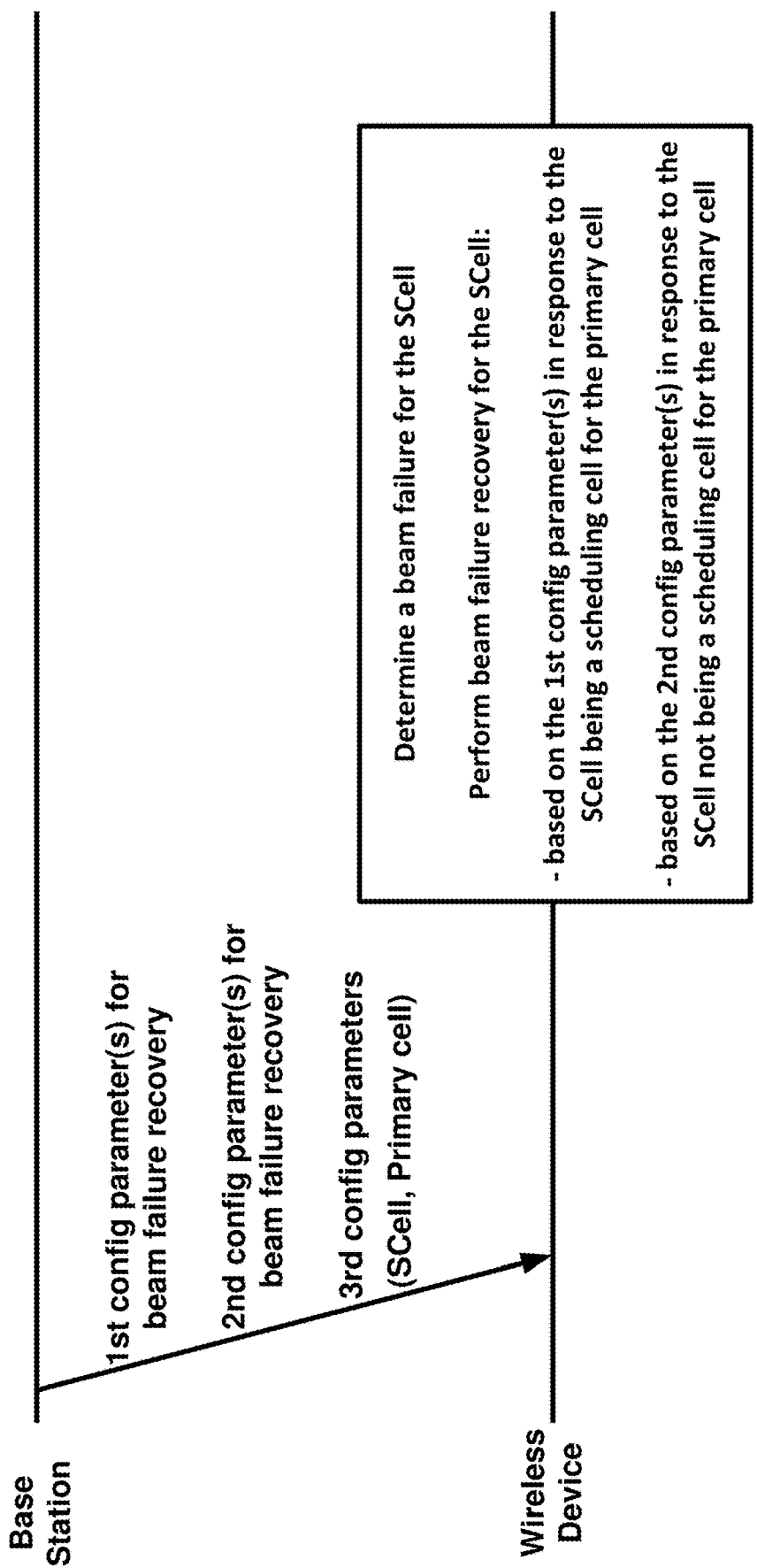
FIG. 28 shows an example process in accordance with several of various embodiments of the present disclosure.

In an example embodiment as shown in FIG. 28, the wireless device may receive separate configuration parameters for beam failure recovery of a secondary cell that is a scheduling cell for the primary cell and beam failure recovery of a secondary cell that is not a scheduling cell for the primary cell. For example, the wireless device may receive one or more first configuration parameters, for beam failure recovery of a secondary cell that is a scheduling cell of the primary cell, and one or more second configuration parameters for beam failure recovery of a secondary cell that is not a scheduling cell of the primary cell. The wireless device may perform a beam failure recovery for the secondary cell. The beam failure recovery may be based on the one or more first configuration parameters in response to the secondary cell being a scheduling cell for the primary cell. The beam failure recovery may be based on one or more second configuration parameters in response to the secondary cell not being a scheduling cell for the primary cell.

In an example, the detection of beam failure for the secondary cell may be based on the one or more first configuration parameters in response to the secondary cell being a scheduling cell for the primary cell and the beam failure detection for the secondary cell may be based on the one or more second configuration parameters in response to the secondary cell not being a scheduling cell for the primary cell. For example, the one or more first configuration parameters indicate a first value of a beam failure detection timer and the one or more second configuration parameters may indicate a second value of the beam failure detection timer. The wireless device may detect the beam failure for the secondary cell based on the first value of the beam failure detection timer in response to the secondary cell being a scheduling cell of the primary cell. The wireless device may detect the beam failure for the secondary cell based on the second value of the beam failure detection timer in response to the secondary cell not being a scheduling cell of the primary cell. For example, the one or more first configuration parameters indicate a first value of a beam failure max count and the one or more second configuration parameters may indicate a second value of the beam failure max count. The wireless device may detect the beam failure for the secondary cell based on the first value of the beam failure max count in response to the secondary cell being a scheduling cell of the primary cell. The wireless device may detect the beam failure for the secondary cell based on the second value of the beam failure max count in response to the secondary cell not being a scheduling cell of the primary cell. The beam failure max count may be a maximum number beam failure instance indications for determining beam failure. For example, the one or more first configuration parameters indicate a first value of a beam failure recovery timer and the one or more second configuration parameters may indicate a second value of the beam failure recovery timer. The wireless device may detect the beam failure for the secondary cell based on the first value of the beam failure recovery timer in response to the secondary cell being a scheduling cell of the primary cell. The wireless device may detect the beam failure for the secondary cell based on the second value of the beam failure recovery timer in response to the secondary cell not being a scheduling cell of the primary cell. The wireless device may start the beam failure recovery timer, in response to reception of a beam failure instance indication, with the first value in response to the secondary cell being a scheduling cell. The wireless device may start the beam failure recovery timer, in response to reception of a beam failure instance indication, with the second value in response to the secondary cell not being a scheduling cell.

In an example, the beam failure recovery for the secondary cell may be based on the one or more first configuration parameters in response to the secondary cell being a scheduling cell for the primary cell and the beam failure recovery for the secondary cell may be based on the one or more second configuration parameters in response to the secondary cell not being a scheduling cell for the primary cell. For example, the one or more first configuration parameters may indicate a first value of a parameter of a beam failure recovery random access process and the one or more second configuration parameters may indicate a second value of the parameter of the beam failure recovery random access process. For example, the parameter of the parameter of the beam failure recovery random access process may indicate a power ramping step. For example, the parameter of the beam failure recovery random access process may indicate a preamble received target power. For example, the parameter of the beam failure recovery random access process may indicate a maximum number of preamble transmissions in the beam failure recovery random access process. For example, the parameter of the beam failure recovery random access process may indicate a random access response window.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 29:
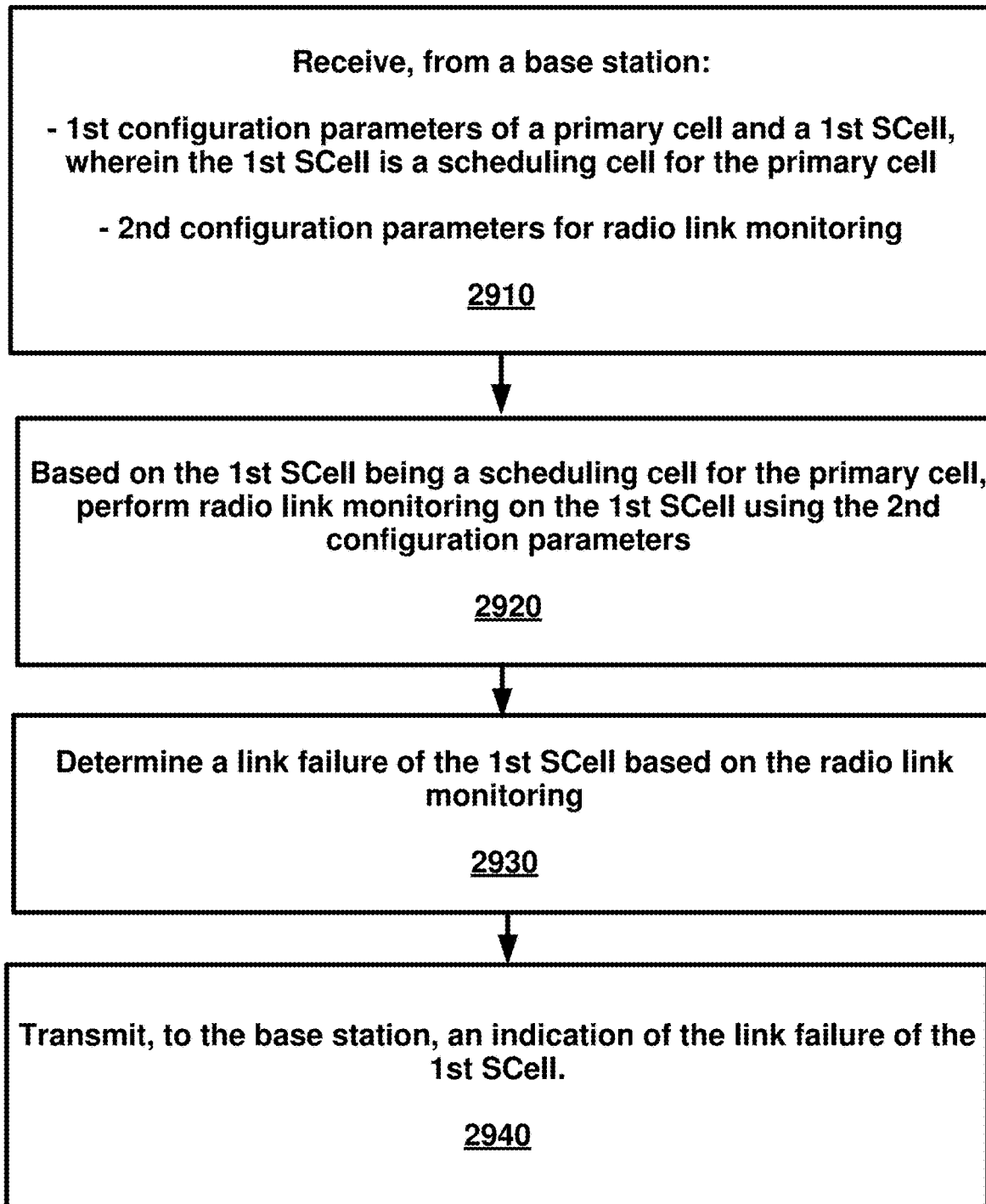
FIG. 29 shows an example flow diagram in accordance with several of various embodiments of the present disclosure.

FIG. 29 shows an example flow diagram in accordance with several of various embodiments of the present disclosure. At 2910, a wireless device may receive from a base station: first configuration parameters of a primary cell and a first secondary cell, wherein the first secondary cell is a scheduling cell for the primary cell; and second configuration parameters for radio link monitoring. At 2920, based on the first secondary cell being a scheduling cell for the primary cell, the wireless device may perform radio link monitoring on the first secondary cell using the second configuration parameters. At 2930, the wireless device may determine a link failure of the first secondary cell based on the radio link monitoring. At 2940, the wireless device may transmit, to the base station, an indication of the link failure of the first secondary cell.

In an example embodiment, the first configuration parameters, received at 2910, may indicate that the first secondary cell is a scheduling cell for the primary cell.

In an example embodiment, the indication, transmitted at 2940, may be based on a radio resource control message. In an example embodiment, the radio resource control message may indicate that the link failure is for the first secondary cell. In an example embodiment, the radio resource control message may comprise a field, a value of the field indicating an identifier of the first secondary cell.

In an example embodiment, the indication, transmitted at 2940, may comprise a cause field indicating that the link failure is for the first secondary cell.

In an example embodiment, the second configuration parameters, received at 2910, may comprise first radio link monitoring configuration parameters for radio link monitoring on the first secondary cell. In an example embodiment, the second configuration parameters may further comprise second radio link monitoring configuration parameters for radio link monitoring on the primary cell.

In an example embodiment, the second configuration parameters, received at 2910, may indicate one or more reference signals for radio link monitoring on the first secondary cell. The one or more reference signals may comprise at least one of a synchronization signal block and a channel state information reference signal. The determining the link failure, at 2930, may comprise determining radio link quality based on monitoring the one or more reference signals.

In an example embodiment, the wireless device may receive from the base station, at 2910, third configuration parameters of a second secondary cell. The second secondary cell may not be a scheduling cell for the primary cell. The second configuration parameters, received at 2910, may not comprise radio link monitoring parameters associated with the second secondary cell.

In an example embodiment, the determining the link failure, at 2930, may comprise starting a timer, with a value, based on a first number of out-of-sync indications. In an example embodiment, the determining the link failure, at 2930, may be based on an expiry of the timer. In an example embodiment, the first configuration parameter, received at 2910, may indicate the value of the timer and the first number of out-of-sync indications. In an example embodiment, the determining the link failure may comprise stopping the timer based on a second number of in-sync indications. In an example embodiment, the first configuration parameters, received at 2910, may indicate the second number of in-sync indications.

In an example embodiment, the indication, transmitted at 2940, may be based on a medium access control (MAC) control element (CE).

In an example embodiment, the indication, transmitted at 2940, may be based on an uplink control information. In an example embodiment, the uplink control information may comprise a scheduling request. In an example embodiment, the scheduling request may be based on a scheduling request configuration associated with link failure of a secondary cell that is a scheduling cell for the primary cell.

In an example embodiment, the first configuration parameters, received at 2910, may comprise third configuration parameters of one or more search spaces, of the first secondary cell, for receiving scheduling information associated with scheduling of the primary cell.

Figure 30:
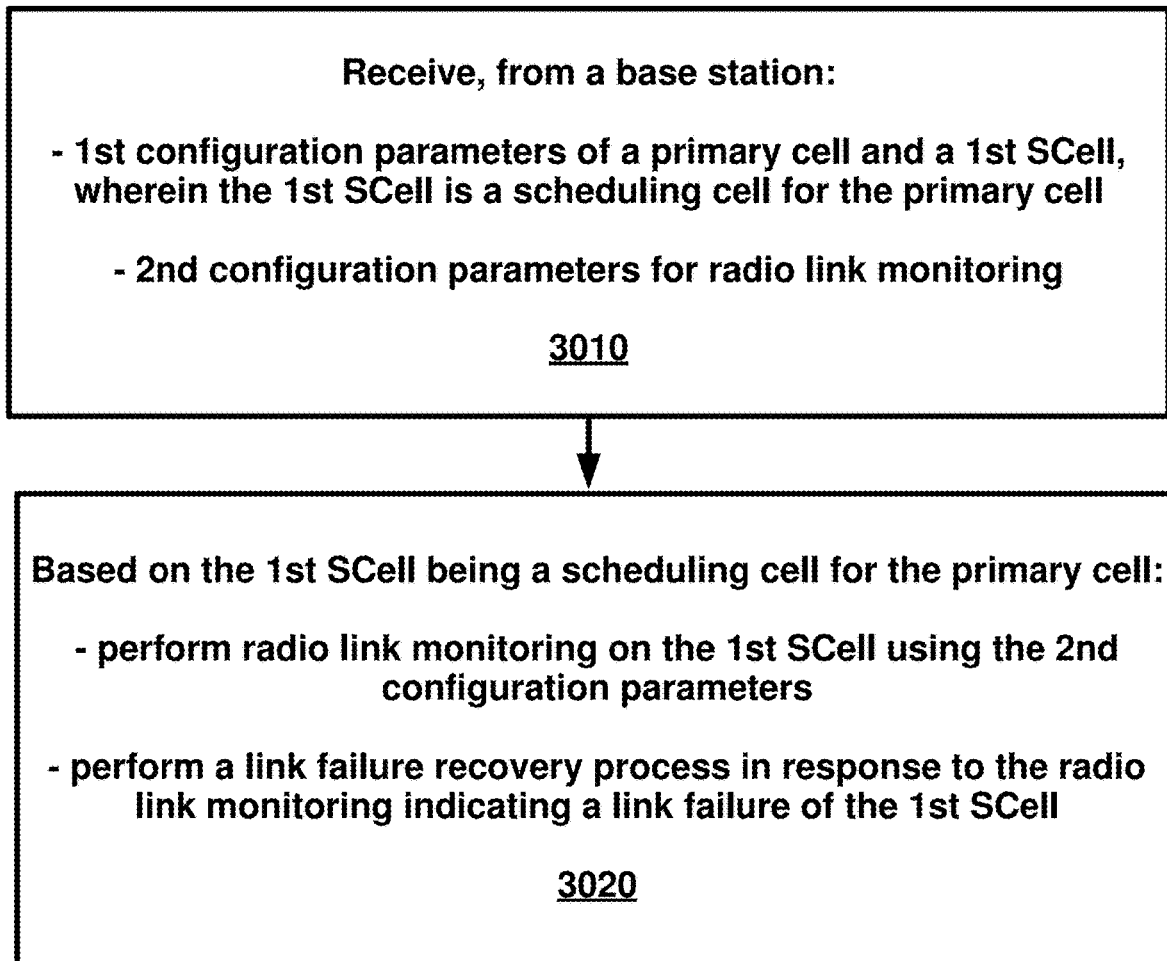
FIG. 30 shows an example flow diagram in accordance with several of various embodiments of the present disclosure.

FIG. 30 shows an example flow diagram in accordance with several of various embodiments of the present disclosure. At 3010, a wireless device may receive from a base station: first configuration parameters of a primary cell and a first secondary cell, wherein the first secondary cell is a scheduling cell for the primary cell; and second configuration parameters for radio link monitoring. At 3020, based on the first secondary cell being a scheduling cell for the primary cell: the wireless device may perform radio link monitoring on the first secondary cell using the second configuration parameters; and the wireless device may perform a link failure recovery process in response to the radio link monitoring indicating a link failure of the first secondary cell.

In an example embodiment, the first type of beam failure recovery, at 3030, may be based on a random access process. The second type of beam failure recovery, at 3030, may be based on transmission of a beam failure recovery medium access control (MAC) control element (CE). In an example embodiment, the wireless device may receive second configuration parameters of the random access process for beam failure recovery.

Figure 31:
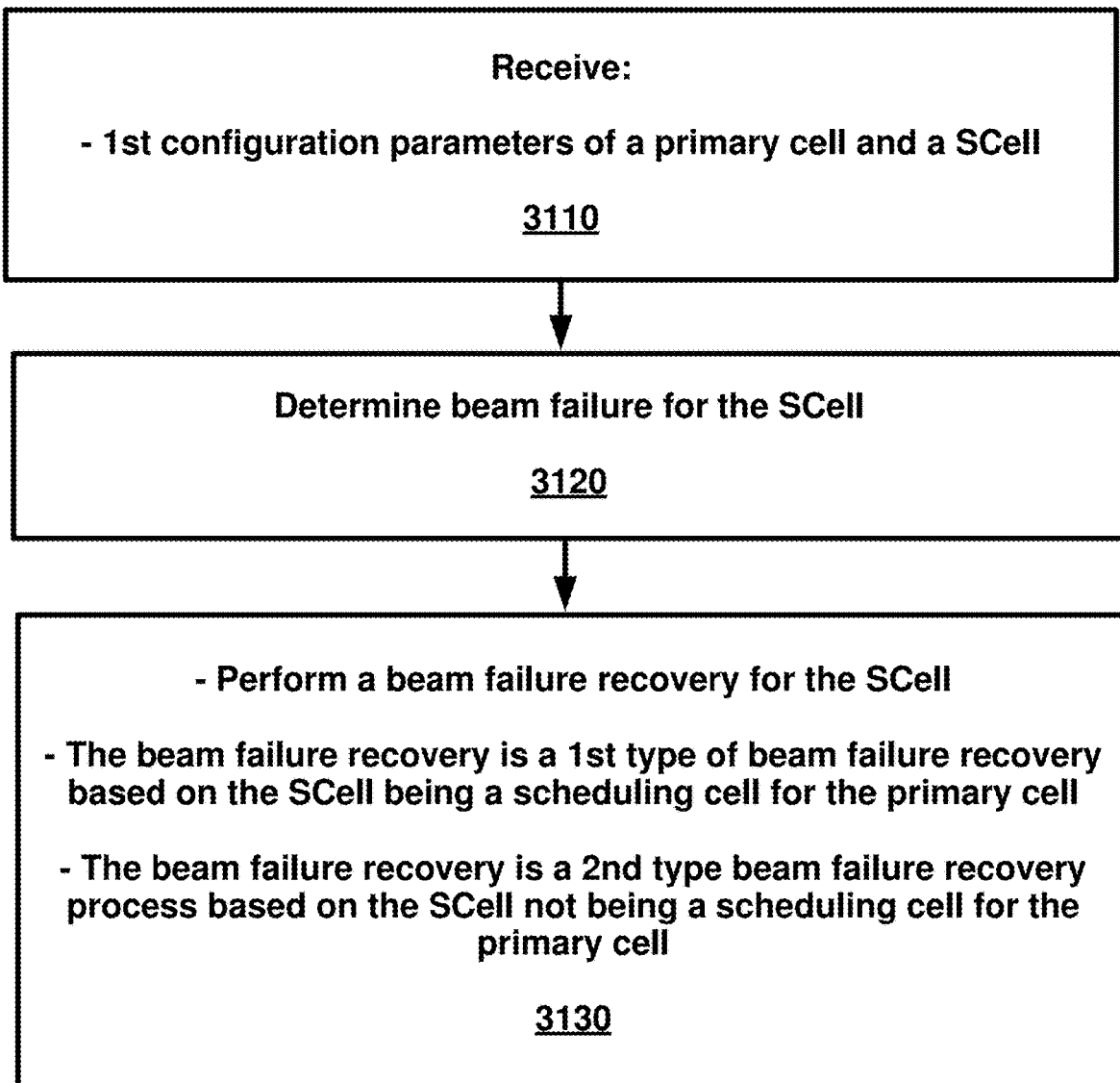
FIG. 31 shows an example flow diagram in accordance with several of various embodiments of the present disclosure.

FIG. 31 shows an example flow diagram in accordance with several of various embodiments of the present disclosure. At 3110, a wireless device may receive first configuration parameters of a primary cell and a secondary cell. At 3120, the wireless device may determine a beam failure for the secondary cell. At 3130, the wireless device may perform a beam failure recovery for the secondary cell, wherein: the beam failure recovery is a first type of beam failure recovery based on the secondary cell being a scheduling cell for the primary cell; and the beam failure recovery is a second type beam failure recovery based on the secondary cell not being a scheduling cell for the primary cell.

Figure 32:
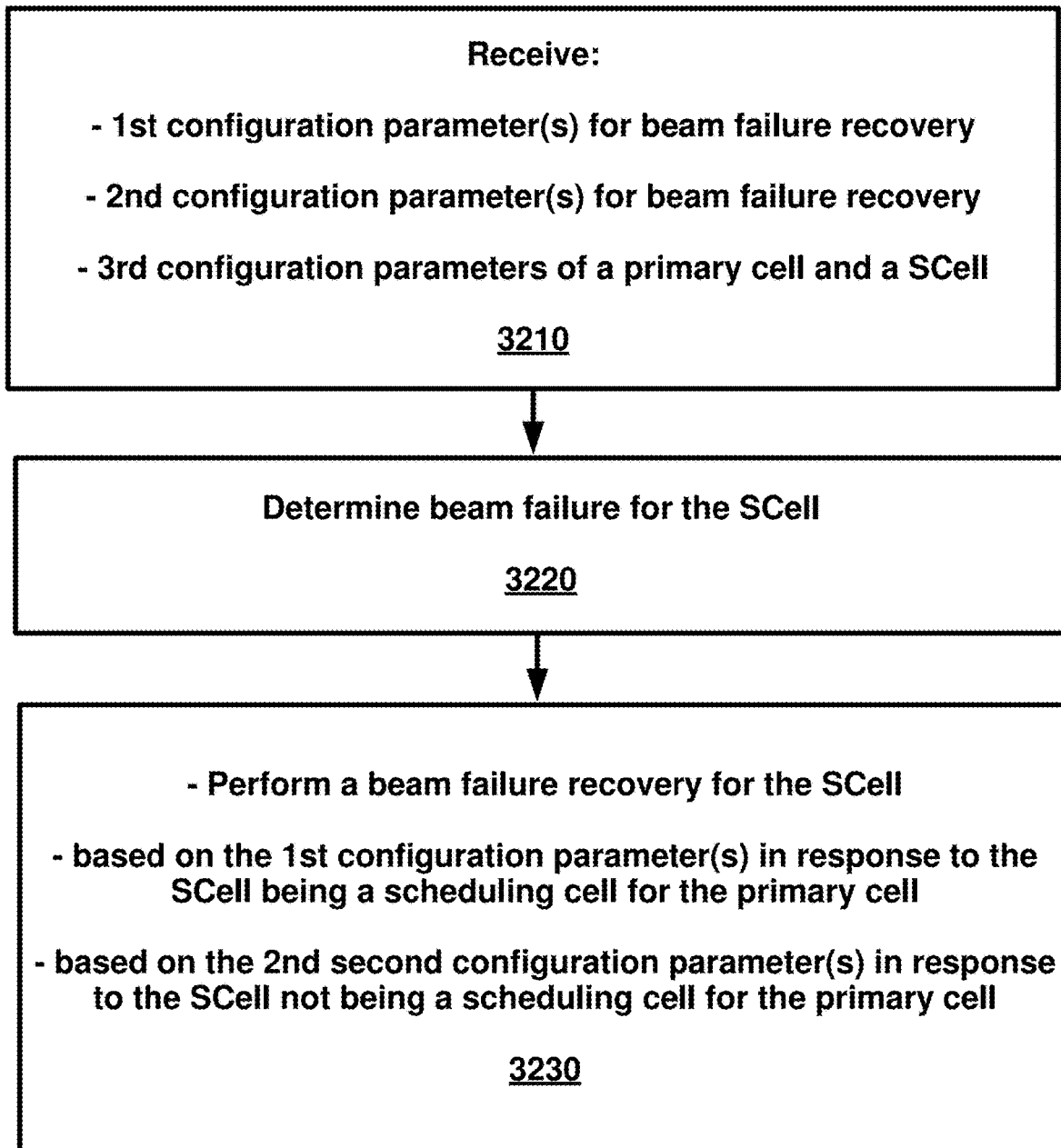
FIG. 32 shows an example flow diagram in accordance with several of various embodiments of the present disclosure.

FIG. 32 shows an example flow diagram in accordance with several of various embodiments of the present disclosure. At 3210, a wireless device may receive: one or more first configuration parameters for beam failure recovery; one or more second configuration parameters for beam failure recovery; and third configuration parameters of a primary cell and a secondary cell. At 3220, the wireless device may determine a beam failure for the secondary cell. At 3230, the wireless device may perform a beam failure recovery for the secondary cell: based on the one or more first configuration parameters in response to the secondary cell being a scheduling cell for the primary cell; and based on the one or more second configuration parameters in response to the secondary cell not being a scheduling cell for the primary cell.

In an example embodiment, the one or more first configuration parameters, received at 3210, may indicate a first value of a beam failure detection timer. The one or more second configuration parameters, received at 3210, may indicate a second value of the beam failure detection timer.

In an example embodiment, the one or more first configuration parameters, received at 3210, may indicate a first value of a beam failure max count. The one or more second configuration parameters, received at 3210, may indicate a second value of the beam failure max count.

In an example embodiment, the one or more first configuration parameters, received at 3210, may indicate a first value of a beam failure recovery timer. The one or more second configuration parameters, received at 3210, may indicate a second value of the beam failure recovery timer.

In an example embodiment, the one or more first configuration parameters, received at 3210, may indicate a first value of a parameter of a beam failure recovery random access process. The one or more second configuration parameters, received at 3210, may indicate a second value of the parameter of the random access process. In an example embodiment, the parameter of the beam failure recovery random access process may indicate a power ramping step. In an example embodiment, the parameter of the beam failure recovery random access process may indicate a preamble received target power. In an example embodiment, the parameter of the beam failure recovery random access process may indicate a maximum number of preamble transmissions in the beam failure recovery random access process. In an example embodiment, the parameter of the beam failure recovery random access process may indicate a random access response window.

Figure 33:
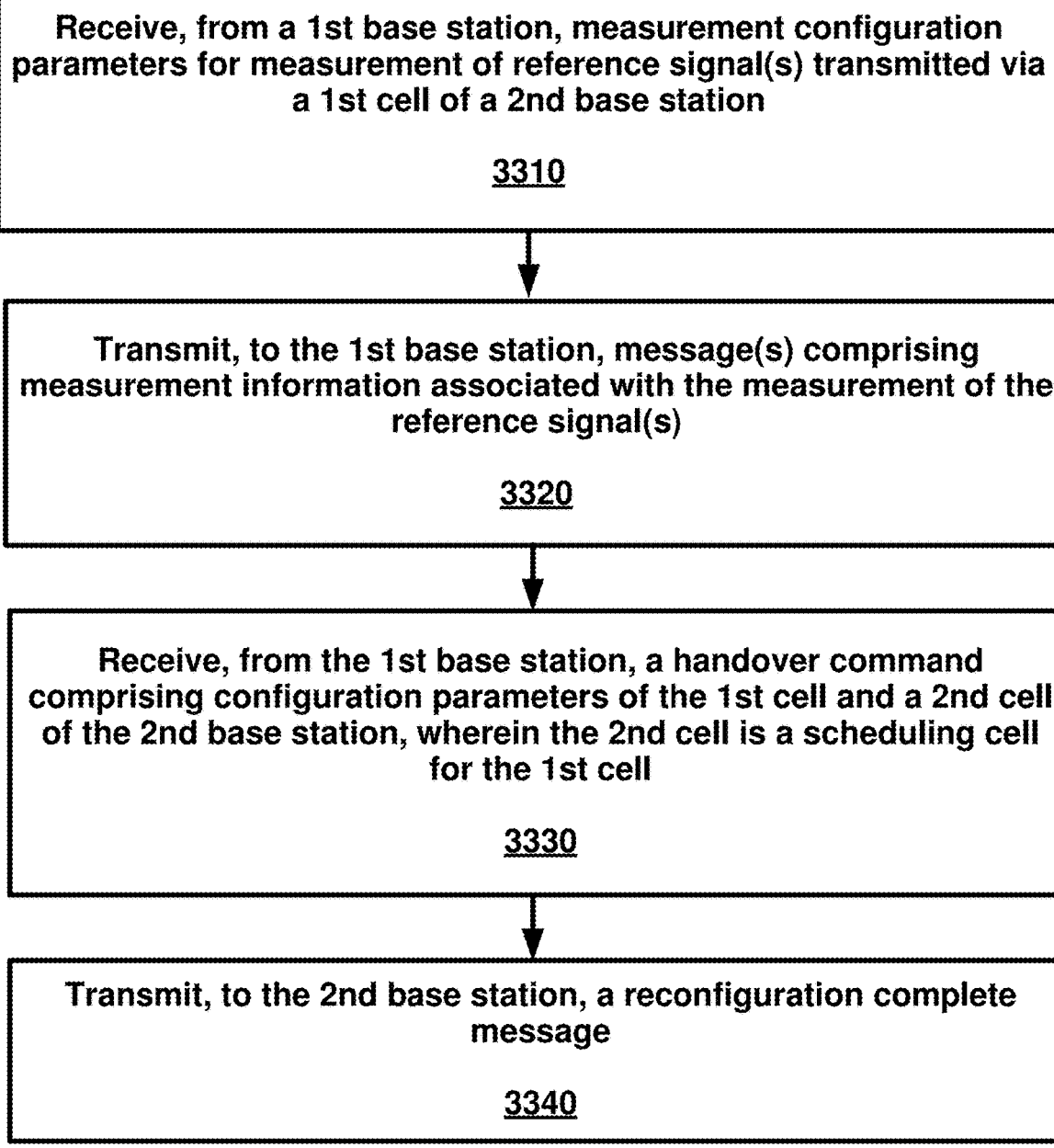
FIG. 33 shows an example flow diagram in accordance with several of various embodiments of the present disclosure.

FIG. 33 shows an example flow diagram in accordance with several of various embodiments of the present disclosure. At 3310, a wireless device may receive from a first base station, measurement configuration parameters for measurement of one or more reference signals transmitted via a first cell of a second base station. At 3320, the wireless device may transmit to the first base station, one or more messages comprising measurement information associated with the measurement of the one or more reference signals. At 3330, the wireless device may receive, from the first base station, a handover command comprising configuration parameters of the first cell and a second cell of the second base station, wherein the second cell is a scheduling cell for the first cell. At 3340, the wireless device may transmit, to the second base station, a reconfiguration complete message.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a wireless device from a base station:
   first configuration parameters of a primary cell and a first secondary cell; and
   second configuration parameters indicating one or more reference signals for radio link monitoring;
   wherein:
   the first secondary cell is a scheduling cell for the primary cell; and
   the primary cell and the first secondary cell are provided by the same base station;
   in response to the first secondary cell being a scheduling cell for the primary cell, performing radio link monitoring on the first secondary cell based on the one or more reference signals received via the first secondary cell;
   determining a link failure of the first secondary cell based on the radio link monitoring; and
   transmitting, by the wireless device to the base station, an indication of the link failure of the first secondary cell.

2. The method of claim 1, wherein the first configuration parameters indicate that the first secondary cell is a scheduling cell for the primary cell.

3. The method of claim 1, wherein the indication is based on a radio resource control message.

4. The method of claim 3, wherein the radio resource control message indicates that the link failure is for the first secondary cell.

5. The method of claim 4, wherein the radio resource control message comprises a field, a value of the field indicating an identifier of the first secondary cell.

6. The method of claim 1, wherein the indication comprises a cause field indicating that the link failure is for the first secondary cell.

7. The method of claim 1, wherein the second configuration parameters comprise first radio link monitoring configuration parameters for radio link monitoring on the first secondary cell.

8. The method of claim 7, wherein the second configuration parameters further comprise second radio link monitoring configuration parameters for radio link monitoring on the primary cell.

9. The method of claim 1, wherein: the one or more reference signals comprise at least one of a synchronization signal block and a channel state information reference signal; and the determining the link failure comprises determining radio link quality based on monitoring the one or more reference signals.

10. The method of claim 1, further comprising receiving, by the wireless device from the base station, third configuration parameters of a second secondary cell, wherein: the second secondary cell is not a scheduling cell for the primary cell; and the second configuration parameters do not comprise radio link monitoring parameters associated with the second secondary cell.

11. The method of claim 1, wherein the determining the link failure comprises starting a timer, with a value, based on a first number of out-of-sync indications.

12. The method of claim 11, wherein the determining the link failure is based on an expiry of the timer.

13. The method of claim 11, wherein the first configuration parameters indicate the value of the timer and the first number of out-of-sync indications.

14. The method of claim 11, wherein the determining the link failure comprises stopping the timer based on a second number of in-sync indications.

15. The method of claim 14, wherein the first configuration parameters indicate the second number of in-sync indications.

16. The method of claim 1, wherein the indication is based on a medium access control (MAC) control element (CE).

17. The method of claim 1, wherein the indication is based on an uplink control information.

18. The method of claim 17, wherein the uplink control information comprises a scheduling request.

19. The method of claim 17, wherein the scheduling request is based on a scheduling request configuration associated with link failure of a secondary cell that is a scheduling cell for the primary cell.

20. The method of claim 1, wherein the first configuration parameters comprise third configuration parameters of one or more search spaces, of the first secondary cell, for receiving scheduling information associated with scheduling of the primary cell.

* * * * *